(12) United States Patent
Mesaros

(10) Patent No.: US 7,593,871 B1
(45) Date of Patent: Sep. 22, 2009

(54) MULTIPLE PRICE CURVES AND ATTRIBUTES

(75) Inventor: Gregory J. Mesaros, Westlake, OH (US)

(73) Assignee: eWinWin, Inc., Tampa, FL (US)

( * ) Notice: Subject to any disclaimer, the term of this patent is extended or adjusted under 35 U.S.C. 154(b) by 813 days.

(21) Appl. No.: 11/150,920

(22) Filed: Jun. 13, 2005

Related U.S. Application Data

(60) Provisional application No. 60/579,302, filed on Jun. 14, 2004.

(51) Int. Cl.
*G06Q 30/00* (2006.01)
(52) U.S. Cl. .................................................. 705/26
(58) Field of Classification Search .................. 705/26, 705/27
See application file for complete search history.

(56) References Cited

U.S. PATENT DOCUMENTS

| | | | |
|---|---|---|---|
| 4,799,156 | A | 1/1989 | Shavit et al. |
| 4,887,207 | A | 12/1989 | Natarajan |
| 4,947,028 | A | 8/1990 | Gorog |
| 4,992,940 | A | 2/1991 | Dworkin |
| 5,053,957 | A | 10/1991 | Suzuki |
| 5,063,506 | A | 11/1991 | Brockwell et al. |
| 5,402,336 | A | 3/1995 | Spiegelhoff et al. |
| 5,414,838 | A | 5/1995 | Kolton et al. |
| 5,444,630 | A | 8/1995 | Dlugos |
| 5,564,115 | A | 10/1996 | Clarkson |
| 5,592,375 | A | 1/1997 | Salmon et al. |
| 5,615,109 | A | 3/1997 | Eder |
| 5,623,660 | A | 4/1997 | Josephson |
| 5,664,115 | A | 9/1997 | Fraser |
| 5,689,652 | A | 11/1997 | Lupien et al. |
| 5,710,887 | A | 1/1998 | Chelliah et al. |
| 5,717,989 | A | 2/1998 | Tozzoli et al. |
| 5,732,400 | A | 3/1998 | Mandler et al. |
| 5,734,890 | A | 3/1998 | Case et al. |
| 5,794,207 | A | 8/1998 | Walker et al. |
| 5,822,736 | A | 10/1998 | Hartman et al. |
| 5,826,244 | A | 10/1998 | Huberman |
| 5,837,071 | A | 11/1998 | Andersson et al. |

(Continued)

FOREIGN PATENT DOCUMENTS

EP 2000/50970 A2 8/2000

(Continued)

OTHER PUBLICATIONS

Anon., "Global Real Estate Markets Spell Opportunity, Experts Tell Realtors," PR Newswire, Nov. 21, 1991.*

(Continued)

*Primary Examiner*—Nicholas D Rosen
(74) *Attorney, Agent, or Firm*—Turocy & Watson, LLP

(57) ABSTRACT

The subject invention relates to electronic buying and selling systems and methods. In particular, the invention concerns relations among distinct price curves, price curve attributes (i.e., factors of the offer that can affect the price curves) and buyers or potential buyers. For instance, a price offered to a system user can vary based on total volume of all people aggregating in private environments, cumulative total order by user, ship date, optimal time, as well as terms and conditions associated with the offer (e.g., no cancellation of order, cancellation possible, payment method . . . ).

16 Claims, 34 Drawing Sheets

U.S. PATENT DOCUMENTS

| | | | |
|---|---|---|---|
| 5,842,178 A | 11/1998 | Giovannoli | |
| 5,850,442 A | 12/1998 | Muftic | |
| 5,870,721 A | 2/1999 | Norris | |
| 5,878,400 A | 3/1999 | Carter, III | |
| 5,890,138 A | 3/1999 | Godin et al. | |
| 5,897,620 A | 4/1999 | Walker et al. | |
| 5,903,830 A | 5/1999 | Joao et al. | |
| 5,933,817 A | 8/1999 | Hucal | |
| 5,945,653 A | 8/1999 | Walker et al. | |
| 5,970,478 A | 10/1999 | Walker et al. | |
| 5,974,406 A | 10/1999 | Bisdikian et al. | |
| 5,987,434 A | 11/1999 | Libman | |
| 5,995,943 A | 11/1999 | Bull et al. | |
| 6,016,484 A | 1/2000 | Williams et al. | |
| 6,026,383 A | 2/2000 | Ausubel | |
| 6,052,670 A | 4/2000 | Johnson | |
| 6,055,519 A | 4/2000 | Kennedy et al. | |
| 6,064,981 A | 5/2000 | Barni et al. | |
| 6,078,906 A | 6/2000 | Huberman | |
| 6,101,484 A | 8/2000 | Halbert et al. | |
| 6,108,639 A | 8/2000 | Walker et al. | |
| 6,112,189 A | 8/2000 | Rickard et al. | |
| 6,131,087 A | 10/2000 | Luke et al. | |
| 6,141,653 A | 10/2000 | Conklin et al. | |
| 6,151,588 A | 11/2000 | Tozzoli et al. | |
| 6,154,738 A | 11/2000 | Call | |
| 6,167,383 A | 12/2000 | Henson | |
| 6,195,646 B1 | 2/2001 | Grosh et al. | |
| 6,219,653 B1 | 4/2001 | O'Neill et al. | |
| 6,236,972 B1 | 5/2001 | Shkedy | |
| 6,260,019 B1 | 7/2001 | Courts | |
| 6,260,024 B1 | 7/2001 | Shkedy | |
| 6,266,651 B1* | 7/2001 | Woolston | 705/27 |
| 6,269,343 B1 | 7/2001 | Pallakoff | |
| 6,289,348 B1 | 9/2001 | Richard et al. | |
| 6,323,894 B1 | 11/2001 | Katz | |
| 6,332,135 B1 | 12/2001 | Conklin et al. | |
| 6,336,105 B1 | 1/2002 | Conklin et al. | |
| 6,338,050 B1 | 1/2002 | Conklin et al. | |
| 6,360,205 B1 | 3/2002 | Iyengar et al. | |
| 6,397,208 B1 | 5/2002 | Lee | |
| 6,415,270 B1 | 7/2002 | Rackson et al. | |
| 6,418,415 B1 | 7/2002 | Walker et al. | |
| 6,418,441 B1 | 7/2002 | Call | |
| 6,449,601 B1 | 9/2002 | Friedland et al. | |
| 6,456,986 B1 | 9/2002 | Boardman et al. | |
| 6,496,568 B1 | 12/2002 | Nelson | |
| 6,507,279 B2 | 1/2003 | Loof | |
| 6,519,571 B1 | 2/2003 | Guheen et al. | |
| 6,553,346 B1 | 4/2003 | Walker et al. | |
| 6,578,014 B1 | 6/2003 | Murcko, Jr. | |
| 6,584,451 B1 | 6/2003 | Shoham et al. | |
| 6,604,089 B1 | 8/2003 | Van Horn et al. | |
| 6,606,607 B1 | 8/2003 | Martin et al. | |
| 6,631,356 B1 | 10/2003 | Van Horn et al. | |
| 6,647,373 B1 | 11/2003 | Carlton-Foss | |
| 6,658,093 B1 | 12/2003 | Langseth et al. | |
| 6,662,194 B1 | 12/2003 | Joao et al. | |
| 6,782,370 B1 | 8/2004 | Stack | |
| 6,785,661 B1 | 8/2004 | Mandler et al. | |
| 6,847,938 B1 | 1/2005 | Moore | |
| 6,850,907 B2 | 2/2005 | Lutnick et al. | |
| 6,868,392 B1 | 3/2005 | Ogasawara | |
| 6,871,140 B1 | 3/2005 | Florance et al. | |
| 6,871,190 B1 | 3/2005 | Seymour et al. | |
| 6,876,977 B1 | 4/2005 | Marks | |
| 6,877,655 B1 | 4/2005 | Robertson et al. | |
| 6,877,665 B2 | 4/2005 | Challa et al. | |
| 6,915,275 B2* | 7/2005 | Banerjee et al. | 705/26 |
| 6,925,446 B2 | 8/2005 | Watanabe | |
| 6,954,734 B1 | 10/2005 | Kuelbs et al. | |
| 6,990,467 B1 | 1/2006 | Kwan | |
| 6,992,794 B2 | 1/2006 | Keane et al. | |
| 7,047,206 B1 | 5/2006 | Schultze | |
| 7,069,228 B1 | 6/2006 | Rose et al. | |
| 7,076,447 B1 | 7/2006 | Peyser et al. | |
| 7,080,030 B2 | 7/2006 | Eglen et al. | |
| 7,103,565 B1 | 9/2006 | Vaid | |
| 7,120,592 B1 | 10/2006 | Lewis | |
| 7,124,099 B2 | 10/2006 | Mesaros | |
| 7,124,107 B1 | 10/2006 | Pishevar et al. | |
| 7,133,835 B1 | 11/2006 | Fusz et al. | |
| 7,165,045 B1 | 1/2007 | Kim-E | |
| 7,181,419 B1* | 2/2007 | Mesaros | 705/26 |
| 7,194,427 B1* | 3/2007 | Van Horn et al. | 705/26 |
| 7,194,442 B1 | 3/2007 | Flanagan et al. | |
| 7,213,754 B2 | 5/2007 | Eglen et al. | |
| 7,296,001 B1 | 11/2007 | Ephrati et al. | |
| 7,363,246 B1* | 4/2008 | Van Horn et al. | 705/26 |
| 7,364,086 B2 | 4/2008 | Mesaros | |
| 2001/0011264 A1 | 8/2001 | Kawasaki | |
| 2001/0014868 A1 | 8/2001 | Herz et al. | |
| 2001/0018660 A1 | 8/2001 | Sehr | |
| 2001/0047296 A1 | 11/2001 | Wyker | |
| 2001/0047311 A1* | 11/2001 | Singh | 705/26 |
| 2002/0026351 A1 | 2/2002 | Coleman | |
| 2002/0032573 A1 | 3/2002 | Williams et al. | |
| 2002/0035536 A1 | 3/2002 | Gellman | |
| 2002/0046147 A1 | 4/2002 | Livesay et al. | |
| 2002/0065762 A1 | 5/2002 | Lee et al. | |
| 2002/0069079 A1 | 6/2002 | Vega | |
| 2002/0080950 A1 | 6/2002 | Koko et al. | |
| 2002/0091580 A1 | 7/2002 | Wang | |
| 2002/0099643 A1 | 7/2002 | Abeshouse et al. | |
| 2002/0107773 A1* | 8/2002 | Abdou | 705/37 |
| 2002/0116282 A1 | 8/2002 | Martin et al. | |
| 2002/0143692 A1 | 10/2002 | Heimermann et al. | |
| 2002/0147670 A1 | 10/2002 | Lange | |
| 2002/0165771 A1* | 11/2002 | Walker et al. | 705/14 |
| 2002/0165821 A1 | 11/2002 | Tree | |
| 2002/0169703 A1 | 11/2002 | Lutnick et al. | |
| 2003/0028473 A1 | 2/2003 | Eso et al. | |
| 2003/0041002 A1 | 2/2003 | Hao et al. | |
| 2003/0055774 A1 | 3/2003 | Ginsberg | |
| 2003/0109949 A1* | 6/2003 | Ikeda et al. | 700/98 |
| 2003/0111531 A1* | 6/2003 | Williams | 235/383 |
| 2003/0126040 A1 | 7/2003 | Mesaros | |
| 2003/0149619 A1 | 8/2003 | Stanley et al. | |
| 2003/0167222 A1 | 9/2003 | Mehrotra et al. | |
| 2003/0195832 A1 | 10/2003 | Cao et al. | |
| 2003/0208412 A1 | 11/2003 | Hillestad et al. | |
| 2003/0233276 A1 | 12/2003 | Pearlman et al. | |
| 2003/0233557 A1 | 12/2003 | Zimmerman | |
| 2004/0015415 A1 | 1/2004 | Cofino et al. | |
| 2004/0039677 A1 | 2/2004 | Mura et al. | |
| 2004/0215500 A1 | 10/2004 | Monahan | |
| 2005/0038713 A1* | 2/2005 | Pickard et al. | 705/26 |
| 2006/0095366 A1 | 5/2006 | Sheth et al. | |
| 2006/0129454 A1 | 6/2006 | Moon et al. | |
| 2006/0178918 A1 | 8/2006 | Mikurak | |
| 2008/0015711 A1 | 1/2008 | Charland et al. | |

FOREIGN PATENT DOCUMENTS

| | | | |
|---|---|---|---|
| WO | WO 9821713 A2 | 5/1998 | |
| WO | WO-9821713 A2 * | 5/1998 | |
| WO | WO-2000/50970 A2 * | 8/2000 | |

OTHER PUBLICATIONS

Deierlein, B., "Smart Fuel Buying," Fleet Equipment, vol. 24, No. 8, pp. 42-44, Aug. 1998.*

Myers, C., "E-Solutions for Surplus Inventory," Dsn Retailing Today, vol. 39, No. 21, p. 13, Nov. 6, 2000.*

Breyer, R.M., "Bargains in Cyberspace," National Home Center News, vol. 26, No. 21, p. 21, Nov. 20, 2000.*
Rahim, M.A., et al., "Optimal Production Run for a Process with Random Linear Drift," (Abstract only), Omega, vol. 16, No. 4, pp. 347-351, 1988.*
Anon., "Screen Savers," Lawyer, Feb. 19, 2001.*
Moody, G., "From E-Commerce to We-Commerce," Computer Weekly, 42, Jun. 3, 1999.*
International Search Report for PCT Application No. PCT/US 07/89195, mailed May 12, 2008, 8 pages.
Koenig, et al. Quantitative Industrial Ecology. IEEE Transactions on Systems, Man and Cybernetics, Part C, Issue Feb. 1, 1998, pp. 16-28.
Lamparter. "Natural Selection." American Printer, vol. 217, No. 3, pp. 54-64, Jun.1996.
"Lucent Launches On-Line Catalog" M2 Presswire, Jan. 22, 1999.
Magna Cash Cybersource Partner to Expand Online Payment Options. PR Newswire, New York, Jan. 15,.
Maxwell, Pricing education in the United States of America: responding to the needs of business, The Journal of Product & Brand Management, Santa Barbara, Aug. 1998, vol. 7, Issue 4, pp. 336-341.
Mesaros. Innovation in Difficult Times : How US Manufacturers are Using Demand Aggregation to Increase Sales and Lower Costs. Jul. 26, 2001. Last accessed Mar. 19, 2008, 4 pages.
Meriam Webster's Collegiate Dictionary, Tenth Edition, 1997, p. 732.
OA Dated Feb. 6, 2009 for U.S. Appl. No. 09/626,296, 11 pages.
Nellore, et al. Factors Influencing Success In Integrated Product Development (IPD) Projects. IEEE Transactions on Engineering Management, vol. 48, issue 2, May 2001, pp. 164-174.
OA Dated Oct. 20, 2008 for U.S. Appl. No. 10/464,585, 11 pages.
OA Dated Oct. 27, 2008 for U.S. Appl. No. 11/464,376, 13 pages.
OA Dated Nov. 3, 2008 for U.S. Appl. No. 11/150,920, 161 pages.
OA Dated Oct. 29, 2008 for U.S. Appl. No. 11/152,462, 27 pages.
OA Dated Apr. 6, 2009 for U.S. Appl. No. 11/680,431, 33 pages.
OA Dated Mar. 25, 2009 for U.S. Appl. No. 11/556,604, 59 pages.
OA Dated Apr. 10, 2009 for U.S. Appl. No. 10/351,069, 27 pages.
Rahim, et al. Optimal Decision Rules for Determining the Length of Production Run, (Abstract Only), Computers and Industrial Engineering, vol. 9, No. 2, pp. 195-202, 1985.
Rahim, et al. "Optimal Production Run for a Process Having Multilevel Tool Wear," (Abstract only), International Journal of Systems Science, vol. 19, No. 1, pp. 139-149, 1988.
Rahim, et al. "Optimal Production Run for a Process with Random Linear Drift," (Abstract only), Omega, vol. 16, No. 4, pp. 347-351, 1988.
"Screen Savers," Lawyer, Feb. 19, 2001.
Sivakumar, et al. Price Match Guarantees: Rationale, Implementation, and Consumer Response. Pricing Strategy and Practice, Bradford, 1996, vol. 4, issue 4, 11 pgs. Recovered from ProQuest Database Aug. 25, 2006.
Sjostrom. Price Discrimination by Shipping Conferences. Logistics and Transportation Review, Jun. 1992, [from Dialog® File 15, Acc. No. 00727777 93-76998].
Stacklin. "Bridgestone Printing Unit Teams with ewinwin", Mar. 25, 2002, Crain's Cleveland Business, vol. 23, issue 12, 3 pages.
Tanaka. "As Other Companies Crumble, Ecount Carves Out Niche in Online-Payment Services." Knight Rider Tribune News Service, Washington, Feb. 27, 2002. (Recovered from ProQuest Database Dec. 4, 2006.).

"The Oil and Gas Asset Clearinghouse, a Pertoleum Place Company, to Host It's Second Exclusively Online Auction of Oil and Gas Properties on Aug. 14-16, 2000," PR Newswire, p. 5591, Aug. 3, 2000, 2 pages.
Thomas, et al. JIT: Strategies for Distant Suppliers (Abstract). Business, vol. 40, No. 4, pp. 36-39, Dec. 1990.
Wayback Machine. "Searched for http://www.ewinwin.com/corp/ewinwinwhitepaper.pdf" , Oct. 2, 2008, Archive. org.
Meridex Introduces Advanced Features to its B2B Network, PR Newswire, May 25, 2000. http://www.canadait.com/cfm/index.cfm?It=106&Id=3421&Se=355&Sv=Company&Lo=441. Last accessed Apr. 30, 2009, 3 pages.
MobShop Launches New Rev of Selling App, Online Reporter, May 28, 2001. http://findarticles.com/p/articles/mi_hb5932/is_200105/ai_n23884526/. Last accessed Apr. 30, 2009, 2 pages.
Accompany: How it Works: "Anatomy of a Buy-Cycle", Jun. 15, 1999, pp. 1-3.
Amazon.com, "Help/Shipping", Archived on Feb 2, 2003 by www.archive.org. Last accessed Apr. 19, 2008, 9 pages.
Ashton Technology Group, Inc. Announces NASDAQ National Market System Listing; Enters into Clearing Arrangements with 8 National Brokerage Firms, Business Wire, Jan. 3, 2000. http://www.findarticles.conn/p/articles/ mi_m0EIN/is_2000_Jan_3/ai_58429780/print. Last accessed Apr. 8, 2009 3 pages.
Blyth, et al. Merchandising System Collecting Data. Derwent Information Ltd. Last accessed Jan. 20, 2009 2 pages.
Yeh, et al. "Optimal Production Run Length for Products Sold with Warranty," (Abstract only), European Journal of Operational Research, vol. 120, No. 3, pp. 575-582, Feb. 1, 2000.
Business Editors. "Weatherchem Announces Major eCommerce Success with eWinWin", Aug. 9, 2001, Business Wire, (p. 1) 2 pages.
Business Editors and High Tech Writers, "eWinWin Announces the Release of DAS 3.0, the Next Generation of B2B Demand Aggregation Solutions" Dec. 28, 2000, Businee wire, p. 1 (4 pages.).
CBOT, "Trading in Futures Can Provide Considerable Financial Rewards", Last accessed Mar. 19, 2008, 41 pages.
Chicago Board of Trade, "Knowledge Center," as archived by Archive.org, on Feb. 13, 2003.
Computer Geeks Discount Outlet, "Order Status," Mar. 1, 2002.
Kantrow, American Express Sets a Three-Tier Pricing on Optima, Dialog: File 148 #05812190 (The Gale Group), American Banker, v157, n25, p1(2), Feb. 6, 1992.
Edwards. "Increase Your Bottom Line : Automated Customer Service and Marketing," E-Business Advisor, vol. 17, no. 7, p. 30, Jul. 1999.
Enos. Vying to be the Top Dog. Upside vol. 12, No. 3, pp. 160-165, Mar. 2000.
eWinWin, "eCommerce Redefined: The Positive Impact of eWinWin's Demand Aggregation System on the Manufacturing Supply Chain", Oct. 2000. Last accessed Mar. 19, 2008, 11 pages.
"Excite@Home Standardizes on Siebel eBusiness; Leading Broadband Media Company Relies on Siebel Systems to Manage Customer Relationships Across Its Entire Family of Services," Business Wire, Jan. 19, 2000.
Gaonkar, et al. Strategic Sourcing and Collaborative Planning in Internet Enabled Supply Chain Networks Producing Multigeneration Products. IEEE Transactions on Automation Science and Engineering, vol. 2, issue 1, Jan. 2005, pp. 54-66.
Gurley. Creating a Great E-Commerce Business. Fortune, Mar. 16, 1998.

* cited by examiner

1265

PRODUCT: GLASS

BUYER'S PRODUCT ORDERING CRITERIA

1266 — ENTER PRICE RANGE: _____ (dollars/pound)

1268 — ENTER VOLUME RANGE: _____ (pounds)

1270 — ENTER DELIVERY RANGE: _____ (days)

1272 — ENTER ACCEPTABLE % DEFECTS: _____ (percent)

1274 — ENTER MINIMUM WARRANTY: _____ (months)

LIST SELLERS PREVIOUSLY USED BY BUYER

SELLER #1
SELLER #2
SELLER #3
SELLER #4

1276

1278 — SEARCH FOR DEAL

Fig. 14b

DEALS MATCHING ORDERING CRITERIA

| SELLER | DEAL# | VOLUME | P/LBS. | DEL. TIME | WARRANTY | %DEFECTS |
|---|---|---|---|---|---|---|
| SELLER #1 | 1 | OVER 100 | $6.00 | 10 DAYS | 12 MONTHS | 5% |
|  | 2 | 30-100 | $7.00 | 5 DAYS | 18 MONTHS | 3% |
|  | 3 | 10-30 | $12.00 | 5 DAYS | 36 MONTHS | .05% |
| SELLER #2 | 1 | OVER 50 | $5.75 | 7 DAYS | 12 MONTHS | 3% |
| SELLER #3 | 1 | 0-50 | $7.00 | 5 DAYS | 12 MONTHS | 3% |
|  | 2 | OVER 50 | $6.50 | 3 DAYS | 12 MONTHS | 3% |
| SELLER #4 | 1 | OVER 10 | $9.00 | 7 DAYS | 24 MONTHS | 1% |
| SELLER #5 | 1 | OVER 50 | $6.25 | 5 DAYS | 12 MONTHS | 3% |

ENTER DEAL

ENTER SELLER:        SELLER #3
ENTER DEAL NUMBER:   DEAL # 3
ENTER VOLUME ORDER:  90

SUBMIT DEAL

```
BUYER REGISTRATION

BUYER NAME:

ADDRESS:

PRIMARY CONTACT:

TELEPHONE:

FAX:

E-MAIL:

DESCRIPTION OF COMPANY:

PREFERRED USER NAME:

PREFERRED PASSWORD:

PREFERRED PASSWORD (VERIFICATION):
```

Fig. 16

| BUYER DATA NAME, ADDRESS, CONTACT, ETC | USER NAME | PASSWORD | CREDIT CARD NO. & EXP. |
|---|---|---|---|
| BUYER 1 | USER NAME (1) | PASSWORD (1) | XXXXXXXX EXP. 05/03 |
| . . . | . . . | . . . | . . . |
| BUYER (N) | USER NAME (N) | PASSWORD (N) | CREDIT CARD (N) |

SELLER REGISTRATION

SELLER NAME:

ADDRESS:

PRIMARY CONTACT:

TELEPHONE:

FAX:

E-MAIL:

DESCRIPTION OF COMPANY:

PREFERRED USER NAME:

PREFERRED PASSWORD:

PREFERRED PASSWORD (VERIFICATION):

| SELLER DATA NAME, ADDRESS, CONTACT, ETC. | USER NAME | PASSWORD | CREDIT CARD NO & EXP. |
|---|---|---|---|
| SELLER 1 | USER NAME (1) | PASSWORD (1) | XXXXXXXX EXP. 07/03 |
| . . . | . . . | . . . | . . . |
| SELLER (N) | USER NAME (N) | PASSWORD (N) | CREDIT CARD (N) |

MULTIPLE PRICE CURVES AND ATTRIBUTES

CROSS REFERENCE TO RELATED APPLICATIONS

This application claims the benefit of U.S. Provisional Application No. 60/579,302, filed Jun. 14, 2004 and entitled VOLUME DISCOUNT SYSTEM AND METHOD. This application is also related to co-pending U.S. Pat. No. 7,124,099, filed Feb. 20, 2003 and entitled E-COMMERCE VOLUME PRICING. The entireties of these applications are incorporated herein by reference.

TECHNICAL FIELD

The subject invention relates to an e-commerce multiple criteria buying and selling methodology and more particularly to a method and apparatus of using the e-commerce multiple criteria buying and selling methodology to conduct business electronically.

BACKGROUND

The buying and selling of products and services has resulted in a vast array of buying schemes that are used to vary the price at which such products are sold.

One of the most common buying schemes which businesses encounter everyday is known as volume buying. According to this buying scheme, sellers set a fixed unit price for their products based on the volume of units that a buyer is willing to purchase. Buyers desiring to purchase products from the seller are each required to pay the same fixed price depending on the volume of units the buyer is purchasing. If a seller finds that the demand for a given product is greater or less than expected, the seller may later adjust the fixed price per unit of the product to account for such findings. Although the fixed price per unit system provides a simple way for a seller to conduct business with multiple buyers, one drawback of this buying scheme is that it fails to provide buyers with a choice between a variety of different buying criteria that may be just as important as or more important to the buyer than price.

For example, a buyer that is in need of goods, such as raw materials to make products for an expedited order may be willing to pay a higher price for a faster delivery time. Another buyer may be concerned with the quality of the goods they are purchasing, such that the buyer would pay a higher price for goods having a minimum number of defects. Yet another buyer may be concerned with the warranty time allotted for the goods they are purchasing, and may want the warranty of the goods that they are purchasing to match or exceed the warranty the buyers are offering their own customers.

Yet another buying scheme that has been advanced in recent years is buyer-driven bidding. According to this buying scheme, a single buyer desiring to obtain a product communicates to multiple sellers the price at which the buyer is willing to purchase the product. Each of the sellers is provided an opportunity to review the buyer's price. A sale is complete when one of the sellers agrees to sell the product to the buyer at the price suggested by the buyer. A buyer-driven bidding scheme is described in U.S. Pat. No. 5,794,207 assigned to Walker Asset Management Limited Partnership of Stamford, Conn. Another buyer-driven bidding scheme is described in U.S. Pat. No. 5,897,620 assigned to priceline.com Inc of Stamford, Conn. While the buyer-driven bidding scheme provides advantages for certain types of transactions when, for example, sellers may be willing to sell products at lower than normal prices, the uncertainties involved with whether a buyer's offer will be accepted is often problematic for high volume commercial transactions in which the reliability that a transaction will be complete is of paramount importance. Another problem with the present buying schemes is that the buyers have no control in determining the criteria of the product or services that they may receive, while the seller has no control of the type of purchase that the buyers request.

While the buying schemes described above have various advantages and disadvantages in different situations, a commonality among all of the buying schemes is that each buyer is not given the opportunity to choose amongst different buying criteria, which could be more important to the buyer than the price of the goods and/or services. Furthermore, each seller is not given a chance to offer their goods and/or services based on different selling criteria. In many instances sellers are not even aware of what buyers consider important buying criteria. Additionally, sellers are sometimes not aware of what other selling criteria that other sellers might offer buyers.

Accordingly, there is a strong need in the art for a multiple criteria buying and selling scheme which provides both buyers and sellers more control in a commercial purchasing transaction, and overcomes the above mentioned drawbacks, as well as other drawbacks.

SUMMARY

The following presents a simplified summary in order to provide a basic understanding of some aspects of the claimed subject matter. This summary is not an extensive overview. It is not intended to identify key/critical elements or to delineate the scope of the subject invention. Its sole purpose is to present some concepts in a simplified form as a prelude to the more detailed description that is presented later.

According to one aspect of the subject invention, a multiple price curves and price curve attributes system is provided. The multiple price curves and price curve attributes system can contain an aggregation component to aggregate the demand for orders from a plurality of buyers in a plurality of deal rooms. This data is input to a price curve component that receives aggregation data and price curve attributes to generate price curves, which can be displayed to buyers in many forms by the communication component. Additionally, the communication component can allow direct communication between a buyer and a seller to negotiate price curve attributes.

Each of the deal rooms is an electronic forum to facilitate transactions between a buyer and a seller. Normally, a seller or supplier will create or sponsor the deal rooms, where buyers, if they meet the criteria established by the supplier, can view and place orders for the supplier's offers. Hence deal rooms can be either public or private. Offers provided in private deal rooms can only be viewed by buyers who have access to the private deal room, which can be gained by, for example, invitation, right of entry, accepting the terms and conditions, prior buying or selling activity, etc.

The multiple price curves and price curve attributes system employs a feedback control system such that aggregation of orders from all deal rooms could affect the price curves related to each buyer, irrespective on the buyer's location. Moreover, the price curves can be affected by various price curve attributes, such as buyer order volume, orders to date by the buyer from the supplier, aggregate volume for all orders from the supplier, terms and conditions of the offer, terms and conditions of a different order, time of shipment, and time of order placement. Additionally, the impact of many of these price curve attributes, as well as others can be determined by a supplier when the deal room is created, or they can be negotiated during the transaction to better fit the individual circumstances of both the buyer and the seller.

For example, a supplier can predetermine that if a buyer pre-pays for an order, the buyer can receive a 2% discount off the price. The buyer could then give a counter offer to the buyer to, for instance, receive a longer warranty (even though this attribute was not predetermined by the supplier), which the supplier could accept or reject. According to the transactions, the price curves for this or other offers can be updated immediately and presented to the buyer in many forms such as any number of charts, graphs, calendars, product lists with dynamic prices, visuals in easy to understand format, and the like.

Furthermore, price curve attributes have the ability, for example during negotiation, to affect the price points of price curves for other products. Also, a buyer can choose among many price curve attributes to create "what if" scenarios, essentially testing how one or many of the price curve attributes will affect his price curve for this or another offer.

In accordance with another aspect of the subject invention, a multiple price curves and price curve attributes methodology is provided. The methodology includes aggregating a plurality of orders for at least one offer offered by at least one supplier, determining qualified buyers who satisfy supplier criteria, presenting at least one price curve to the qualified buyer based upon aggregation data, presenting price curve attributes for each of the at least one offer, receiving price curve attribute data from one of the qualified buyers and the at least one supplier, and updating the at least one price curve based upon aggregation data and at least one price curve attribute.

In accordance with yet another aspect of the subject invention, a multiple price curves and price curve attributes methodology is provided. The methodology includes placing at least one first good and/or service for sale in a first private location, placing at least one second good and/or service for sale in a second private location, inviting at least on buyer to the first private location to view the at least one first good and/or service for sale, varying the price of the at least one first good and/or service dependent on a first factor, and varying the price of the at least one second good and/or service dependent on the price of the at least one first good and/or service.

To the accomplishment of the foregoing and related ends, the invention then, comprises the features hereinafter fully described and particularly pointed out in the claims. The following description and the annexed drawings set forth in detail certain illustrative aspects of the invention. These aspects are indicative, however, of but a few of the various ways in which the principles of the invention may be employed and the subject invention is intended to include all such aspects and their equivalents. Other objects, advantages and novel features of the invention will become apparent from the following detailed description of the invention when considered in conjunction with the drawings.

BRIEF DESCRIPTION OF THE DRAWINGS

FIG. 14b illustrates an exemplary buyer's product ordering criteria input screen in accordance with an aspect of the subject invention.

FIG. 14c illustrates a list of seller's deals matching the buyer's product ordering criteria in accordance with one aspect of the subject invention.

FIG. 16 illustrates an on-line registration form for a buyer in accordance with one aspect of the subject invention.

FIG. 17 illustrates a buyer database stored in a central server in accordance with one aspect of the subject invention.

FIG. 20 illustrates an exemplary on-line registration form for a seller in accordance with one aspect of the subject invention.

FIG. 21 illustrates a seller database stored in the central server in accordance with one aspect of the subject invention.

DETAILED DESCRIPTION

The subject invention is now described with reference to the annexed drawings, wherein like numerals refer to like elements throughout. It should be understood, however, that the drawings and detailed description thereto are not intended to limit the invention to the particular form disclosed. Rather, the intention is to cover all modifications, equivalents, and alternatives falling within the spirit and scope of the subject invention.

As used herein, the terms "component," "system," "engine" and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

The word "exemplary" is used herein to mean serving as an example, instance, or illustration. Any aspect or design described herein as "exemplary" is not necessarily to be construed as preferred or advantageous over other aspects or designs.

It should be appreciated that the subject invention may be implemented as a method, apparatus, or article of manufacture using standard programming and/or engineering techniques to produce software, firmware, hardware, or any combination thereof. The term "article of manufacture" (or alternatively, "computer program product") as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Of course, those skilled in the art will recognize many modifications may be made to this configuration without departing from the scope or spirit of the subject invention.

Figure 1:
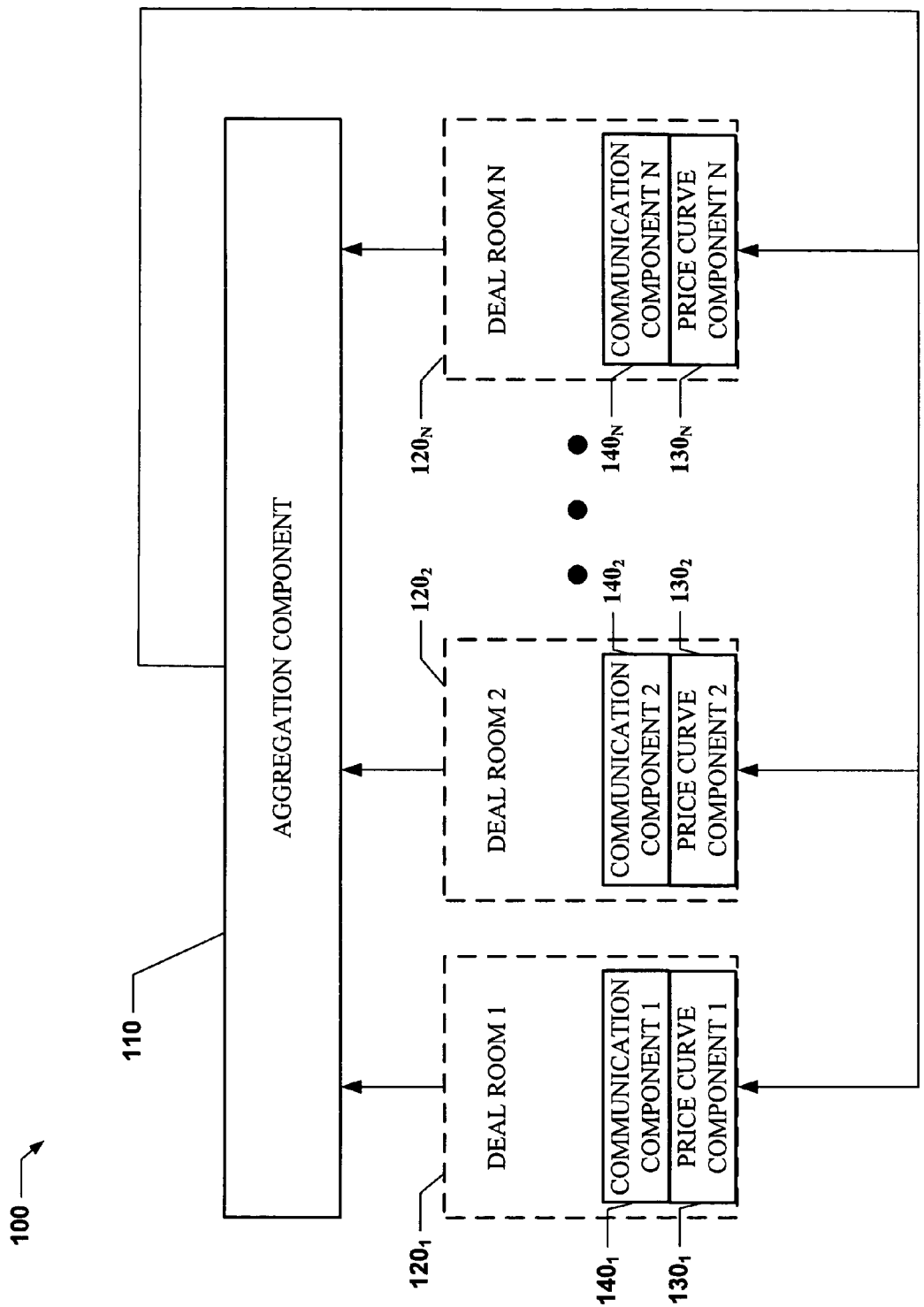
FIG. 1 is a feedback control system, which employs an aggregation component, in accordance with an aspect of the subject invention.

Referring now to FIG. 1, system 100 is shown wherein an aggregation component 110 interfaces to a plurality of deal rooms $120_1$-$120_N$, referred to collectively as deal rooms 120. It is to be appreciated that although the deal rooms 120 are being referred to collectively hereafter, respective deal rooms 120 can have unique properties that distinguish each of the deal rooms 120. The deal rooms 120 can contain price curve components $130_1$-$130_N$, hereinafter referred to as 130. Similarly, the deal rooms can contain communication components $140_1$-$140_N$, hereinafter referred to as 140. Each price curve component 130 can have different attributes associated with it. Such properties can relate to the type of data shown, the format of the data, the rate data is updated and so on.

Each of the deal rooms 120 can be employed to facilitate transactions between a buyer and a seller. The communication component 140 can display price curves to buyers based upon predetermined conditions established by a seller and can also allow direct communication between a buyer and a seller to negotiate predetermined or new terms and conditions. Such communication can occur utilizing a plurality of technologies such as video conferencing, the Internet, teleconferencing and the like.

As shown, the system 100 is a feedback control system operative to utilize offers from each deal room to affect the price curves related to each buyer. Thus, the deal rooms 120 can generate a plurality of offers where the demand for such offers can be received by the aggregation component 110, which in turn informs the price curve component 130 of the appropriate initial price curves for each deal room 120. After the initial price curves have been determined by the price curve component 130, it is presented to the buyers located within the respective deal rooms 120 by the communication component 140, and the price curve can be subsequently adjusted if the aggregate demand reaches certain levels. It should be appreciated that the price curves do not have to be presented as curves on a graph. For example, price curves presented to the buyer could take the form of a chart, a graph, a product listing, a calendar, and the like.

A buyer can further adjust the price curve based on additional criteria listed in the price curve component 130. The supplier can provide these additional criteria to the price curve component 130 as a set of attributes that serve as additional incentives or disincentives for the offer. It should be noted that communication between the components can be facilitated via various technologies such as wireless, coaxial cable, Ethernet, etc. Thus, the deal rooms 120, the price curve components 130 and the aggregation component 110 can be local or remote to each other as desired. For example, a buyer can be located in his office and employ the Internet to view a supplier price curve relating to a good for sale.

In addition, the aggregation component 110 can learn behavior via inference. As utilized herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can refer to techniques employed for composing higher-level events from a set of events and/or data. Such inference can result in the construction of new events or actions from a set of observed events and/or stored event data, whether or not the events are correlated in close temporal proximity, and whether the events and data come from one or several event and data sources. Various classification schemes and/or systems (e.g., support vector machines, neural networks (e.g., back-propagation, feed forward back propagation, radial bases and fuzzy logic), expert systems, Bayesian networks, and data fusion) can be employed in connection with performing automatic and/or inferred action in connection with the subject invention.

Figure 2:
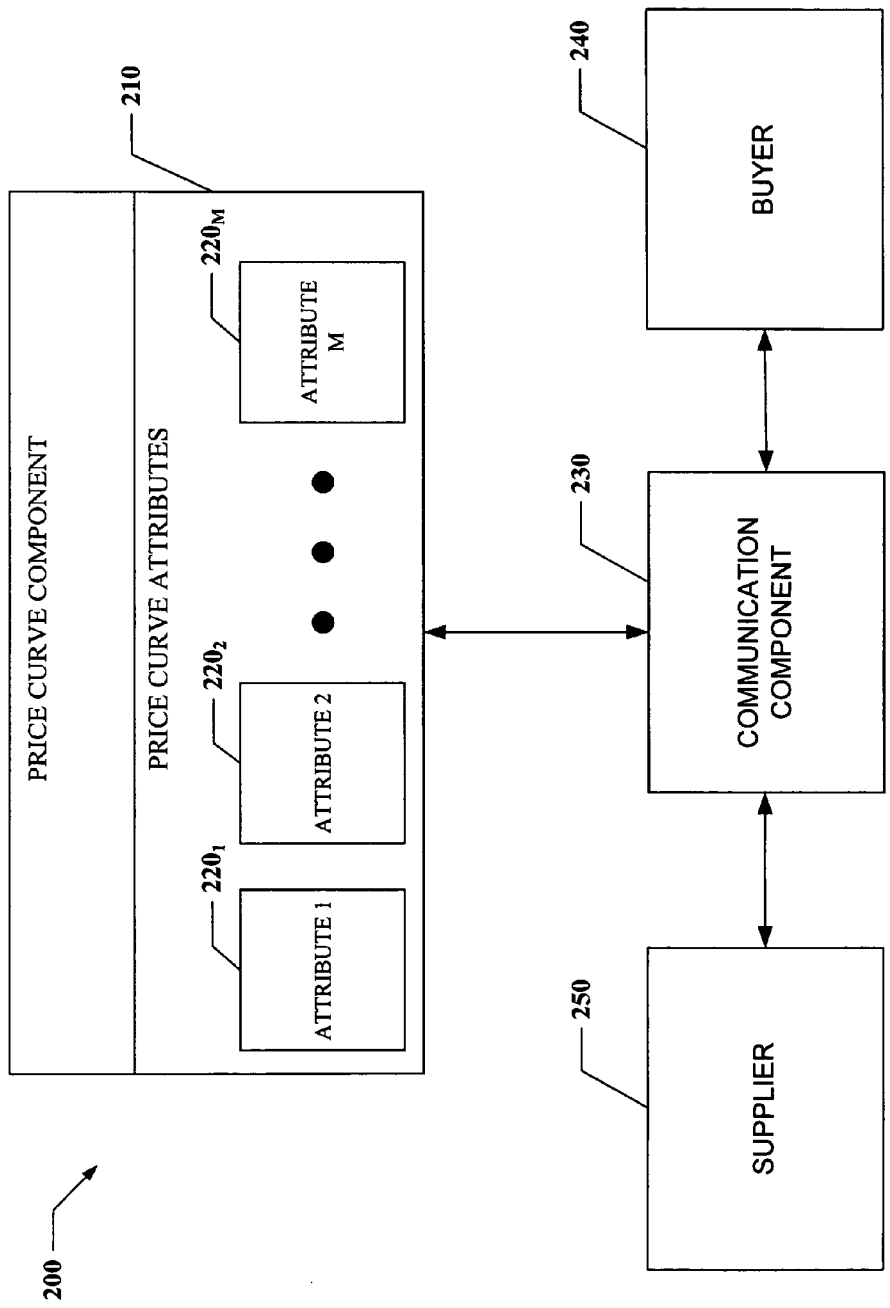
FIG. 2 illustrates a block diagram of an exemplary deal room in accordance with one aspect of the subject invention.

Turning now to FIG. 2, a deal room 200 is shown in more detail in accordance with one aspect of the invention. Although the deal room 200 is shown to have only one supplier 250, multiple suppliers for a deal room 200 are within the spirit and scope of the invention. Similarly, although only one buyer 240 is shown, a single deal room 200 could have many buyers.

As noted above, a buyer can further adjust the price curve based on additional criteria listed in the price curve component 210. These additional criteria can include, for example, buyer order volume, orders to date by the buyer 240 from the supplier 250, aggregate volume for all orders from the supplier 250, terms and conditions of the offer, terms and conditions of a different order, time of shipment, and time of order placement.

A supplier 250 can determine each of these or other attributes 220 when the deal room 200 is set up, or they can be negotiated at a later time, and these attributes as well as others can affect the price curve for an offer. For example, one or more of the attributes 220 could be selected by the buyer 240 in unison to obtain an optimal price for the offer, or used to offset each other. As an example, the supplier 250 could offer a slight discount of two percent off the total price if the buyer 240 agrees to terms prohibiting cancellation of the order. Or, the buyer 240 may agree to pay a premium of five percent above the listed price to secure the right to later cancel the order. Other examples include a tag and pull program where the supplier 250 agrees to earmark a particular shipment to the buyer 240 for purchase at a later date if the buyer 240 is willing to pay a slight premium. Yet another example is an option to pre-pay in order to attain a slight pricing discount. As can be seen, the price curve component 210 can adjust the price curve based upon additional attributes of the deal agreed to by both the buyer 240 and the supplier 250. This price curve adjustment can be transmitted to the communication component 230 and presented to the buyer 240. Moreover, based on the nature of the price curve adjustment, it can be applied to a single buyer in the deal room 200, to all buyers in the deal room 200, or, referring back to FIG. 1, to selected buyers in one or more deal rooms 120, or to all buyers in all deal rooms 120 in which the offer exists.

All of these additional attributes can immediately affect a different price curve as well as affecting other price curves, and, in some cases, be reflected on all price curves for products from a supplier 250. These attributes can be combined in order to provide the best price for the buyer 240. For example, the buyer 240 may pre-pay and agree not to cancel to lower the price curve of the offer. Additionally, these attributes can be used to offset other attributes, allowing the buyer 240 to obtain an optimal price curve based on the particular circumstances of the buyer 240. For example, the buyer 240 may place a large order to negate a surcharge or extend the period of a tag and pull program.

Figure 3:
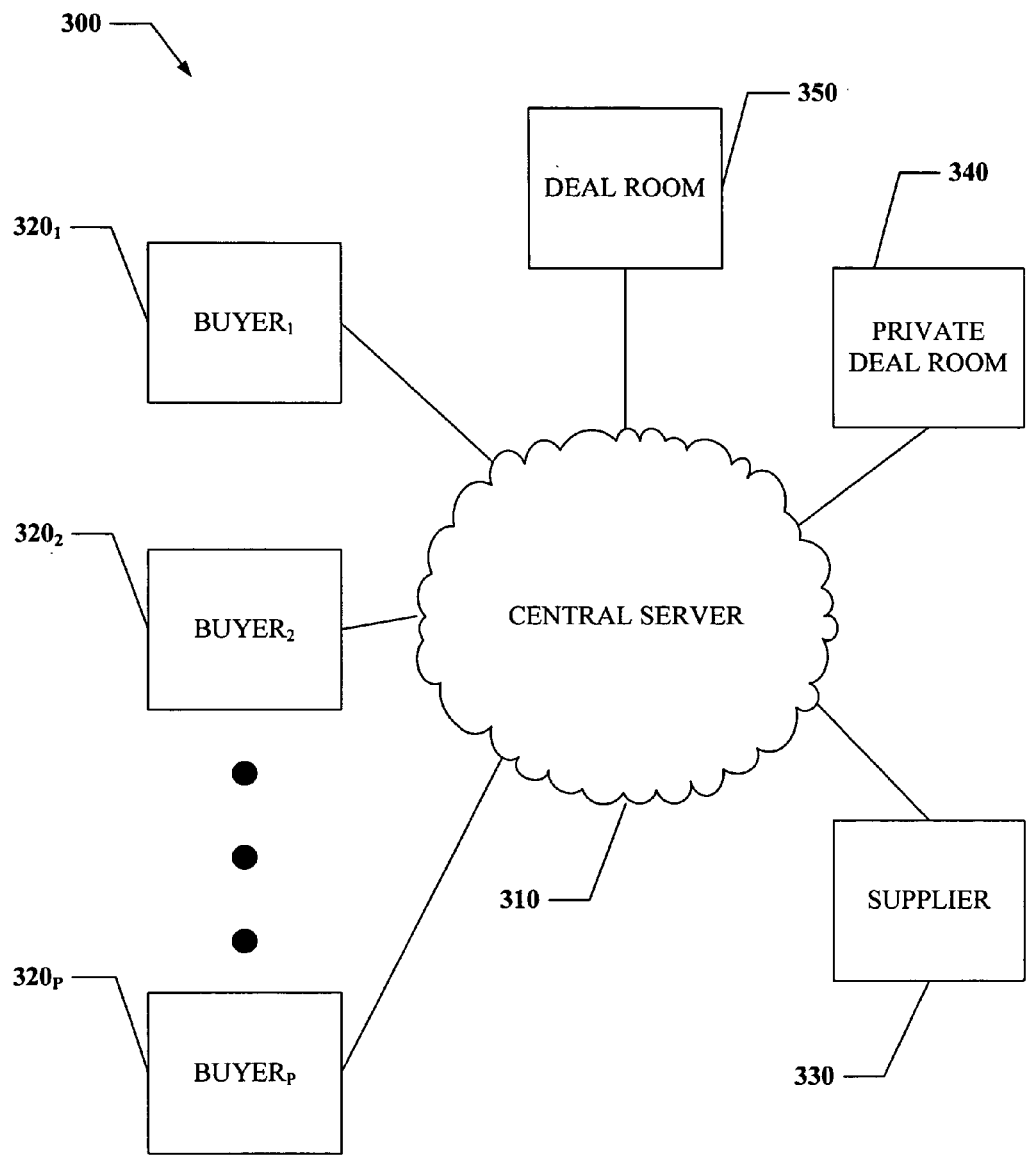
FIG. 3 illustrates a diagrammatic view of a system for electronically conducting business in accordance with one aspect of the subject invention.

Turning now to FIG. 3, the system 300 is shown to include a central server 310 and a plurality of buyers $320_1$-$320_P$, referred to collectively as buyers 320. It is to be appreciated that although the buyers 320 are being referred to collectively hereafter, respective buyers 320 can have unique properties that distinguish each of the buyers 320. The system 300 can also include a supplier 330, a private deal room 340 and a deal room 350. Although FIG. 3 shows only one of each of a supplier 330, a private deal room 340 and a deal room 350, respectively, it is easily seen that the system 300 would support multiple suppliers and multiple deal rooms of many types, for example, private deal rooms.

The supplier 330 can communicate with the central server 310 to sponsor a location in which the supplier 330 can offer one or many products to buyers 320 in one or many deal rooms 350 or private deal rooms 340. In alternative embodiments, described below, the locations can be sponsored by participants other than the supplier 330, such as by the buyers 320, the system administrator, etc. As described, the locations can optionally be designated as private deal rooms 340, in which the deals shown to the buyers 320 who have access to the private deal room 340 can have terms specific to the buyer 320, specific to the deal room 350 or the private deal room 340, or specific to the offer. Only the participants who have access to a private deal room 340 can view and/or accept the deals offered in the private deal room 340, however, terms negotiated by the buyer 320 and the supplier 330 in the private deal room 340 may affect the terms (and therefore the price curve) for other deals offered by that supplier 330. Similarly, purchases made by a buyer 320, even in a private deal room 340, can affect the overall demand aggregation for the offer. Therefore, a deal made in a private deal room 340 between a buyer 320 and a supplier 330 can work to lower the price a different buyer 320 will pay for the same product offered by that supplier 330 in a different deal room 350 with a different price curve, for example. Hence, even buyers 320 who do not have access to a private deal room 340 can benefit by the purchasing activity of buyers 320 who do.

Although deal rooms 350 generally require participants to meet terms and conditions of the sponsor, often the sponsor may want the deal to be accessible to as many buyers 320 as possible. In that case the deal rooms 350 will be public. In other cases, if a supplier 330 wants to offer deals only to specific buyers 320 or only to buyers who meet certain criteria, then the sponsored locations can be a private room 340. The criteria to enter a private deal room 340 are determined by the sponsor. Therefore, admittance can be gained in a variety of ways, such as by invitation, right of entry, accepting the terms and conditions, prior buying or selling activity, etc., and admittance to the private deal room can be regulated by the party or parties sponsoring the private deal room 340. Other aspects of both deal rooms 350 and private deal rooms 340 are described below.

It is to be further appreciated that such a deal room 350 and a private deal room 340 can involve any number of technologies to facilitate interaction between a buyer and a seller such as teleconference, videoconference, net meetings and the like. In addition, such deal rooms are private in that a single buyer (or a group with like characteristics) is only exposed to his or her own price curves related to the goods the buyer is interested in purchasing from the seller. In this manner, the supplier can adjust the pricing structure without danger of harming current potential business relationships with buyers which could occur if a buyer was aware of another buyer's pricing structure.

Figure 4:
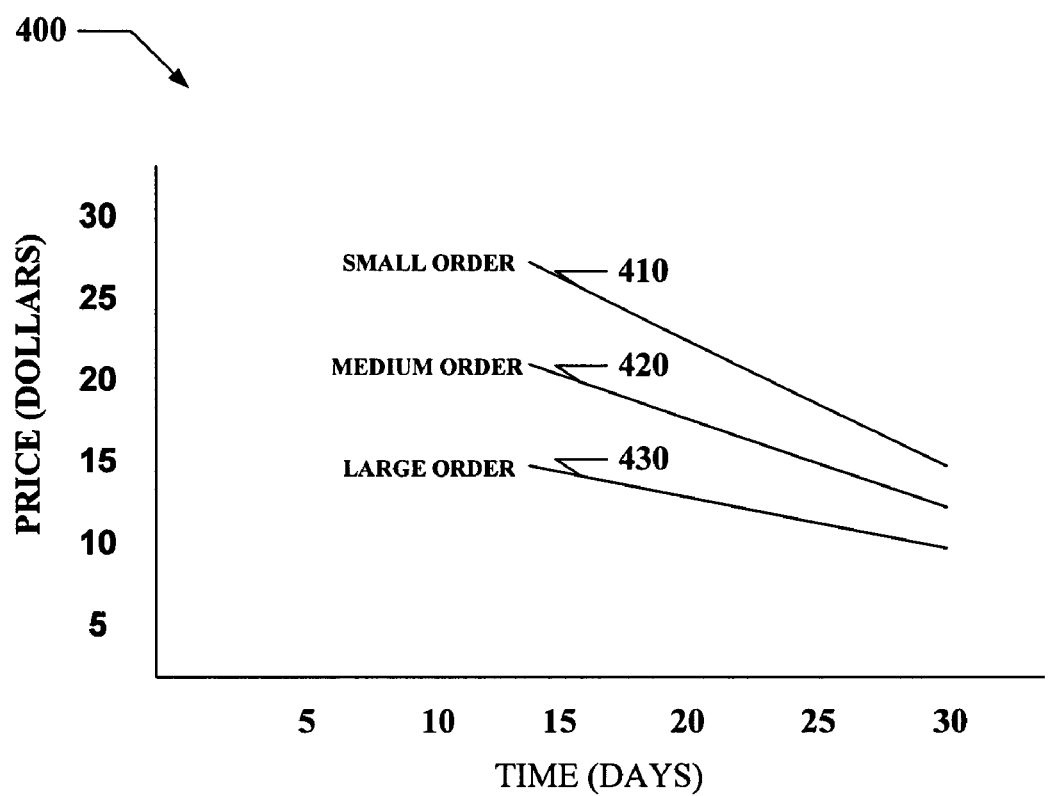
FIG. 4 is an example of a set of price curves based on order volume in accordance with one aspect of the subject invention.

Turning now to FIG. 4, an exemplary product price curves 400 are shown. One price curve 410 is shown for a small order, one price curve 420 for a medium order, and one price curve 430 for a large order. Upon entering a deal room, when a buyer is presented with an initial product price curve 400, the characteristics for the product price curve 400 may vary according to the volume of the order. For example, everything else being equal, buyers with a large order will generally see a price curve 430 with lower prices. However, it is to be appreciated that although only three discrete categories of volume are shown here, any number of categories could exist, or the generation of the price curve could be based on a continuum of the volume. It should also be appreciated that, although here the price is shown to decrease over time for an order, it could, for example increase due to a supplier's particular circumstances. It should further be appreciated that, although only the volume (size) of the order and time are considered here, any number of other factors or price curve attributes can be considered before generating the product price curve 400, and each could affect the price curves 410-430 in myriad ways.

FIGS. 5-10 illustrate methodologies in accordance with an aspect of the subject invention. For simplicity of explanation, the methodologies are depicted and described as a series of acts. It is to be understood and appreciated that the subject invention is not limited by the acts illustrated and/or by the order of acts, for example acts can occur in various orders and/or concurrently, and with other acts not presented and described herein. Furthermore, not all illustrated acts may be required to implement the methodologies in accordance with the subject invention. In addition, those skilled in the art will understand and appreciate that the methodologies could alternatively be represented as a series of interrelated states via a state diagram or events.

Figure 5:
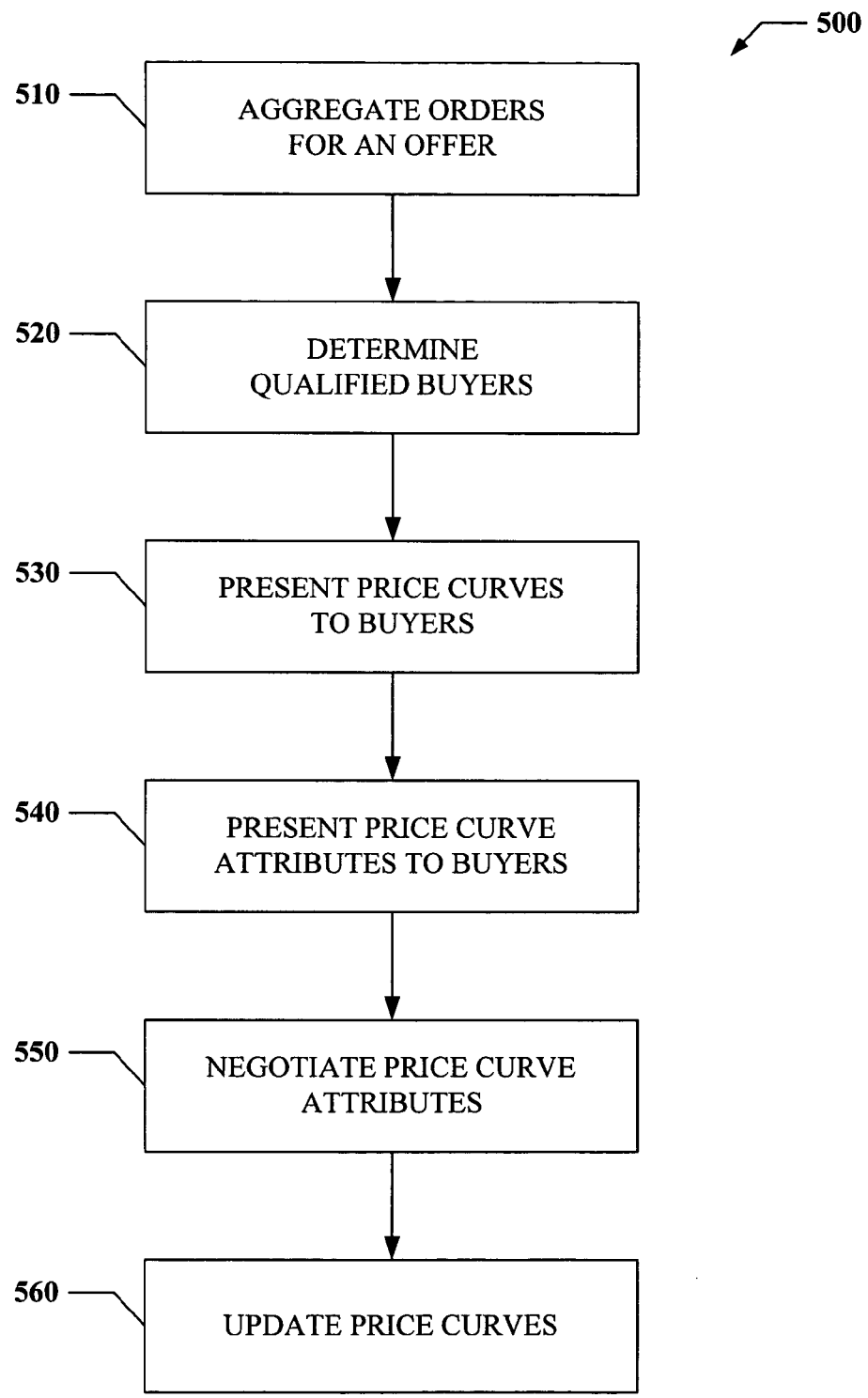
FIG. 5 is a flow chart diagram of methodology for updating price curves, in accordance with an aspect of the subject invention.

Turning now to FIG. 5, a methodology 500 is depicted that relates to presenting and updating various price curves based on various price curve attributes. At 510, aggregate orders for an offer are calculated. All orders for an offer placed by buyers at any location can be aggregated initially to set the present price curves that will be presented to buyers. Additionally, it should be appreciated that several price curves based upon the aggregation can be generated. Although different price curves can be generated, all of them will generally share similar characteristics. For example, a price curve for a large order may chart lower prices than a price curve for a small order, even though both price curves relate to the same offer by the same supplier, and may even be presented to buyers in the same deal room.

At 520, the system determines qualified buyers who have access to the deal rooms and/or to the offers. This determination is based upon criteria established by the supplier or other sponsor or sponsors of the offer, and can include the following: invitation, right of entry, accepting the terms and conditions, prior buying or selling activity, as well as other criteria. If a buyer is not qualified to receive the offer, then the buyer will not be presented with price curves for the offer and/or will not be allowed to enter the private deal room.

At 530, the initial price curves can be presented to the buyers by the communication component. The price curves can be the same or different for other buyers in this or a different deal room, depending upon the circumstances of both the buyer and the seller. Additionally, the price curve component can be dynamically updated at any time the underlying data that will affect a price curve changes. However, even though price curve data may later change, at least one price curve is presented to a buyer based on the data that is already known at this point, for example, aggregation data, predetermined price curve attributes, and the like.

At 540, the communication component presents price curve attributes that have been entered into the price curve component by the supplier or other sponsor of the deal room. These price curve attributes can serve as a set of incentives or disincentives, for instance, to encourage behavior a supplier might like from a buyer and discourage the behavior the supplier does not want. Or, simply to provide a buyer with more options to better fit the individual needs of buyers. For example, a supplier may want very large orders with lots of lead time before the orders must be delivered to the buyer, but a buyer might want a warranty on the goods. Therefore, the supplier can set up the offer such that one price curve attribute is the volume of the order, another is the delivery time, and yet another is warranty, as well as other additional attributes. The buyer will then be presented with these price curve attributes, enabling the buyer to change the dynamics of the deal according to the buyer's preferences.

Additionally, at 550, the buyer or the supplier can modify the terms of a price curve attribute in a number of ways. For example, if the supplier receives a cancellation for an order from one buyer, a second buyer may agree to add some of all of the volume for the canceled shipment to the second buyer's current order if the supplier is willing to reduce the price somewhat. If the supplier agrees, at 560, the price curve shown to the buyer will be immediately updated to reflect this additional price curve attribute. As another example, Buyer A may inform the supplier for both Product X and Product Y that he needs to delay a shipment of Product X, however, Buyer A is not in a position to pay the price that is displayed when the price curve is updated to reflect the change in the delivery date. To solve this dilemma, Buyer A could agree to terms more favorable to the supplier on an order for Product Y, thereby negating the adverse effects (from the buyer's perspective) on the price curve for Product X, by accepting a change in the price curve or the price curve attributes for Product Y. Hence, price curve attributes can affect changes not only in their own price curves, but the price curves for other offers, in the same or different deal rooms.

Figure 6:
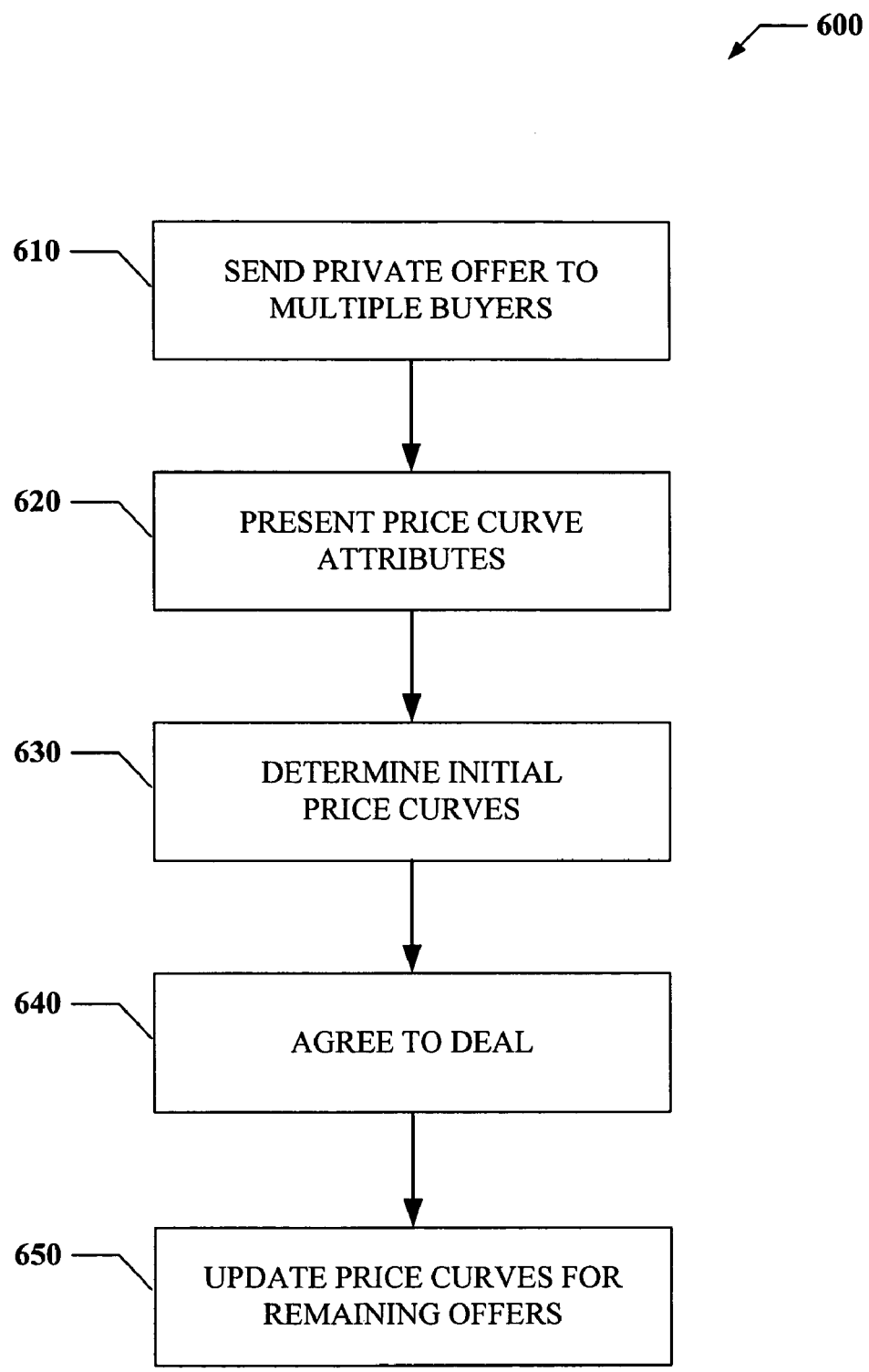
FIG. 6 is a flow chart diagram of a methodology for making private offers to buyers, in accordance with an aspect of the subject invention.

Turning now to FIG. 6, which shows a methodology 600 that relates to a deal based on private offers. At 610 a supplier can send out private offers to multiple buyers. A supplier may have, for instance, a rewards program for qualified buyers, or any of several reasons why he may want some buyers, but not all buyers, to see particular price curves and/or participate in a particular deal. For example, a supplier may want to offer a unique product, or a deal that carries extremely favorable terms to the buyers in order to garner new clients, etc. The supplier might not want all buyers to be able to participate in the offer, and, therefore, the supplier would likely not want the buyers who cannot participate in the offer to see the offer. Additionally, even though the offer can be made only to select buyers, not all of these select buyers need receive identical price curves or be aware of the price curves other buyers receive. However, a purchase made by one of the buyers for a private offer can impact the price curves for other buyers for the private offer.

At 620, the price curve attributes for the offer are presented to the participating buyers. The price curve attributes can be any number of factors that affect the deal, such as buyer order volume, orders to date by the buyer from the supplier, aggregate volume for all orders from the supplier, terms and conditions of the offer, terms and conditions of a different offer, time of shipment, and time of order placement, etc. The buyer or the supplier may further negotiate these price curve attributes, or establish new ones. At 630, the initial price curves for each buyer can be generated from the most up to date information, and presented to the buyers. Of course the initial price curves can be subsequently updated based on additional price curve attribute as described above. It is to be appreciated that price curves are not required to be merely curves on a graph. A price curve presented to a buyer could be any number of charts, graphs, calendars, product lists with dynamic prices, visuals in easy to understand format, and the like.

At 640, a deal between the supplier and one of the buyers can be agreed to. Hence, based upon the price curve attributes for the offer, at 650, the price curves not only for that buyer, but all buyers can be updated. For example, a private buyer may agree to purchase a very large volume for a product from the supplier. In turn, other buyers may see a reduced price based on aggregation factors. In essence, for any single buyer, the offer can change or morph depending on the activity and responses from other buyers.

Figure 7:
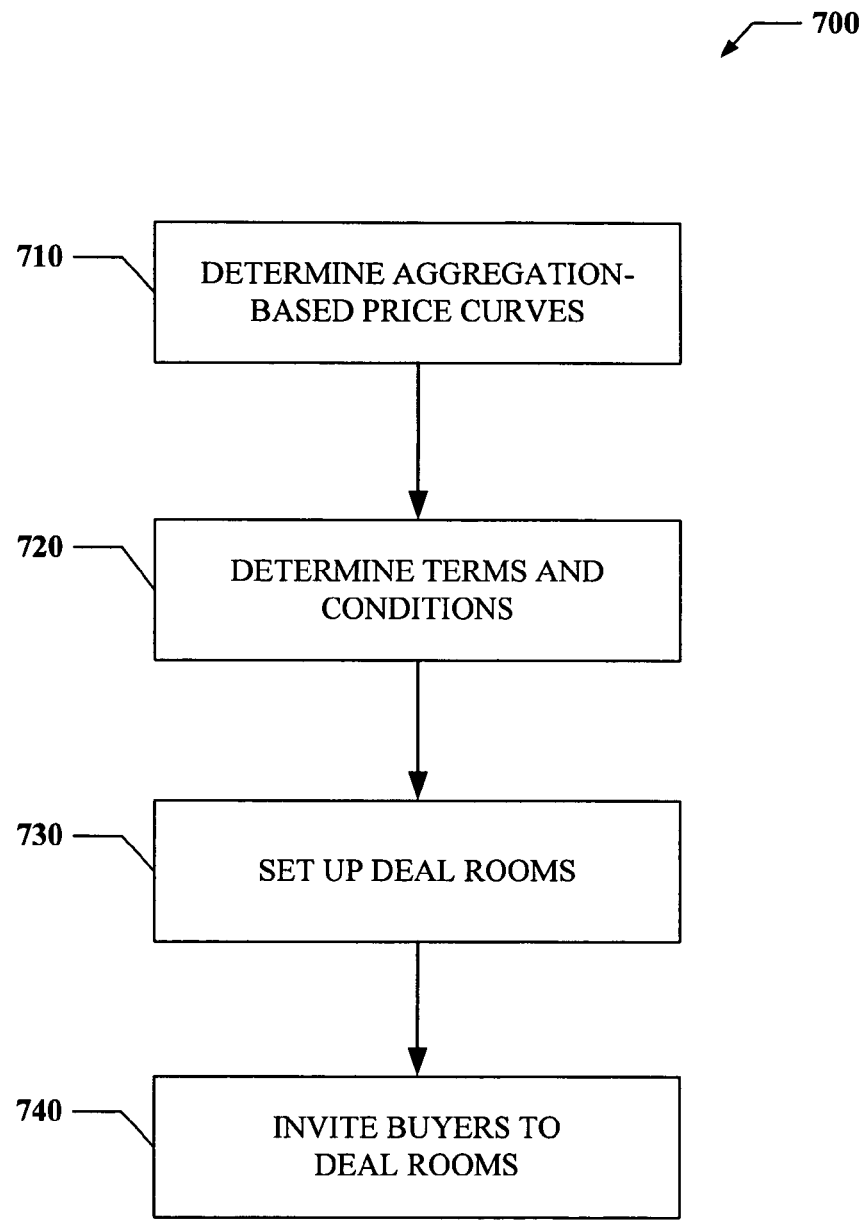
FIG. 7 is a flow chart diagram of a methodology creating private deal rooms by invitation only, in accordance with an aspect of the subject invention.

Turning now to FIG. 7, which shows a methodology 700 that relates to a private deal room where buyers are granted access only by invitation. At 710, aggregation-based price curves can be determined from the most current data available for the offer. At 720, the supplier can determine what terms and conditions (or any other price curve attribute) will be available based, for example, on what the supplier wants the buyer to consider and what he believes will be important to the buyer, or, perhaps, attributes that the supplier is willing to negotiate with the buyer. At 730, the supplier can communicate with the system to set up one or several private deal rooms, which is described in more detail below. At 740, the supplier can invite buyers to the private deal room(s) at the supplier's discretion.

Figure 8:
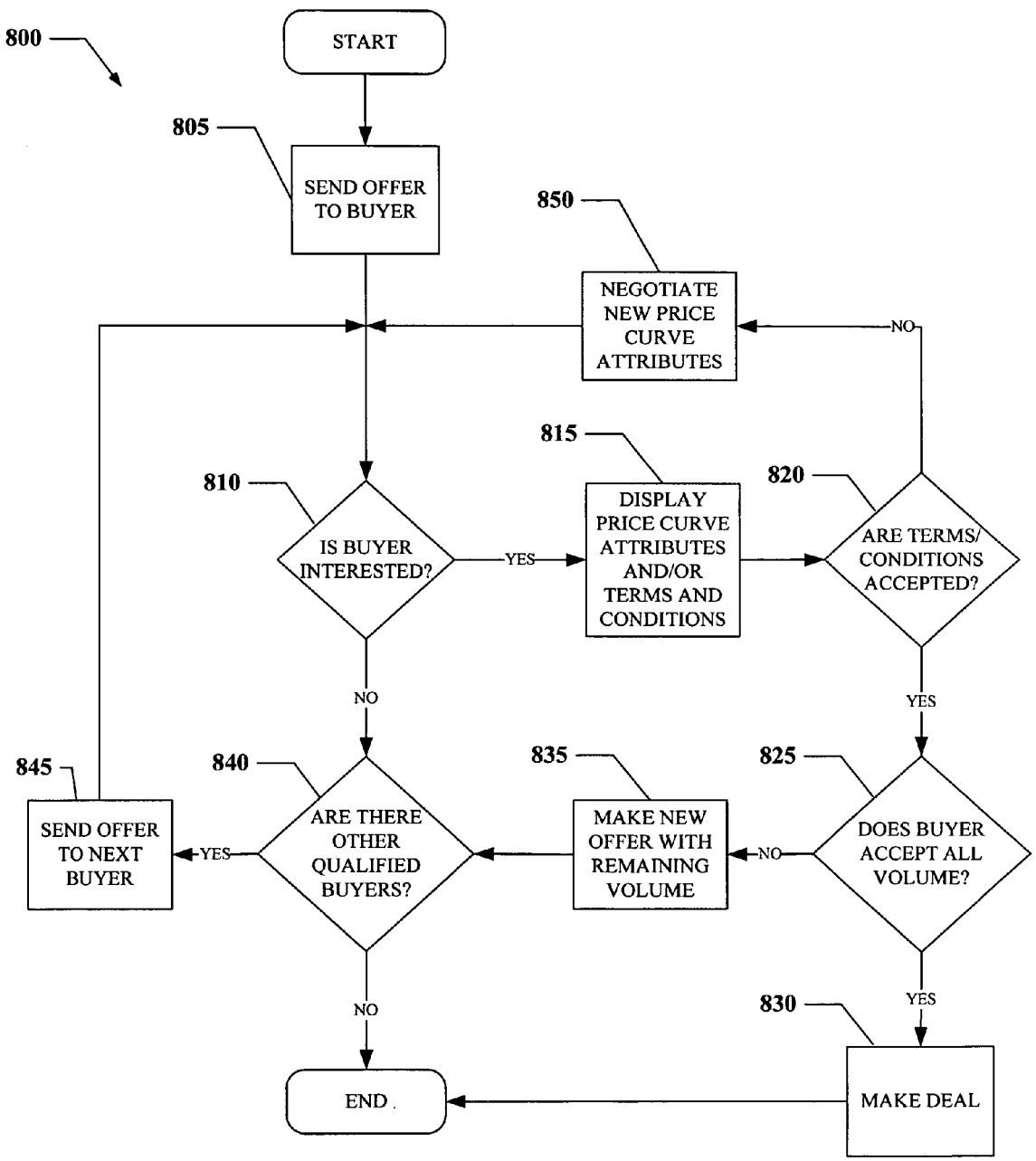
FIG. 8 illustrates a flow chart for a seller desiring to make an offer to selected buyers sequentially in accordance with one aspect of the subject invention.

Turning now to FIG. 8, a flow chart 800 is provided illustrating acts taken by a supplier who intends to offer a particular deal to buyers sequentially. In particular, at reference numeral 805 the supplier can send an offer to a first buyer or buying group. It is to be appreciated that such an offer can involve any number of technologies to facilitate interaction between a buyer and a seller such as teleconference, videoconference, net meetings and the like. At 810, it can be determined if the buyer is interested in the offer. If the buyer is not interested, the system will proceed to 840, however, as it is likely that the supplier will want to be informed immediately that the buyer is not interested in the offer so that the supplier can present the offer to other buyers. Therefore, the supplier could provide the buyer with incentives to respond quickly, for example, a favorable price curve attribute on another offer. At 840, the system determines if there are other buyers qualified to receive the offer. If not, the process ends, however, if there are additional buyers, the offer is sent to the next buyer in order at 845, and then returns to 810.

Continuing to refer to FIG. 8, at reference numeral 810, if the buyer is interested in the offer, the system proceeds to 815 where the buyer is presented with the price curve attributes the supplier has determined to be of import in the offer, such as buyer order volume, orders to date by the buyer from the supplier, aggregate volume for all orders from the supplier, terms and conditions of the offer, terms and conditions of a different offer, time of shipment, and time of order placement, etc. Next, at 820, the buyer can determine if the terms and conditions or other attributes for the deal are acceptable. If not, the system proceeds to 850, where new price curve attributes and/or terms and conditions can be negotiated, and the system can then return to 810 to determine if the buyer is still interested in the offer with the new set of attributes.

If, however, at 820, the buyer does accept the conditions of the deal presented by the supplier, the system continues to 825, where a determination can be made regarding the volume of the offer. If the buyer agrees to purchase the entire offered volume of the deal, then the system proceeds to 830, where a deal is made, then the process ends. However, if the buyer does not buy all the volume that is offered, another situation is presented. For instance, the supplier may desire to sell 100 units, while the buyer, although all other terms and conditions may be acceptable to him, only desires to purchase 50 units. In that case, the buyer can accept the offer for 50 units and the system proceeds to act 835, where the seller can make a new offer with the remaining 50 units (but all other price curve attributes the same as before, or modified as the buyer sees fit), then at 840, if there are other qualified buyers, proceed to location 845 and send the offer to the next buyer; or, if there are no other qualified buyers, terminate the process.

Figure 9:
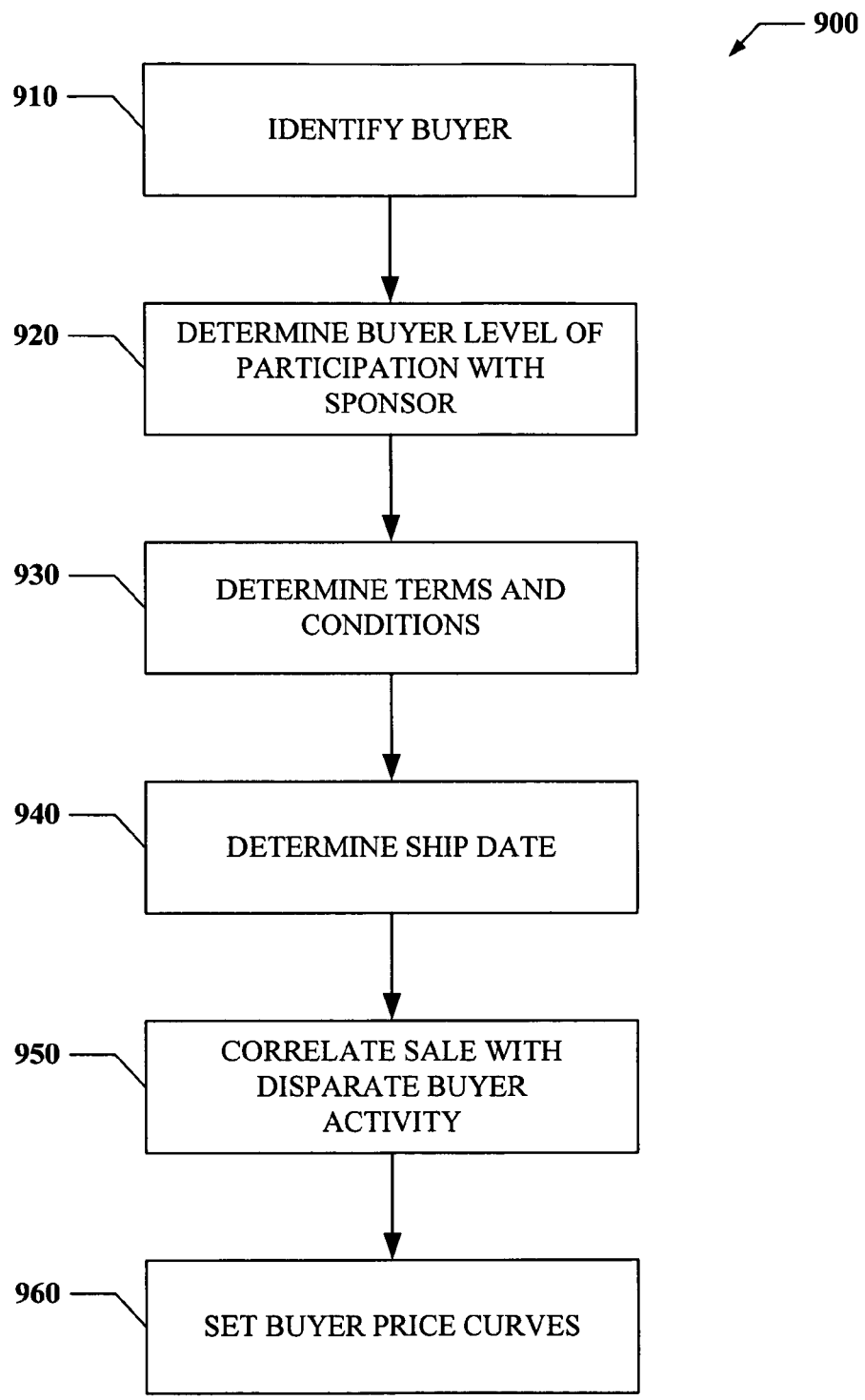
FIG. 9 is a flow chart diagram of a methodology to set a buyer curve, in accordance with an aspect of the subject invention.

Turning now to FIG. 9, which shows a methodology 900 related to the setting a price curve based on a plurality of factors related to the sale of one or more goods. At 910, a buyer is identified by the system via one of a plurality of methods. For example, a buyer can enter a public deal room in order to place an order for a specific good. In addition, a buyer can be identified as having access to a private deal room and thereby enter the private deal room. In order to provide the correct pricing scheme for the buyer, information relating to the buyer's past purchasing history may be needed. At 920, the buyer's history of participation with the deal room sponsor is determined. Such a history can include type of goods purchased, volume of goods purchased, payment history, etc.

It is to be appreciated that such a deal room can involve any number of technologies to facilitate interaction between a buyer and a seller such as teleconference, videoconference, net meetings and the like. In addition, such deal rooms can be private in that a single buyer (or a group with like characteristics) is exposed to his/her own price curve(s) related to the goods the buyer is interested in purchasing from the seller. In this manner, the supplier can adjust their pricing structure without danger of harming current potential business relationships with buyers which could occur if a buyer was aware of another buyer's pricing structure.

At 930, terms and conditions of a sale are determined between the buyer and the seller. Such terms and conditions can include: no cancellation of order, cancellation possible, tag and pull programs, and various payment options, for example. Also, a buyer can see a summary of the conditions available to vary the price of an order. Such a summary can include: starting price, next price, lower price, etc. Thus, a buyer can generate a plurality of "what if" scenarios to get a better understanding of how orders can achieve lower price points by changing buyer behavior. For example, "what would my combined price be if I want X slabs delivered in two weeks and Y slabs delivered in eight weeks?"

In addition, a supplier can have multiple aggregation curves available at the same time. In this manner, the curves can be affected differently when presented with the same changes to the same factors. For instance, a customer A can be sent a counter offer from their supplier, which in turn can affect delivery of one unit of goods by two weeks and/or provide a discount per unit of goods. Customer A can then accept or reject the counter offer based on the conditions given by the supplier. In this case, either the buyer or the supplier can modify substantially all of the terms of the offer by providing certain price and non price incentives to the other party in order to elicit the other party's acceptance of the new terms.

Alternatively, offers can be posted when the item is the least expensive. In this aspect, a buyer would not be aware of the offer for sale until the price is optimum. Additionally, a price curve may not be given; instead a listing of the product and the corresponding ship dates are included with the supplier's offer.

It is to be appreciated that terms and conditions can be associated with any price curve. Such terms and conditions govern buyer and seller transactions. For instance, a supplier can specify that an offer is good for a particular period of time. Additionally, a supplier can specify terms and conditions that indicate that an offer may increase over time.

At 940, a desired ship date of goods is determined. The ship date can relate to various price adjustments depending upon the date the customer expects the product to be delivered. Such prices can increase or decrease depending upon various supplier related factors such as existing orders, production schedule, availability and cost of raw materials. For example, a product under negotiation may be available immediately, or, for example, two weeks from now, or even eight weeks from now. In each case, the buyer might want to know what the price will be for a specific ship date vis-à-vis other ship dates in order to minimize the price paid relative to other considerations the buyer deems important.

Dynamic ship dates can also be employed such that the item is simply posted to a deal room when the item is the least expensive. Furthermore, a price curve does not necessarily have to be displayed with the dynamic ship dates option. Rather, a product list and ship dates with dynamic prices can be shown.

Moreover, optimal times can be given to a buyer wherein a "best price" can be available on a specified order date. Similarly, the optimal time for shipping goods can be provided to a buyer, which can relate to a shortened lead time for delivery, discount on shipping costs and the like.

At 950, the identity of the user combined with the terms and conditions and ship date of the sale are correlated to provide a price curve for this particular offer. Such activity could involve a disparate deal room wherein an offer is made for the same or different good as in the subject deal room. In addition, a correlation can be made between the disparate buyer history of participation with the seller. Thus, the terms of the offer, although distinct for each individual buyer can be correlated to modify such terms in the future.

At 960, the buyer price curve is set based on any number of factors above such the identity of the buyer, terms, conditions, ship date and the like. The price curve can vary as such factors change and/or remain the same based on an algorithm, program, etc. Price curves can be employed to provide a plurality of different aggregated offers for a specific good dependent on various factors, such as quantity. For instance, a buyer can enter the amount of goods and see one price curve for one slab, two slabs, three slabs, etc. If the buyer selects three slabs, he can see a price curve tied to the volume of all the people aggregating, even though the quantity ordered puts the buyer on a different curve than someone ordering one or two slabs, for example. After selecting the quantity desired, a buyer can select various desired terms and conditions related to the sale of the goods, such as: no cancellation of order—see a slightly different curve, a discount of 2% taken from final price; cancellation possible—see a curve that is higher, a premium of 5% charged to final price; tag and pull program for 60 days—add 3% to price; and payment option: pre-pay—same as above, net 10 terms, etc.

Each variable can reflect a different price than is shown on the curve immediately as well as potentially on all price points. An increase in price based on such above conditions can be mitigated if the buyer orders a large enough volume (e.g., three slabs ordered would then negate a surcharge on tag and pull program, or extend the program to 90 days, or any number of variables).

A buyer can see total volume ordered to date on this product (or other products)—once a minimum threshold is reached by the buyer as determined by a supplier in this case, the price curves going forward adjust based on the software configuration. For instance, a buyer who has ordered fifty slabs to date now sees a lower price curve even though he in fact may be ordering the same amount as someone else on that particular order.

Another variation of this theme is a buyer who belongs to a larger organization with a larger volume than the other buyers receiving special pricing and/or options based on their size. The cumulative total would reflect all participating organizations.

Figure 10:
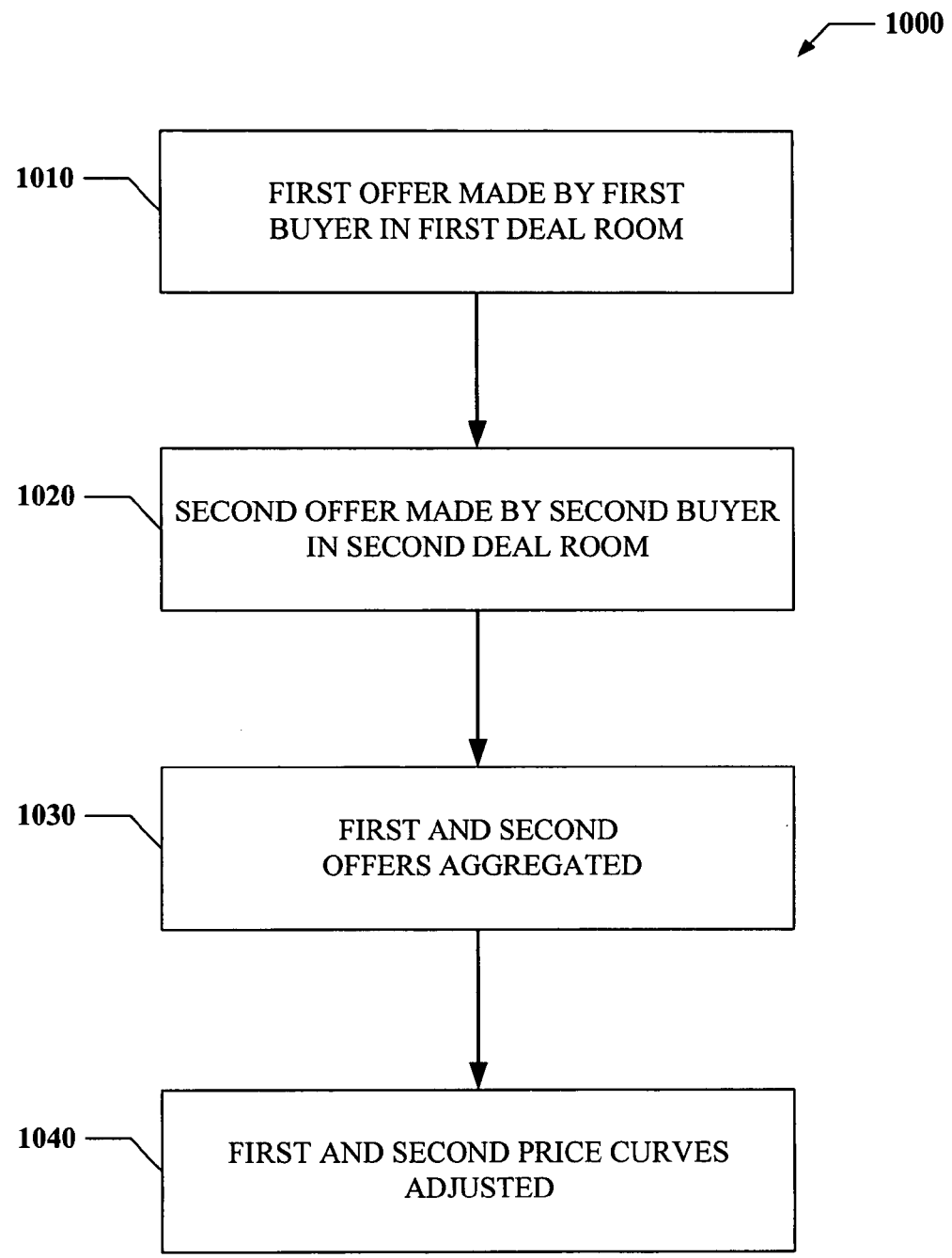
FIG. 10 is a flow chart diagram of a methodology to adjust a price curve, in accordance with an aspect of the current invention.

Referring now to FIG. 10, a methodology 1000 is depicted wherein price curves are adjusted based on the aggregation of offers. Demand aggregation can be employed by a sponsor (e.g., supplier) of a private location (e.g., a private deal room), which can result in myriad implications for buyers who are allowed access and/or are invited by the sponsor to participate. For example, a supplier can have 50,000 widgets for sale and send a private offer for these goods to five buyers who have a period in which to accept. The offer can be dynamic such that the offer for any given buyer can change or morph depending upon the activities and responses of the other buyers.

In addition, the potential buyers and/or groups of buyers can be prioritized which can allow certain buyers or buying groups to be offered the deal before others (e.g., sequentially—one group, than another, then another). In essence, such a structure would create a "right of first refusal" for select buyers that have a higher level of priority with a given sponsor. In a single deal room, a plurality of offers can be made available to a buyer. For instance, 100 buyers can see 100 different offers based on their own particular situations, yet, the activity of each buyer can be connected to and affect the other buyers. Additionally, activity in one private environment can have a direct or indirect impact on another private environment. For example, offers, terms and conditions, prices, options, ship dates, etc. can change or stay constant as a result of the sponsor's underlying offer mechanics.

Moreover, various views can be employed to present offers. For example, one view could be a price curve, another could be a calendar showing price variations based on the number of offers accepted. Offers could be displayed in any number of different formats including charts, graphs and other visuals to display the offers in an easy to understand format.

In addition, an "offer save" feature can be employed wherein a buyer can save a chart online, freeze an offer, etc. In some cases, freezing an offer can be a requirement from a supplier for a buyer to participate in a given price curve. In addition, terms and conditions made by the buyer can affect the pricing. For example, specific terms and/or conditions can indicate an offer can increase over time.

A buyer can receive and/or retrieve offers in any number of formats employed by various platforms such as a PDA, email, internet hyperlink, phone, etc. Such offer data can be saved and categorized to allow a buyer to access such information at a later time. Additionally, a timer or alarm can scheduled so that the buyer is notified when a new offer is available, when an offer is about to expire, etc.

According to an aspect of the invention, price curves can be displayed to buyers or potential buyers in private deal rooms. That is, a buyer or a plurality of buyers in one deal room see and are able make a purchase according to one price curve, while a buyer or group of buyers in yet another private deal room view and are able to make purchases according to a different price curve. Accordingly, price curves directed at particular buyers or potential buyers can be distinct and separate from those directed at others. However, price curves can be dependent on other price curves. Activity in one private environment can have a direct or indirect impact on another private environment—offers, terms, conditions, prices, options, ship dates, can change or stay constant as a result of a sponsor's underlying offer mechanics.

At 1010, a first offer is made by a first buyer in a first deal room. Such an offer can be made remotely or locally and can employ any number of technologies to facilitate communication between a buyer and the seller. It is to be appreciated that the offer made by the first buyer can be based on the specific price curve given to the buyer. Such a price curve can be set utilizing the methods described in FIG. 9 or any number of other desired methods. At 1020, a second offer is made by a second buyer in a second deal room. Such an offer can be made before, after or simultaneous to the first offer made at 1010. The second offer can be independent of the first offer and a common seller can be the only party aware of both offers. Thus, the private deal room structure can allow a seller to make changes to the price curves as they relate to each other.

The subject invention also contemplates employment of offer saves. Offer saves allow a buyer to freeze and offer online, for example, by saving a chart online. In accordance with one aspect of the invention, a supplier may make offer saves a requirement to participate with respect to a price curve.

At 1030, the offers made by the two buyers are aggregated. Data related to each offer such as ship date, delivery date, cost etc. can be compared using any type of relationship to determine a desired output (e.g., average cost, median lead time, total volume, etc.) After such data is gathered and manipulated, the seller can make adjustments to the amount a buyer will pay for specified goods. At 1040, the price curves for the first and second buyers can be adjusted. Such changes can be based on one or more data points related to the offers, as noted above. In this manner, incoming offers can be aggregated and benefit substantially all the buyers associated with the seller. In addition, a seller can exercise greater control over the planning and production of goods for sale.

Figure 11:
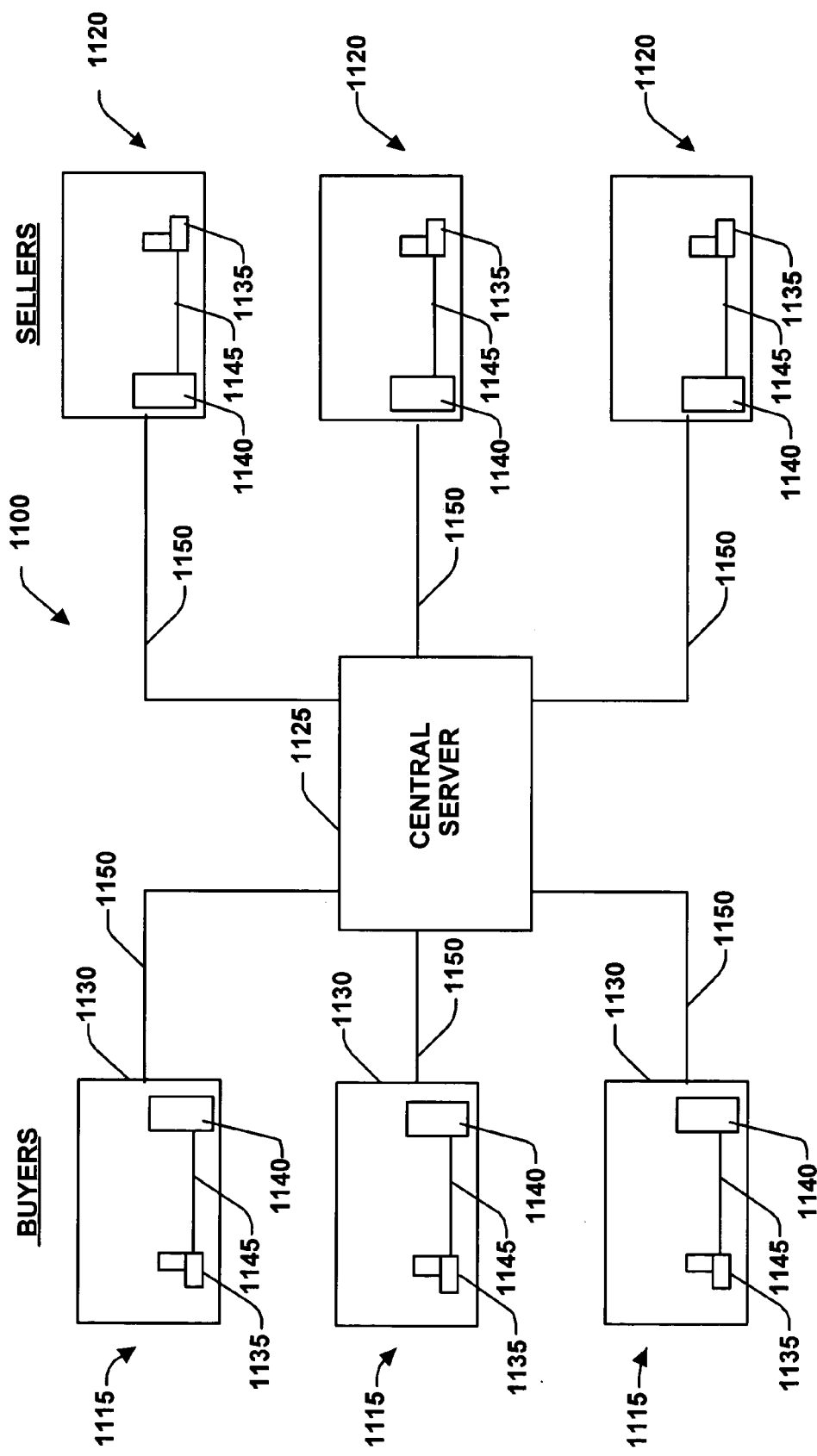
FIG. 11 is a diagrammatic view of a system for electronically conducting business in accordance with one aspect of the subject invention.

Referring now to FIG. 11, a system 1100 is shown in which multiple buyers 1115 and sellers 1120 are electronically linked via a central server 1125. As discussed in more detail below, the central server 1125 is configured to provide the buyers 1115 and sellers 1120 with a convenient forum in which to buy and sell goods in accordance with a multiple criteria buying and selling methodology described herein. The forum may, for example, be a pre-established Internet web page where sellers 1120 are able to post product information and the buyers 1115 are able to order products. The multiple criteria buying scheme calls for a seller 1120 to post a number of deals for a given product, which vary according to different offering criteria defining the limits of a number of selling criteria, such as for example, price, volume, quality and delivery time. Each buyer 1115 is able to enter a range of criteria that the buyer would require for a deal to be made. A list of sellers and prospective deals offered by these sellers is generated for the buyers to review. Each buyer 1115 can then review the list of deals and choose a deal based on the buyer's particular needs. In this manner, each of the buyers 1115 can be certain that particular thresholds have been met and also be guaranteed of completing a deal.

It is to be appreciated that the subject invention has wide applicability to the purchasing and/or selling of a variety of different products and/or services. For example, the subject invention may be applied within the context of purchasing and/or selling airline tickets wherein buyers' criteria may include, for example: (1) reputation of airline; (2) reliability; (3) timeliness; (4) price; (5) number of alternative flights; (6) comfort; (7) quality of service; and (8) quality of foods. The sellers' criteria may include, for example: (1) volume of tickets; (2) buyer's versatility in time schedule; (3) buyer's method of payment, etc.

The subject invention may also be applied in the context of purchasing and/or selling an automobile wherein buyers' criteria may include, for example: (1) reputation of automobile manufacturer; (2) reputation of dealer; (3) price of automobile; (4) delivery options; (5) automobile availability; (6) safety; and (7) financing terms; etc. While, the seller's criteria may include, for example: (1) buyer's creditworthiness; (2) desired finance terms; (3) delivery requests of buyer; (4) delivery dates; etc.

Thus, the subject invention intends to allow buyers and/or sellers of products and/or services to pre-select a plurality of criteria prior to negotiating a deal for the product and/or service. Of course the pre-selected criteria will vary depending on the particular product and/or service. The scope of the subject invention as defined in the hereto appended claims intends to include any product and/or service (and plurality of pre-selected criteria associated therewith) suitable for deal-making in accordance with the subject invention.

Each of the buyers 1115 and sellers 1120 may access the central server 1125 in any of a variety of ways. For example, in the present aspect, each buyer 1115 and seller 1120 is shown to be part of separate establishments 1130 which include one or more respective computer systems 1135 and local servers 1140. The computer systems 1135 may, for example, be a desktop or laptop computer with a local area network (LAN) interface for communicating over a network backbone 1145 to the local server 1140. The local servers 1140, in turn, interface with the central server 1125 via a network cable 1150 or the like. It will be appreciated that while the present aspect depicts the computer system 1135 communicating with the central server 1125 via hardwired network connections, in an alternative aspect the computer system 1135 may interface with the central server 1125 using a modem, wireless local area and/or wide area networks, etc. Further, it will be appreciated, that while the buyers 1115 and sellers 1120 are shown to communicate with the central server 1125 via different computer systems 1135, it will be appreciated that the buyers 1115 and/or sellers 1120 may access the central server 1125 from the same computer system 1125.

Figure 12:
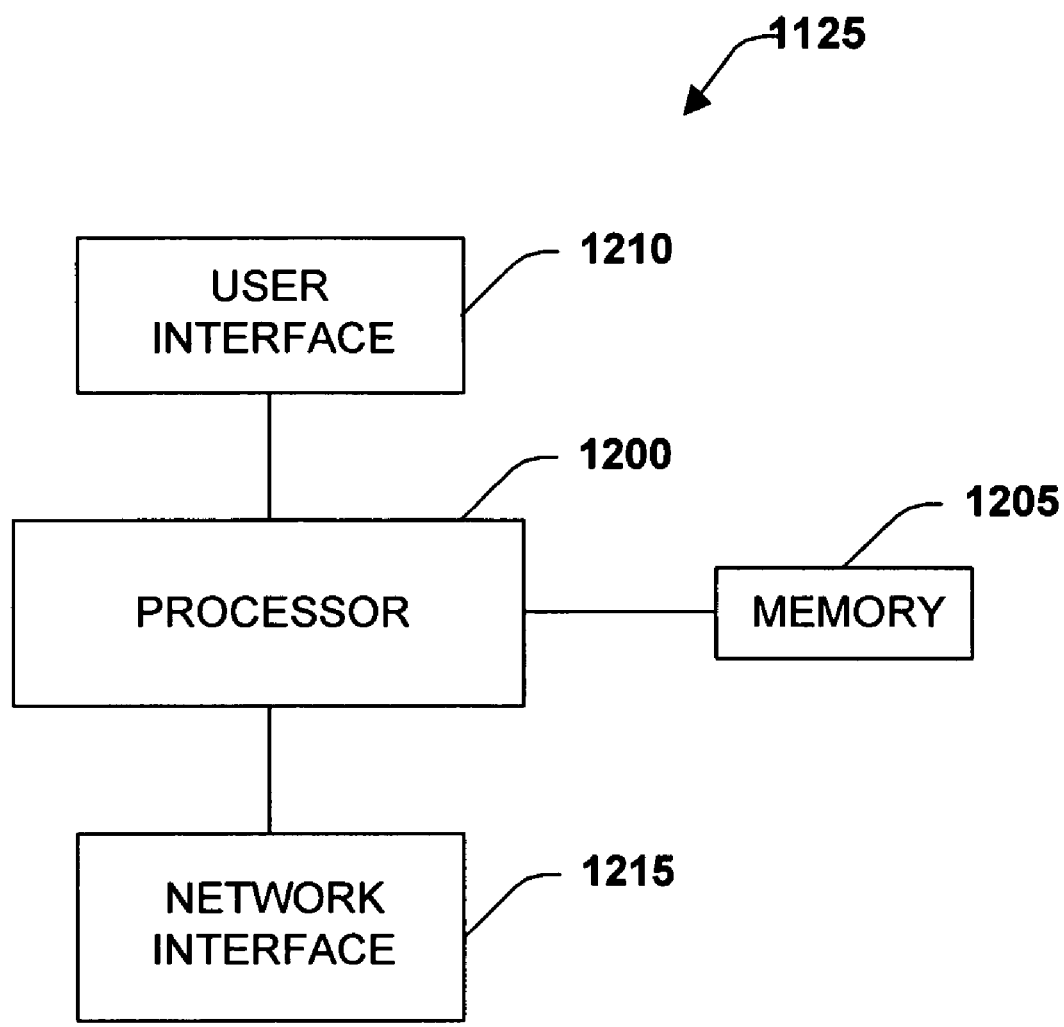
FIG. 12 is a block diagram of a central server in accordance with one aspect of the subject invention.

Turning now to FIG. 12, a block diagram of the hardware components of the central server 1125 is shown. In particular, the central server 1125 includes a central processor 1200 for performing the various functions described herein. A memory 1205 is coupled to the processor 1200 and stores operating code and other data associated with the operations of the central server 1125. A user interface 1210 is also coupled to the processor 1200 and provides an interface through which the central server 1125 may be directly programmed or accessed. The user interface 1210 may, for example, be an alphanumeric keyboard and mouse. A network interface 1215 coupled to the processor 1200 provides multiple connections for transceiving information with buyers 1115 and sellers 1120 over the network cables 1150.

Figure 13:
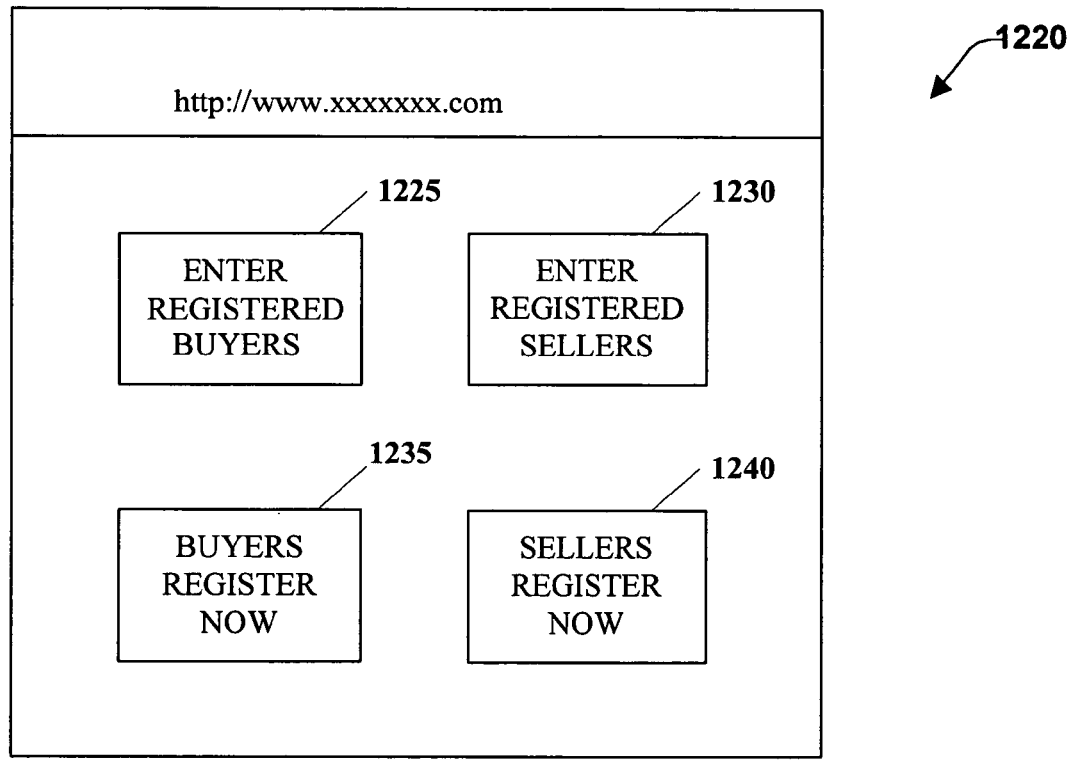
FIG. 13 is an exemplary web page that provides options to buyers and sellers desiring to conduct business electronically in accordance with one aspect of the subject invention.

Turning now to FIG. 13, an exemplary Internet web page 1220 that provides buyers 1115 and sellers 1120 with access to a forum for conducting business using the multiple criteria buying methodology is shown, described in detail below. The web page 1220 is shown to include hyperlinks for handling both registered and un-registered buyers and sellers of products. For example, as shown in FIG. 13, registered buyers may select a hyperlink to a registered buyer login screen via hyperlink 1225 while non-registered buyers may select a hyperlink to a non-registered buyer registration screen via hyperlink 1235. Similarly, registered sellers may select a hyperlink to a registered seller login screen via hyperlink 1230, while non-registered sellers may select a hyperlink to a non-registered seller registration screen via hyperlink 1240. While the present aspect illustrates separate hyperlinks for buyers and sellers, it will be appreciated that such hyperlinks could alternatively be combined and the status of buyer or seller could be determined during a later stage in the login procedure.

Figure 14A:
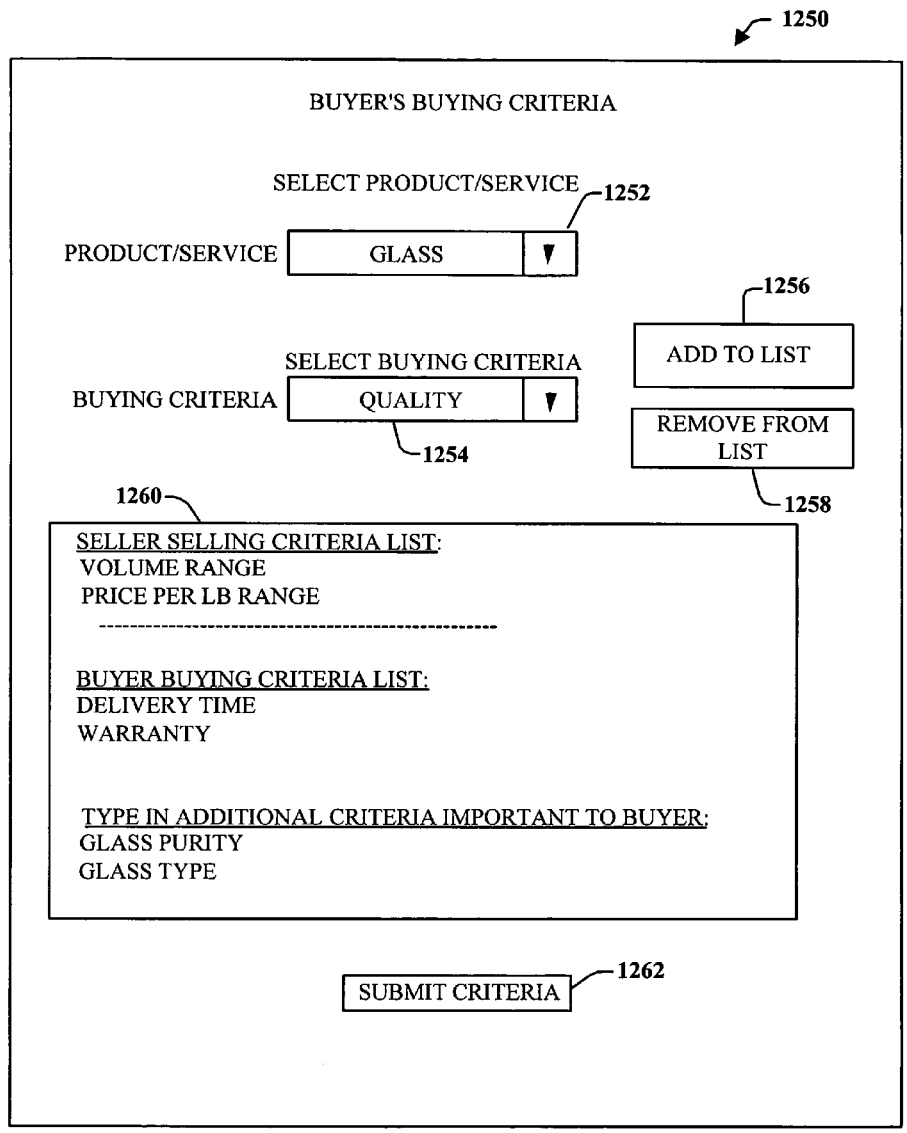
FIG. 14a illustrates an exemplary buyer's buying criteria input screen in accordance with one aspect of the subject invention.

Turning now to FIG. 14*a*, in accordance with one aspect of the subject invention, registered buyers 1115 enter various buying criteria into a "Buyer's Buying Criteria" input page 1250. The buyer 1115 selects a product or service from a list in a scroll down menu 1252. It should be appreciated that the list on the scroll down menu 1252 could include any number of related or non-related goods and services only limited by the size of a database used in accordance with the subject invention. Upon selecting a product or service (e.g., glass) from the scroll down menu 1252, a list of seller criteria automatically appears in a window 1260. The list of seller criteria appearing in the window 1260 is the minimum inputs to be provided by the buyer to obtain a deal listing. These minimum inputs are decided by the class of sellers selling the individual product or service and/or decided by the system administrator of the system. The buyer 1115 can then begin adding buyer buying criteria by selecting the criteria from a scroll down list 1254, and clicking on an "Add to List" button 1256 with a computer mouse (not shown), for example. If the buyer 1115 desires to remove a buyer buying criteria, it is only necessary to highlight the criteria in the window 1260 and click on a "Remove from List" button 1258. Once the list is completed, the buyer 1115 may add additional criteria thought to be important to the buyer not in the selection of choices. These additional criteria will not be used by the buyer in this particular deal search, but will be provided to the sellers, so that they can be alerted of these additional criteria important to the buyer. The seller may opt to add to the criteria that are available from the scroll down menu 1252. These additional criteria will then become available for buyers to select as their buying criteria at a later time. Once the complete custom buyer buying criteria list is completed, the buyer can click on the "Submit Criteria" button 1262 for submission of the buyer's buying criteria to build a "Buyer's Product Ordering Criteria" input screen 1265, as illustrated in FIG. 14*b*.

Turning now to FIG. 14*b*, in accordance with one aspect of the subject invention, registered buyers 1115 enter several product ordering criteria that would be acceptable to the buyer 1115 on the "Buyer's Product Ordering Criteria" input screen 1265. In this particular example, the buyer 1115 is looking to purchase raw glass by the pound, however, many different types of products and services could be purchased/sold using the subject invention. The buyer's ordering criteria of this example includes: price range 1266 in dollars per pound; volume range 168 in number of pounds; delivery range 1270 in days; the acceptable percentage of defects 1272; and the minimum required warranty 1274 in months. The buyer 1115 can then list the names of the sellers 1120 in the window 1276 that the buyer 1115 has bought products from previously, so that the buyer 1115 can be entitled to any good customer or multi-purchase discounts offered by the sellers 1120. Once the buying ordering criteria are entered, the buyer can search for deals by clicking on the "Search for Deal" button 1278 on the computer screen using the computer's mouse. The subject invention then utilizes a search engine to search through a database of deals offered by various sellers of the product, and provides an output of those deals to the buyer that matches the buyer's ordering criteria by outputting a list of these deals on a "Deal Matching Ordering Criteria" output page 1280, as shown in FIG. 14*c*.

Turning now to FIG. 14*c*, in accordance with one aspect of the subject invention, registered sellers 1120 set up a variety of deals 1282 by which registered buyers 1115 are able to order products. As will be discussed in more detail below, the deals 1282 of the present aspect are set up to display the following information which is input from the seller 1120 and/or calculated by the processor 1200 of the central processor 1125 according to the deal 1282, which includes: a seller name 1284; a deal number 1286; a volume ordering range 1288 required to obtain a current price/pound level 1290; an expected delivery time 1292; a warranty period 1296; and a percentage of defects 1298 of the product the buyer 1115 can expect to receive in a given order. Based on such information, buyers 1115 can make informed decisions as to whether they desire to commit to an order on a particular deal based on the criteria that is important to that particular buyer. If a buyer 1115 desires to place an order, the buyer 1115 inputs a seller 1283, a deal number 1285 and a volume order 1287. The buyer 15 then clicks on the "Submit Deal" button 1289 with a mouse pointer, for example, on the computer display and the deal is finalized.

Figure 15:
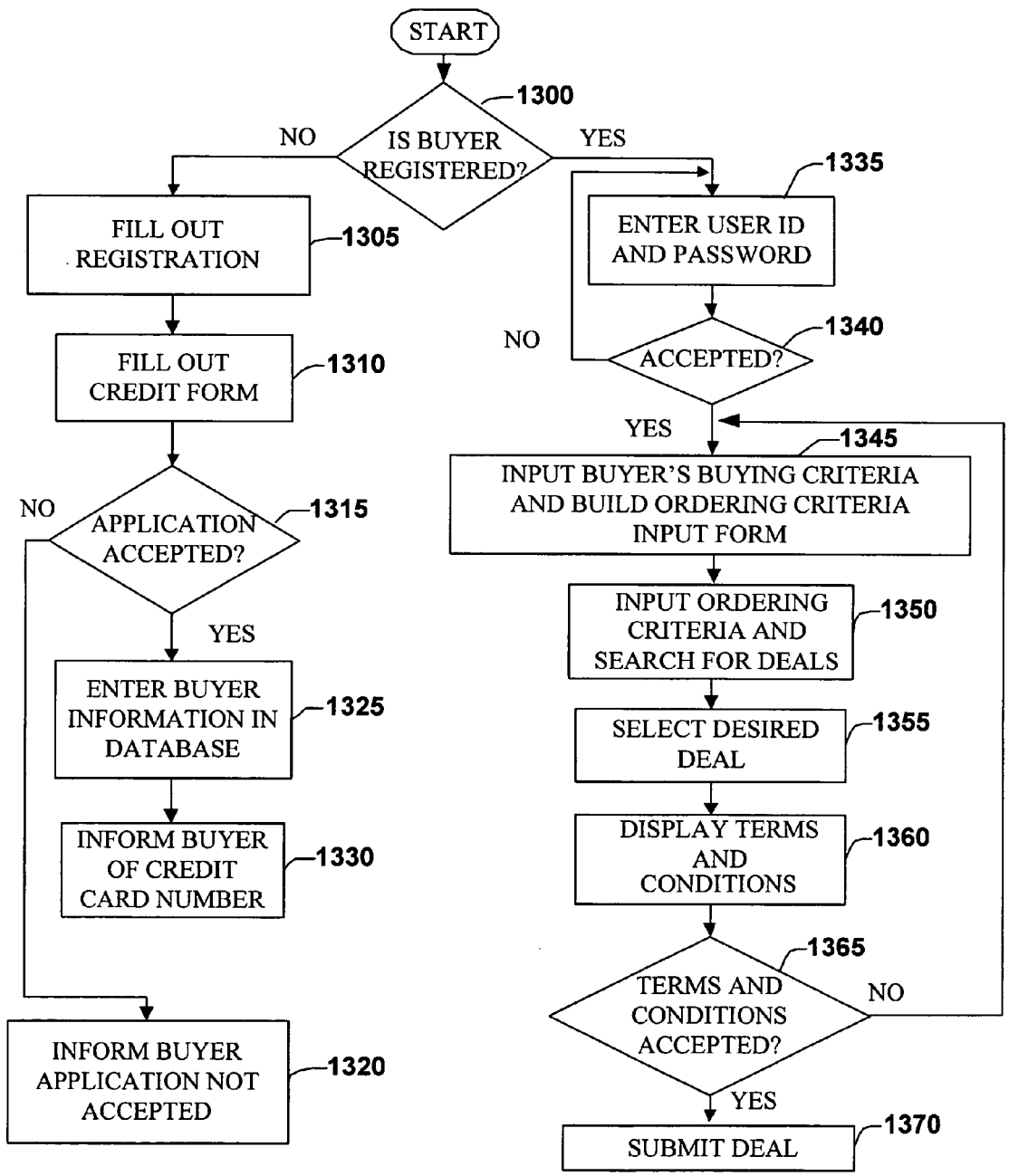
FIG. 15 is a flow chart for a buyer desiring to conduct business electronically in accordance with an aspect of the subject invention.

Turning now to FIG. 15, the general steps taken by a buyer 1115 entering the web page 1250 are shown. More particularly, in reference numeral 1300 it is initially determined whether a buyer 1115 is registered or not. If the buyer 1115 is not registered, the buyer 1115 selects hyperlink 1235 (FIG. 13) and proceeds to act 1305. At 1305 the processor 1200 of the central server 1125 requests that the buyer 1115 fill out a registration form. For example, the buyer 1115 is requested to fill out a registration form 1308 such as that shown in FIG. 16. In the present example, the registration form 1308 requests that the buyer 1115 enter the following information: buyer name; address; primary contact person; phone; fax; e-mail; short description of company; preferred login user name; and preferred password. With respect to the user name and password, the processor 1200 is configured to determine whether the selected user name and password combination are available and, if not, to prompt the buyer 1115 to enter a new user name and password until an available combination is selected.

At 1310 (FIG. 15), the buyer is requested to fill out a credit card application so that purchases made on the web site may be immediately approved. The credit card registration and approval process may be accomplished via a hyperlink to one of various electronic credit card approval agencies that check the buyer's credit rating and set up a merchant account with a line of credit. For example, an electronic credit card approval agency, which may be used in conjunction with the subject invention, can be found on the Internet at "http colon slash slash www dot interent-ecommerce dot com." Next, at 1315, the processor 1200 determines if the credit card application has been approved by the electronic credit card approval agency. If the credit card application has not been approved, the processor 1200 proceeds to location 1320 where a message is sent back to the buyer 1115 indicating regret that they have not been approved for a line of credit and therefore have not successfully completed the registration process. At 1320, a customer service telephone number also is provided to the buyer 1115 in case the buyer has questions and/or desires to pursue registration further.

If at 1315, the processor 1200 is informed that the buyer 1115 has been provided a line of credit and a credit card number has been issued, the processor 1200 proceeds to 1325. At 1325 the buyer information from the registration form 1308 and the newly issued credit card number are stored in a buyer database 1370 (FIG. 17) in the memory 1205 of the processor 1200 (FIG. 12). Next, at 1330, the processor 1200 is configured to provide the buyer 1115 with the newly issued credit card number so that the buyer 1115 is able to purchase products and/or services. Furthermore, the processor 1200 is configured to provide a report to the system administrator who then mails a confirmation copy of the buyer's information stored in the buyer's database to the buyer 1115.

Continuing to refer to FIG. 15, if at 1300, a buyer has already registered, the buyer 1115 may login as a registered user by selecting the registered user hyperlink 1225 (FIG. 13). Once selected, the processor 1200, at 1340 prompts the buyer 1115 to enter a user ID and password. Upon entry of such information, the processor 1200 at 1340 verifies the user ID and password with those stored in the buyer database 1370 (FIG. 17). If the user ID and password entered by the buyer 1115 does not match any entry in the buyer database 1370, the processor 1200 at 1340 returns to 1335 for re-entry of such information. If, however, at 1340, a valid user ID and password are entered, the processor 1200 proceeds to 1345.

At reference numeral 1345, the processor 1200 provides the buyer 1115 with a buyer's buying criteria input screen where the buyer 1115 is able to enter a variety of buying criteria that is important to that particular buyer 1115. The buyer 1115 selects a plurality of buying criteria and submits the criteria, so that the system can build an input ordering criteria form. At 1350, the buyer 1115 enters the range of ordering criteria that is acceptable to the buyer in the input ordering criteria form and then submits this criteria, causing the system search engine to match the ordering criteria with a list of seller deals in a seller deal database. The search engine then lists the seller deals matching the buyer's buying and ordering criteria. As discussed above, the deals 1282 provided to the buyer 1115 provide the buyer 1115 with information regarding the sale of a particular product such as, for example, the volume range to get a particular price per pound, the delivery time, the warranty period and the percentage of defects in each order that a buyer can expect. In order to allow a buyer to quickly find deals 1282 of interest, the processor 1200 at 1345 provides the buyer 1115 with the input "Buyer's Buying Criteria" input screen 1250, so that active deals 1282 of interest may be found.

Once a search is completed, the buyer 1115 at reference numeral 1350 is able to select a desired deal 1282 from the results obtained. For example, the buyer 1115 may choose a desired deal because it has a faster delivery time than the other deals. The buyer 1115 may choose a deal because it has a low percentage of defects, or has a longer warranty than other goods. Irrespective of which deal the buyer 1115 chooses, the buyer 1115 can make an informed decision based on a variety of buying criteria. If the buyer 1115 is unsatisfied with the search results or simply desires to re-perform the search, the buyer 1115 at any time is able to return back to a previous screen selecting the "back" function available using an Internet browser such as, for example, Microsoft Internet Explorer, Netscape, etc. Additionally, a hyperlink to various screens, such as the search screen, preferably is provided on each web page.

Upon selecting a deal 1282, the processor 1200 at 1355 displays a page of standard terms and conditions, which the buyer 1115 must agree to prior to completing the deal. The terms and conditions relate to the terms governing the sale of the product or service according to which both the buyer and seller are willing to conduct business. If the terms and conditions are not accepted, the processor 1200 returns the buyer 1115 to 1345, so that another deal 1282 may be selected and/or another search may be performed. If, however, at 1360 the terms and conditions are accepted, the processor 1200 proceeds to allow the buyer 1115 to complete the deal at act 1365.

Figure 18A:
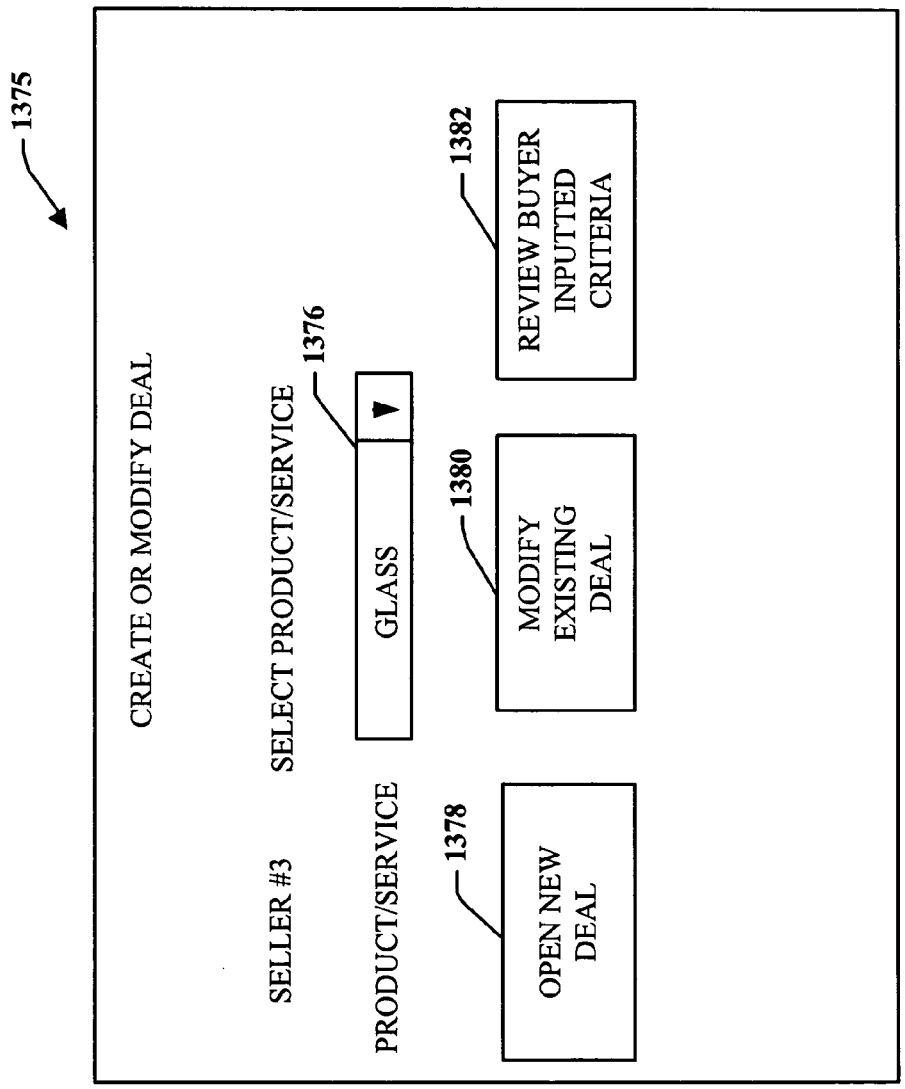
FIG. 18a illustrates an exemplary web page for a buyer to create or modify a deal in accordance with one aspect of the subject invention.
Figure 18B:
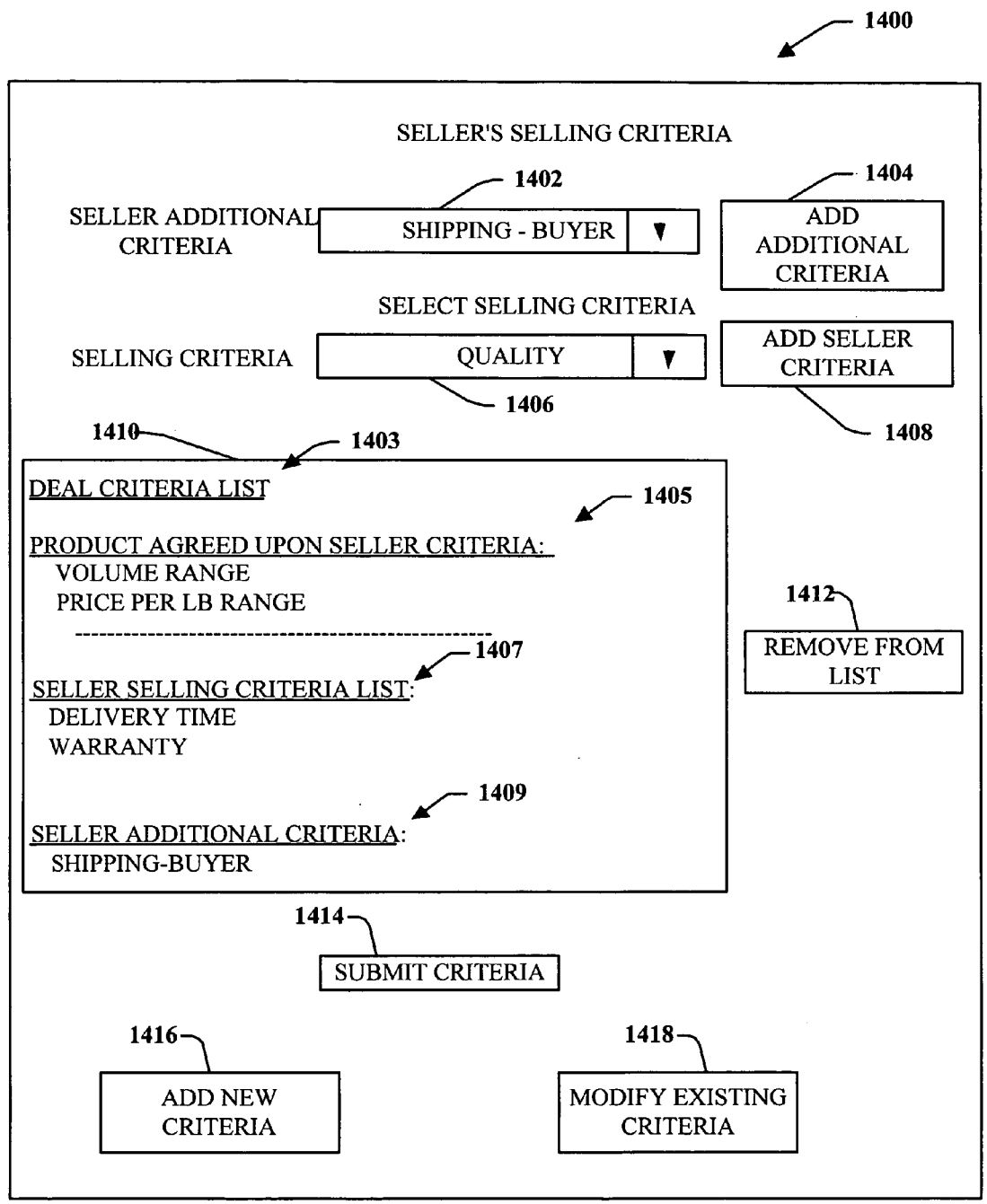
FIG. 18b illustrates a seller's buying and selling criteria input screen in accordance with one aspect of the subject invention.

Turning now to FIG. 18a, in accordance with one aspect of the subject invention, registered sellers 1120 enter into a "Create or Modify Deal" screen 1375. The seller 1120 can choose a product or service from the product/service scroll down menu 1376 and choose to either click on an "Open New Deal" button 1378, a "Modify Existing Deal" button 1380 or a "Review Buyer Inputted Criteria" button 1382. If the buyer selects the "Review Buyer Inputted Criteria" button 1382, the seller will be provided with a list of buyer buying criteria that the buyers 1115 manually inputted into the window 1260 of FIG. 14a. This allows the sellers 1120 to review criteria that are important to their buyers, which the seller was not aware. If a seller 1120 chooses to click on the "Open New Deal" button 1378, the seller 1120 will enter into a "Seller's Product Selling Criteria" input screen 1400, as illustrated in FIG. 18b. If the seller 1120 chooses to click on the "Modify Existing Deal" button 1380, the seller 1120 will enter into a "Seller's Product Offering Criteria" input screen 1430, as illustrated in FIG. 18c with the seller being prompted to enter a deal number, which causes the ordering criteria of the chosen deal number to be modifiable in the input screen.

Referring to FIG. 18b illustrating the "Seller's Selling Criteria" input screen 1400, the seller 1120 can begin building a new deal by first selecting a number of seller additional criteria, and seller criteria from a list in a scroll down menu 1402 and a list in scroll down menu 1406, respectively. The seller can click on the "Add Seller Additional Criteria" button 1404 for adding seller additional criteria from the scroll down menu 1402 into a window 1410 containing a deal criteria list 1403. The deal criteria list 1403 includes a first portion listing the "Product Agreed upon Seller Criteria" 1405, decided by the group of sellers for a particular product/service and/or the system administrator, a second portion which is the seller criteria list 1407 and a third portion which is the seller additional criteria list 1409. It should be noted that the criteria in the seller additional criteria list is not a mandatory criteria for the buyer when the buyer is inputting the buyer's buying criteria in at reference numeral 1345 of FIG. 15, but is listed in the terms and condition at 1365 after a deal is chosen by the buyer. The seller can add seller criteria by selecting the criteria from the scroll down bar 1406 and clicking on the "Add Seller Criteria" button 1408. The seller can remove any of the criteria from the overall criteria list, except for the "Product Agreed upon Seller Criteria", by highlighting the selection with the computer mouse and clicking on a "Remove from List" button 1412. The seller 1120 can add new selling criteria by clicking on a hyperlink 1416 labeled "Add New Criteria" sending the seller 1120 to an "Adding and Modifying Deal Criteria" screen 1460, illustrated in FIG. 18d. The seller can modify the current criteria by highlighting the criteria in window 1410 and clicking on a hyperlink 1418 labeled "Modify Existing Criteria" sending the seller to the "Adding and Modifying Deal Criteria" screen 1460 with the criteria information defaulting to the highlighted criteria for modification therefrom.

Figure 18C:
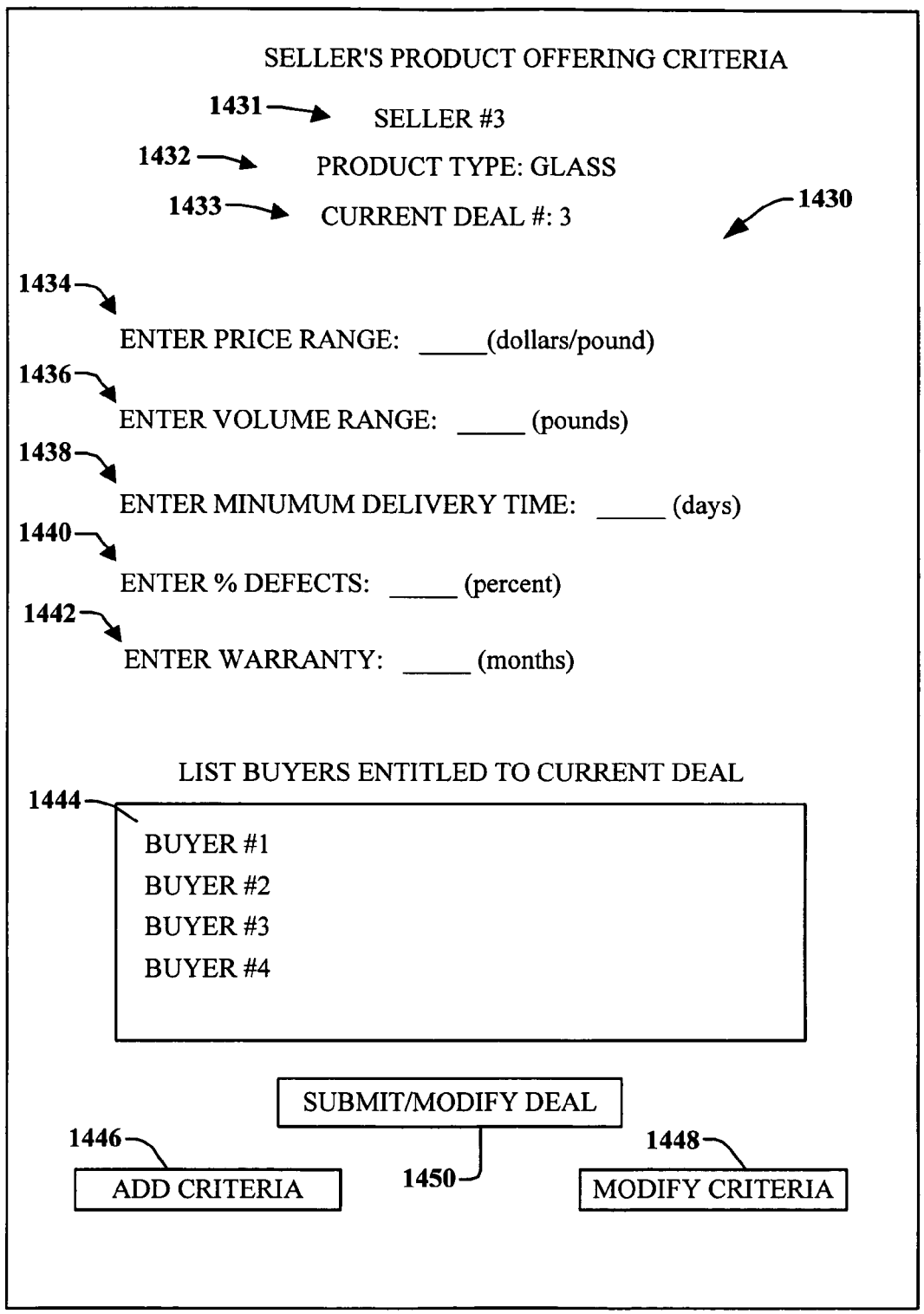
FIG. 18c illustrates a seller's product ordering criteria input screen in accordance with one aspect of the subject invention.

Referring now to FIG. 18c, once the criteria are selected and submitted, the system generates the "Seller's Product Offering Criteria" input screen 1430. A seller number 1431, a product type 1432 and a current deal number 1433 are automatically generated at the top of input screen 1430. The seller 1120 can enter offering limits relating to the selling criteria of the seller's product for a particular deal. The seller's offering criteria of this example includes: price 1434 in dollars per pound; volume range 1436 in the number of pounds; delivery time 1438 in days; the percent of defects 1440; and the warranty 1442 in months. The seller 1120 can then list the names of the buyers 1115 in a window 1444 that the deal is being offered or type in the term "All" if the offer is open to any buyer. Once the seller offering criteria is entered, the seller 1120 can submit the deal by clicking on a "Submit/Modify Deal" button 1450 on the computer screen by using the computer's mouse. The subject invention then creates a record of the deal in a database of deals offered by various sellers 1120 of the product, so that deals which sellers' offering criteria match the buyer's ordering criteria can be outputted to the buyer 1115 in a list of deals on the "Deals Matching Ordering Criteria" output page 1280, as shown in FIG. 14*c*.

Figure 18D:
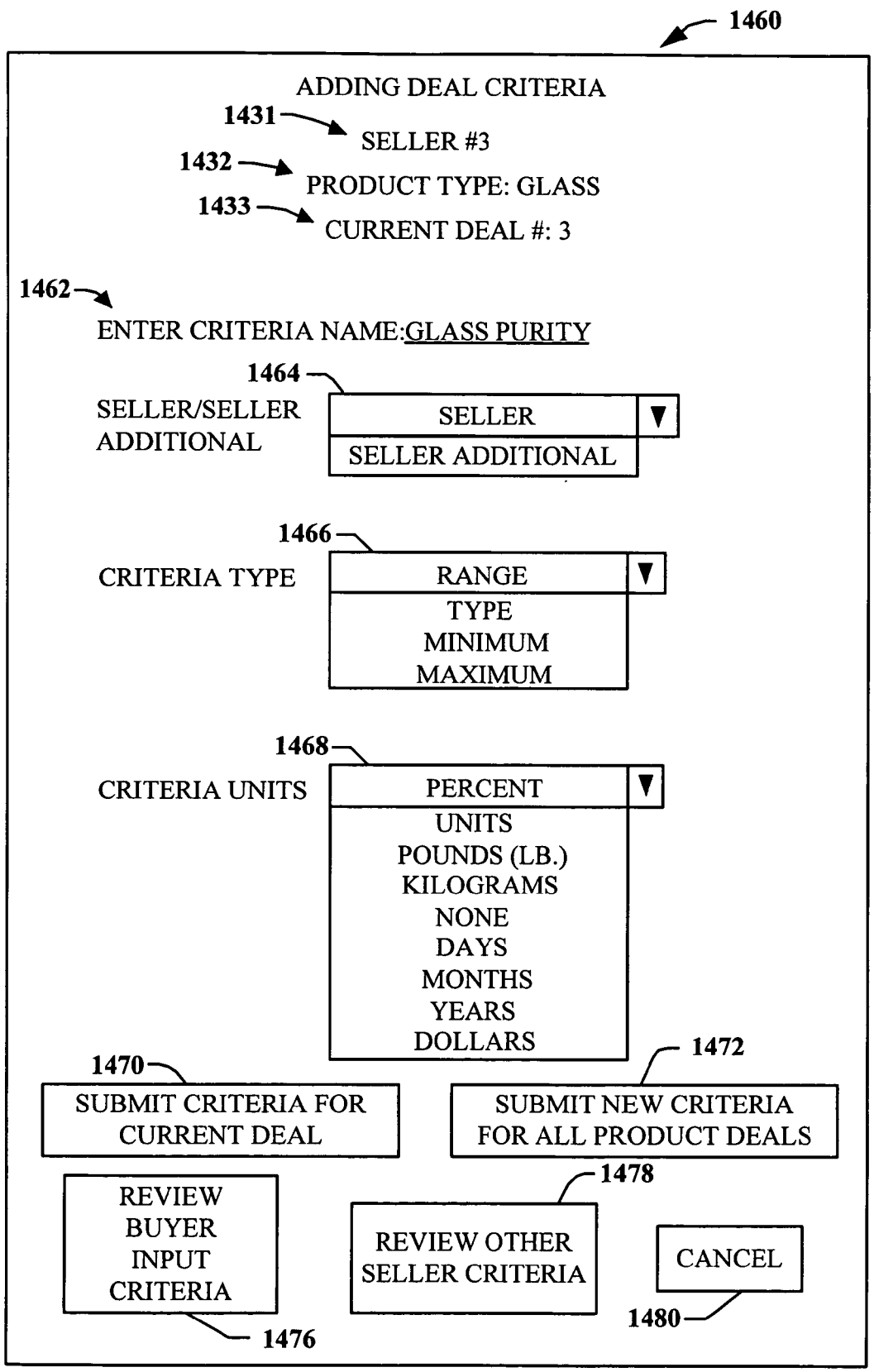
FIG. 18d illustrates an exemplary input screen for adding buying and selling criteria to the deal in accordance with one aspect of the subject invention.

Referring now to FIG. 18*d*, the "Adding Deal Criteria" input screen 1460 will be described. The seller number 1431, the product type 1432 and the current deal number 1433 are automatically generated at the top of input screen 1460. The seller 1120 can enter a criteria name in the "Enter Criteria Name" box 1462. The seller can then choose whether the criteria are a seller type or a seller additional criteria type from a first scroll down menu 1464. The seller 1120 chooses a criteria type from a second scroll down menu 1466 and the criteria units in a third scroll down menu 1468. The seller can submit these new criteria for the current deal by clicking on the "Submit New Criteria for Current Deal" button 1470 or add the new criteria for all the product deals by clicking on the "Submit New Criteria for All Product Deals" button 1472. The seller 1120 may at any time review the buyer inputted criteria submitted by the buyer 1115 that is not in any of the seller's deals by clicking on the "Review Buyer Inputted Criteria" button 1476. The seller 1120 can review this list to determine whether or not the seller 1120 would like to add these criteria to the present deal or all deals to ensure that they are in accord with buyer needs. The seller 1120 may also review the criteria that are offered by other sellers, but not the current seller, by clicking on a "Review Other Seller Criteria" button 1478. This will help the seller keep current on what the other seller's selling criteria are being utilized for matching to the buyer's buying criteria to satisfy the current market demands.

If the seller 1120 would like to return to the "Create or Modify Deal" screen 1375 the seller 1120 can click on the "Cancel" button at any time. Furthermore, if the seller 1120 simply desires to re-perform the search, the seller 1120 at any time is able to return back to a previous screen selecting the "back" function available using an Internet browser such as, for example, Microsoft Internet Explorer, Netscape, etc. Additionally, a hyperlink to various screens, such as the search screen, is preferably provided on each web page.

Figure 19:
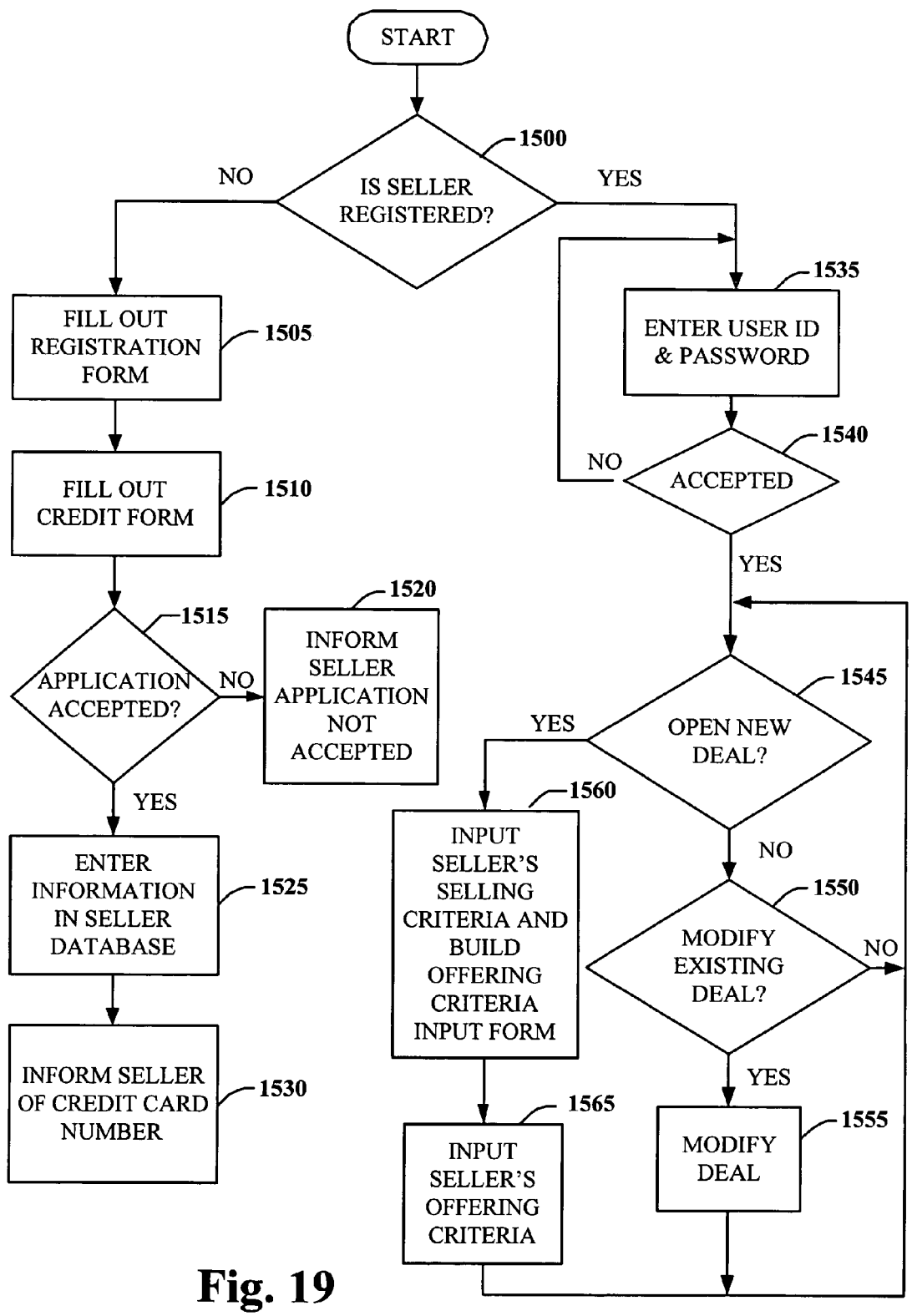
FIG. 19 is a flow chart diagram for a seller desiring to conduct business electronically in accordance with one aspect of the subject invention.

Proceeding now to FIG. 19, the operations of the processor 1200 of the central server 1125 in handling sellers 1120 is depicted. In particular, the processor 1200 at reference numeral 1500 initially determines whether a seller 1120 is registered or not based on which hyperlink 1230, 1240 (FIG. 13) the seller 1120 selects. If the seller 1120 selects hyperlink 1240 indicating the seller is not registered, the processor 1200 proceeds to 1505. At 1505, the processor 1200 provides the seller 1120 with a seller's registration form 1508 (FIG. 20) to fill out. The registration form 1508 is similar to the registration form 1308 for the buyer 1120 and allows the seller 1120 to select a preferred user ID and password. Once completed, the processor 1200 proceeds to 1510 where the seller 1120 is requested to submit a credit card application so that all costs and fees associated with conducting business may be directly billed to the seller's credit card. As discussed above, the credit card approval process may occur by a third party vendor accessible via a hyperlink.

Once the seller 1120 submits the credit card application, the processor 1200 proceeds to 1515 where the processor 1200 determines if the credit card application has been approved. If the credit card application has not been approved, the processor 1200 proceeds to reference numeral 1520 where the seller 1120 is informed that his or her credit card application has not been approved and the seller 1120 is provided with a customer service telephone number so that the seller 1120 may optionally set up the account in a different fashion. If, however, in 1515 the credit card application is accepted, the processor 1200 proceeds to 1525 where the seller information is stored in a seller database 1527 (FIG. 21). Finally, at 1530, the processor 1200 is configured to provide the seller 1120 with the newly issued credit card number so that the seller 1120 is able to open deals. Further, the processor 1200 is configured to provide a report to a system administrator who then mails a confirmation copy of the seller's information stored in the seller's database to the seller 1120.

Continuing to refer to FIG. 19, if at act 1500 a seller has already registered, the seller 1120 may login as a registered user by selecting the registered user hyperlink 1230 (FIG. 13). Once selected, the processor 1200, at reference numeral 1535 prompts the seller 1120 to enter user ID and password. Upon input of the user ID and password, the processor 1200 proceeds to act 1540 where the processor 1200 verifies a valid user ID and password have been entered by comparison with the information stored in the seller database 1527 (FIG. 21). If the user ID and password entered by the seller 1120 does not match any entry in the seller database 1527, the processor 1200 at 1540 returns to 1535 for re-entry of such information. If, however, at act 1540, a valid user ID and password are entered, the processor 1200 proceeds to reference numeral 1545.

Upon successful entry of a user ID and password, the seller 1120 is provided with a seller option screen 1375 as shown in FIG. 18*a*. For example, the seller 1120 may decide to open a new deal 1282 or the seller 1120 may decide to view a current deal 1282 for one of a number of goods or services offered by the seller 1120 or review a list of buyer-inputted criteria. Accordingly, if at reference numeral 1545, the processor 1200 determines that the seller 1120 desires to open new deal 1282 for a selected product, the processor 1200 proceeds to 1560.

At 1560, the processor 1200 requests that the seller 1120 enter the seller's selling criteria, so that the system can build a seller's product offering criteria input screen, at 1565. For example, in the present aspect the product agreed upon seller criteria is the volume range of the order and the price per pound of the order, the seller's selling criteria includes the delivery time and warranty with quality to be added next, and the seller additional criteria is that the buyer pay the cost of shipping the goods. As discussed above, the processor 1200 utilizes the information input from the seller 1120 to display a seller's product ordering input form 1430.

At 1565, the processor 1200 requests that the seller enter the limits associated with the seller's selling criteria chosen at reference 1560, and the list of buyer's entitled to be offered the present deal. The information is entered and submitted to form a deal. The processor 1200 uses this information to match buying and ordering criteria of the buyer with selling and offering criteria of the seller, so that deals can be completed in an expedited manner.

Continuing to refer to FIG. 19, if, at 1545, the seller 1120 has not selected to open a new deal, the processor 1200 determines at 1550 whether the seller 1120 has decided to modify an existing deal 1282. In the currently described aspect of the invention, the seller 1120 can modify the deals that particular seller has opened. Accordingly, if the processor 1200 determines that the seller does desire to modify a deal 1282, the processor 1200 provides the seller 1120 with a list of deals 1280 which the seller has opened. Upon selection of one of the deals 1282, the processor 1200 proceeds to 1555 where the deal 1182 is displayed to the seller 1120. If a deal 1282 is not entered at 1550, or following acts 1555 and 1560, the processor 1200 returns to reference numeral 1545.

The subject invention may be implemented via object oriented programming techniques. In this case each component of the system could be an object in a software routine or a component within an object. Object oriented programming shifts the emphasis of software development away from function decomposition and towards the recognition of units of software called "objects" which encapsulate both data and functions. Object Oriented Programming (OOP) objects are software entities comprising data structures and operations on data. Together, these elements enable objects to model virtually any real-world entity in terms of its characteristics, represented by its data elements, and its behavior represented by its data manipulation functions. In this way, objects can model concrete things like people and computers, and they can model abstract concepts like numbers or geometrical concepts.

The benefit of object technology arises out of three basic principles: encapsulation, polymorphism and inheritance. Objects hide or encapsulate the internal structure of their data and the algorithms by which their functions work. Instead of exposing these implementation details, objects present interfaces that represent their abstractions cleanly with no extraneous information. Polymorphism takes encapsulation a step further—the idea being many shapes, one interface. A software component can make a request of another component without knowing exactly what that component is. The component that receives the request interprets it and figures out according to its variables and data how to execute the request. The third principle is inheritance, which allows developers to reuse pre-existing design and code. This capability allows developers to avoid creating software from scratch. Rather, through inheritance, developers derive subclasses that inherit behaviors, which the developer then customizes to meet particular needs.

In particular, an object includes, and is characterized by, a set of data (e.g., attributes) and a set of operations (e.g., methods), that can operate on the data. Generally, an object's data is ideally changed only through the operation of the object's methods. Methods in an object are invoked by passing a message to the object (e.g., message passing). The message specifies a method name and an argument list. When the object receives the message, code associated with the named method is executed with the formal parameters of the method bound to the corresponding values in the argument list. Methods and message passing in OOP are analogous to procedures and procedure calls in procedure-oriented software environments.

However, while procedures operate to modify and return passed parameters, methods operate to modify the internal state of the associated objects (by modifying the data contained therein). The combination of data and methods in objects is called encapsulation. Encapsulation provides for the state of an object to only be changed by well-defined methods associated with the object. When the behavior of an object is confined to such well-defined locations and interfaces, changes (e.g., code modifications) in the object will have minimal impact on the other objects and elements in the system.

Each object is an instance of some class. A class includes a set of data attributes plus a set of allowable operations (e.g., methods) on the data attributes. As mentioned above, OOP supports inheritance—a class (called a subclass) may be derived from another class (called a base class, parent class, etc.), where the subclass inherits the data attributes and methods of the base class. The subclass may specialize the base class by adding code which overrides the data and/or methods of the base class, or which adds new data attributes and methods. Thus, inheritance represents a mechanism by which abstractions are made increasingly concrete as subclasses are created for greater levels of specialization.

The subject invention can employ abstract classes, which are designs of sets of objects that collaborate to carry out a set of responsibilities. Frameworks are essentially groups of interconnected objects and classes that provide a prefabricated structure for a working application. It should also be appreciated that the PCM and the shared memory components could be implemented utilizing hardware and/or software, and all such variations are intended to fall within the appended claims included herein.

According to an exemplary aspect of the subject invention, Java and CORBA (Common Object Request Broker Architecture) are employed to carry out the subject invention. Java is an object-oriented, distributed, secure, architecture neutral language. Java provides for object-oriented design that facilitates the clean definition of interfaces and makes it possible to provide reusable "software ICs". Java has an extensive library of routines for copying easily with TCP/IP protocols like HTTP and FTP. Java applications can open and access objects across a network via URLs with the same ease to which programmers are accustomed to accessing a local file system.

Furthermore, Java utilizes "references" in place of a pointer model and so eliminates the possibility of overwriting memory and corrupting data. Instead of pointer arithmetic that is employed in many conventional systems, the Java "virtual machine" mediates access to Java objects (attributes and methods) in a type-safe way. In addition, it is not possible to turn an arbitrary integer into a reference by casting (as would be the case in C and C++ programs). In so doing, Java enables the construction of virus-free, tamper-free systems. The changes to the semantics of references make it virtually impossible for applications to forge access to data structures or to access private data in objects that they do not have access to. As a result, most activities of viruses are precluded from corrupting a Java system.

Java affords for the support of applications on networks. Networks are composed of a variety of systems with a variety of CPU and operating system architectures. To enable a Java application to execute anywhere on the network, a compiler generates an architecture neutral object file format—the compiled code is executable on many processors, given the presence of the Java runtime system. Thus, Java is useful not only for networks but also for single system software distribution. In the present personal computer market, application writers have to produce versions of their applications that are compatible with the IBM PC and with the Apple Macintosh. However, with Java, the same version of the application runs on all platforms. The Java compiler accomplishes this by generating byte code instructions that have nothing to do with the computer architecture. Rather, they are designed to be both easy to interpret on any machine and easily translated into native machine code on the fly.

Being architecture neutral, the "implementation dependent" aspects of the system are reduced or eliminated. The Java virtual machine (VM) can execute Java byte codes directly on any machine to which the VM has been ported. Since linking is a more incremental and lightweight process, the development process can be much more rapid and exploratory. As part of the byte code stream, more compile-time information is carried over and available at runtime.

Thus, the use of Java in the subject invention provides a server to send programs over the network as easily as traditional servers send data. These programs can display and manipulate data on a client computer. The subject invention through the use of Java supports execution on multiple platforms. That is the same programs can be run on substantially all computers—the same Java program can work on a Macintosh, a Windows 95 machine, a Sun workstation, etc. To affect such multi-platform support, a network interface and a network browser (not shown) such as Netscape Navigator or Microsoft Internet Explorer may be used in at least one aspect of the subject invention. It should be appreciated, however, that a Java stand-alone application might be constructed to achieve a substantially equivalent result. Although the subject invention is described with respect to employing Java, it will be appreciated that any suitable programming language may be employed to carry out the subject invention.

An Internet browser (e.g., Netscape, Microsoft Internet Explorer) is held within the memory of the client computer. The browser enables a user to explore the Internet and view documents from the Internet. The browser may include client programs for protocol handlers for different Internet protocols (e.g., HTTP, FTP, and Gopher) to facilitate browsing using different protocols.

It is to be appreciated that any programming methodology and/or computer architecture suitable for carrying out the subject invention may be employed and are intended to fall within the scope of the hereto appended claims.

Figure 22:
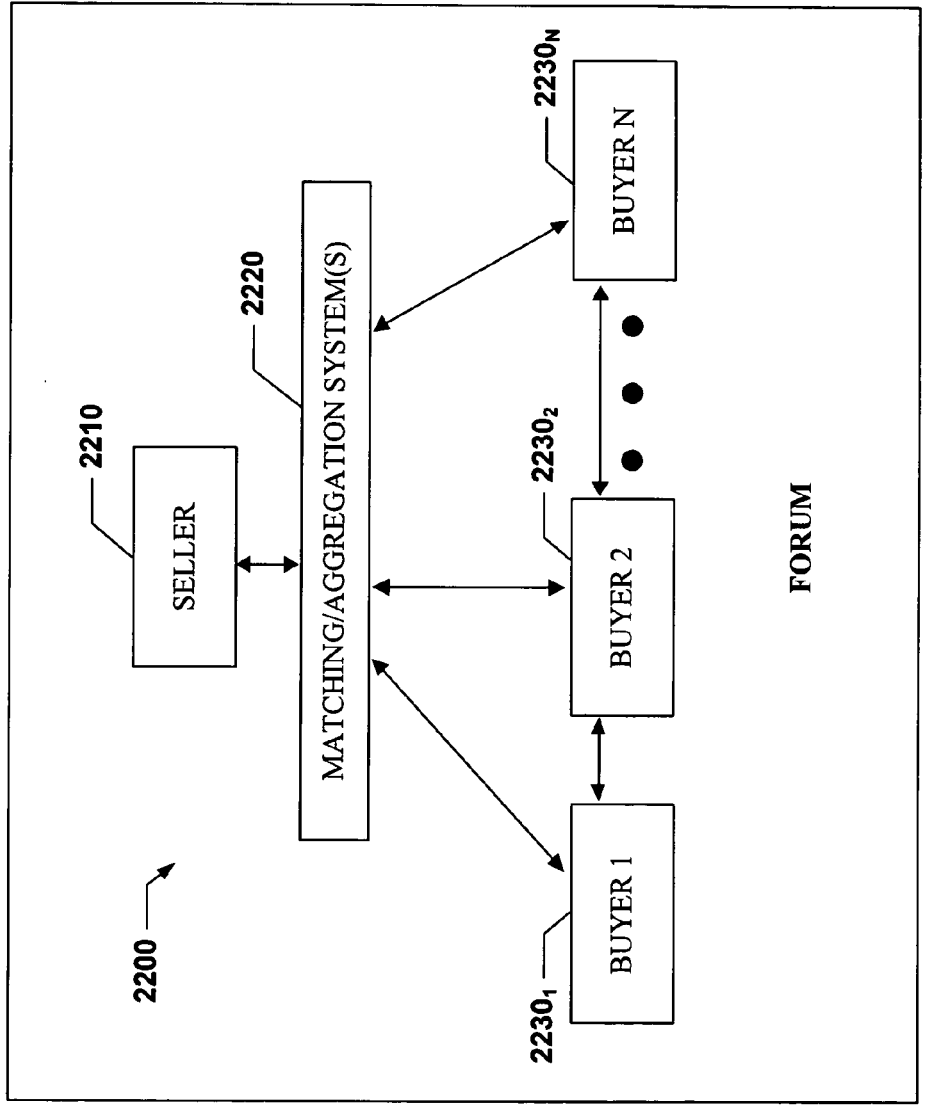
FIG. 22 is a schematic illustration of an electronic forum for conducting a seller sponsored business transaction.

Turning now to FIG. 22, the system 2200 includes a seller 2210, an aggregations system(s) 2220 and a plurality of buyers $2230_1$-$2230_N$, hereinafter referred to as buyers 2230. It is to be appreciated that although the buyers 2230 are being referred to collectively hereafter, respective buyers 2230 can have unique attributes and/or circumstances that distinguish each of the buyers 2230. As described above, a seller 2210 typically creates or sponsors an offer (e.g., by creating a deal room) in which many buyers 2230 can participate by viewing and/or placing an order for the offer. When a buyer 2230 places an order for an offer, the aggregation system 2220 aggregates the order with other orders for this or other offers by the seller 2210, then transmits this data to, for example, a price curve component (not shown), where price curve data can be updated for the buyers 2230.

Figure 23:
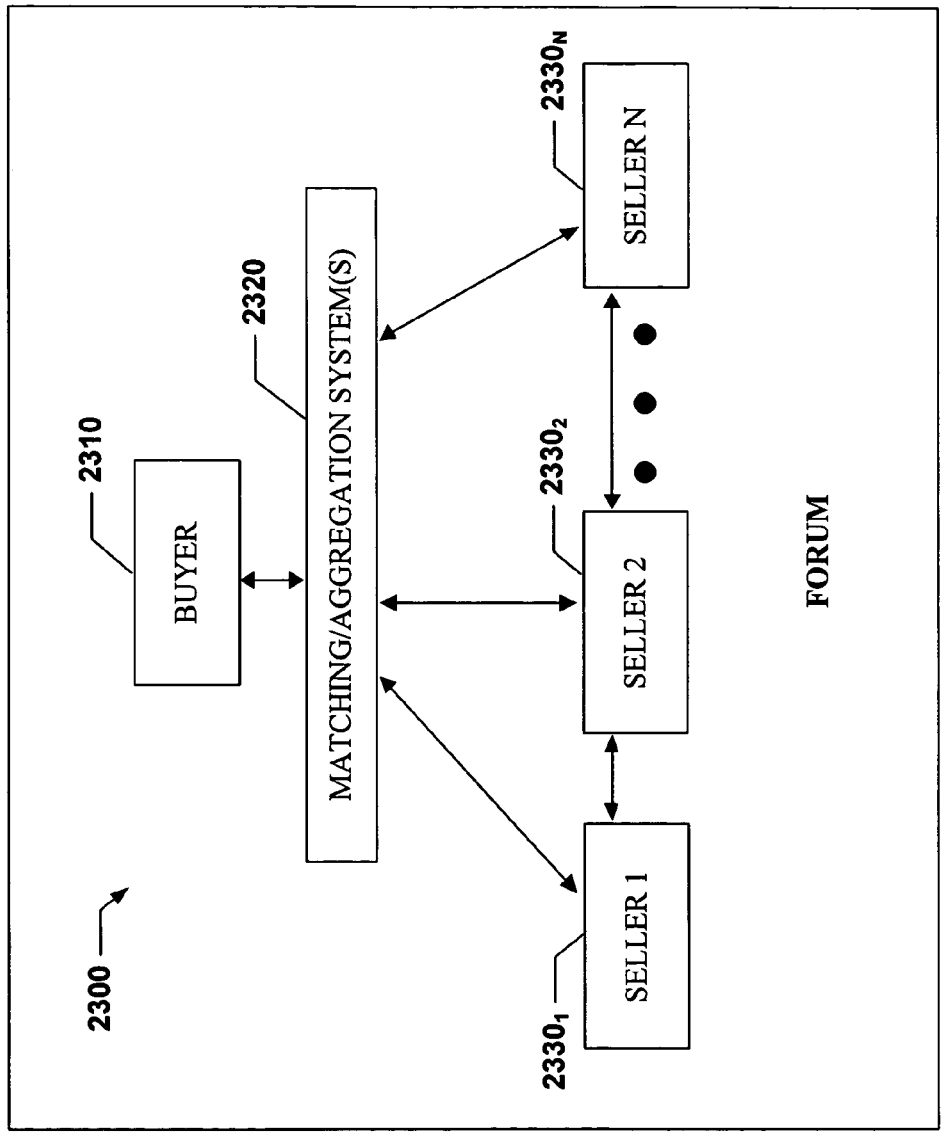
FIG. 23 is a schematic illustration of an electronic forum for conducting a buyer sponsored business transaction.

Although the subject invention has been largely described within the context of a seller sponsored deal room as shown in FIG. 22, it is to be appreciated that a buyer or buyers may sponsor a deal room to aggregate purchasing goods/services from a plurality of sellers as illustrated in FIG. 23.

Turning now to FIG. 23, the system 2300 includes a buyer 2310, an aggregations system(s) 2320 and a plurality of sellers $2330_1$-$2330_N$, hereinafter referred to as sellers 2330. It is to be appreciated that although the sellers 2330 are being referred to collectively hereafter, respective sellers 2330 can have unique attributes and/or circumstances that distinguish each of the sellers 2330. Here, a buyer 2310 can sponsor the transactions and/or deal rooms. The aggregation system 2320 aggregates the orders from the buyer 2310 based upon which of the sellers 2330 gets matched to the order. For example, a large corporate buyer 2310 may employ the subject invention to create a deal room where a plurality of sellers 2330 may assemble to aggregate selling of specific goods and/or services that the buyer 2310 desires. Such a transaction facilitates the buyer 2310 satisfying purchase requirements in one forum and to coordinate delivery of the goods/services. Furthermore, such a system facilitates sellers 2330 making sales to the buyer 2310, which may not have occurred unless the sellers 2330 are able to aggregate their production (e.g., the buyer 2310 may not have dealt with that particular seller 2330 because of insufficient capacity to meet the buyers 2310 needs). The subject specification describes exemplary systems and interfaces for implementing the subject invention, and therefore further discussion thereto is omitted for sake of brevity. However, it is to be appreciated that one skilled in the art based on the above discussion regarding seller sponsored deal rooms/transactions could apply such teachings to implement the aforementioned buyer sponsored deal room/transaction.

Although the subject invention has now been described within the context of a seller sponsored deal room as shown in FIG. 22, and a buyer sponsored deal room as shown in FIG. 23, it is to be appreciated that buyers and sellers may concurrently sponsor a deal room/transaction to aggregate selling of and purchasing of goods/services by a plurality of sellers and buyers respectively.

Figure 24:
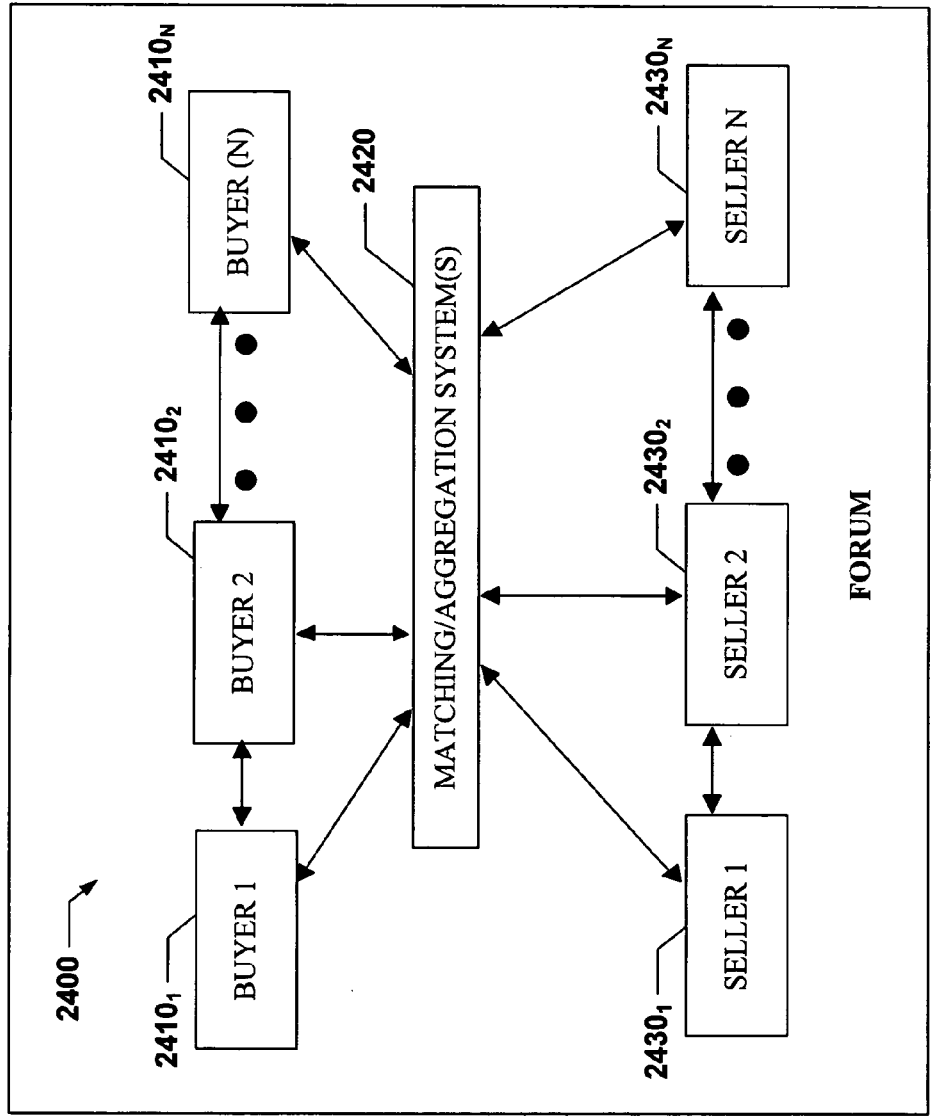
FIG. 24 is a schematic illustration of an electronic forum for conducting a buyer and seller co-sponsored business transaction.

Turning now to FIG. 24, the system 2400 includes a plurality of buyers $2410_1$-$2410_N$, hereinafter referred to as buyers 2410, an aggregations system(s) 2420 and a plurality of sellers $2430_1$-$2430_N$, hereinafter referred to as sellers 2430. It is to be appreciated that although the buyers 2410 and the sellers 2430 are being referred to collectively hereafter, respective buyers 2410 and sellers 2430 can have unique attributes and/or circumstances that distinguish each of the buyers 2410 and each of the sellers 2430. Here, the aggregation system 2420 matches/aggregates buyers' 2410 orders for the sellers' 2430 goods/services.

For example, multiple buyers 2410 and sellers 2430 may employ the subject invention to create a deal room/transaction forum where a plurality of sellers 2430 and buyers 2410 may assemble to aggregate selling and buying of specific goods and/or services that the sellers 2430 wish to sell and the buyers 2410 desire to purchase. Such a transaction forum creates great efficiencies with respect to purchase price and/or selling quantity of particular goods/services. For example, in such a forum dedicated to the selling and purchasing of a specific product/service, sellers can assemble to compete for the sale of their respective product/service which leads to pricing efficiencies. Buyers 2410 can assemble in such a forum to aggregate buying power in order to negotiate good prices and close deals. Sellers 2430 on the other hand may also aggregate to meet the needs of a large buying block. The subject specification describes exemplary systems and interfaces for implementing the subject invention, and therefore further discussion thereto is omitted for sake of brevity. However, it is to be appreciated that one skilled in the art based on the above discussion regarding seller sponsored deal rooms/transactions could apply such teachings to implement the aforementioned buyer sponsored deal room/transaction.

One alternative aspect of the subject invention affords creating, altering and/or managing OpenOffer sheets on more than one Private Deal room at the same time. This aspect of the invention enables the company to complete an OpenOffer Sheet to select those private deal rooms for which it wishes to submit the OpenOffer sheet. For example, a first OpenOffer sheet with one price and volume schedule may be automatically submitted to Deal room #1 and #2. A second OpenOffer sheet can be submitted for the same product with different price points and volume schedules to Deal room #3. The system enables a supplier to track any number of deal rooms and label a customer accordingly. The supplier may create subsets of private deal rooms at any time through grouping the deal rooms and saving them with a different name (e.g., —mid-size companies, tier one, large company). This enables the supplier the ability to dynamically segment all or some customers according to any number of criteria and present current pricing and capacity information in real-time. Therefore, the system can be a tool for creating any number of price curves or pricing configurations among different products and updating those prices and volumes in a moment's notice among the selected deal rooms.

A company is able to see a pricing summary by product type across all deal rooms. For example, the ability to select a product category and have the system return a list of the prices submitted for each along with the current price and the lowest price to be achieved. This allows for the company to track pricing strategies across all deal rooms. The information can be reviewed in any number of configurations: pie chart, bar chart, scatter chart, etc. and with any subset of deal rooms. Statistical numbers are also available including totals, averages, and the like.

The system also provides a running list of all buyers that have access to all deal rooms supported by the company. This is done through a search file in that private deal room and saved to the master management system. Every deal room has a different URL with the requisite security. The system is also capable of performing a search by entering the customer name which then provides the proper deal room URL and password, for example. Changes may be made by the supplier to many features of the deal room, for instance those described above.

The option to have an OpenOffer Sheet posted on a regular interval and/or to have it programmed to reset the offer with a rolling date (e.g., —daily, weekly, bi-weekly, monthly) is available on the master and individual sites. In addition, the ability to alter a component(s) of the OpenOffer Sheet and save that variation under a different stored name is possible. For example, if price is selected to stay constant while the ship date changes to the next business day on a regular interval, that OpenOffer Sheet can be saved and posted. The iteration may change with the passing of time, of course. Likewise, the function of freezing all OpenOffer sheets with or without intervals is possible with a simple freeze command.

The ability to retract a previous OpenOffer sheet is available as well. This recall feature will pull the offers from all of the deal rooms or a combination selected by the supplier. The product name and identification number can be accessed and the recall feature engaged. In the event that orders are already placed within the open offer sheets, the supplier will fulfill the order as scheduled.

The supplier can also list and search open offers that have no orders. This is done with a quick search that will pull up the open offers, deal room URL, projected ship date, etc. The master list can be perused and, when highlighted, the supplier has the option of modifying the information accordingly and then to post again within the specified deal rooms. Changes such as price, volumes, ship dates, close dates, etc. can be made and the new deal rooms submitted.

The ability for a supplier to create another deal room online instantly is available. The option is resident on particular website (e.g., the current site). The supplier highlights a "Create New Deal Room" option and is presented with the room identification number and the base URL. The supplier is asked to name the URL with up to a certain number of digits. Once the name and administrator's password is selected, the new deal room is available. Additional information is also resident, including, for example, contact name, e-mail address of contact, etc.

The ability for a company to create a private deal room online for invited buyers is provided. The invited buyers are notified of the opening of the deal room and given a username and password, so that there name remains anonymous. Preferred customers can also be given special pseudo names, so that they can travel from deal room to deal room, while maintaining their anonymity from reports generated by other suppliers and buyers utilizing the OpenOffer Management system. The option of automatically sending e-mail notification of the deal to preferred customers can also be provided.

The ability for a company to create a private deal room online, without revealing their identity is provided. The supplier can enter a pseudo name and basic company criteria, such as the type of company (e.g., fortune 500, midsize, small), quality ranking, and type of business (e.g., specialized, conglomerate). The company can then track purchases and demand utilizing the pseudo name. The deal room can be configured to be offered to a specified group, such as distributors or preferred customers, or the general public as a blind offer. The deal room can be configured as a single order deal or as a time specified deal that allows buyers to aggregate in to reduce the price.

Additionally, a transaction sponsor has the ability to request transaction fees in real-time across all deal rooms. The fee structure is applied for that customer based on the number of single transactions (e.g., completion of open offer sheet by customer) and this figure is calculated accordingly for an online transactional fee.

According to another aspect of the subject invention, the Demand Aggregator System captures and collates either all current or historical orders from all OpenOffer sheets.

An OpenOffer Request Form enables a buyer on the system to alert suppliers of the product needed, category, quantity and when shipment is required. This allows the suppliers to respond with OpenOffer Sheets that match this need. The alert can be by e-mail to the designated address given by the supplier. The buyer can request a private deal room, so that the identity of the buyer remains anonymous. The buyer can provide a psuedoname or an e-mail address, so that the supplier can notify the buyer or post a message to the buyer.

An OpenOffer Request Summary is available by product category. For instance, the supplier may wish to aggregate requests from all deal rooms by product category. In this way, the supplier may see the level of demand required by its buyers in advance of placing an OpenOffer for the product. This feature can be accessed in real-time. An icon can be clicked to show the summary of products being requested and pertinent data related to shipments. Excess capacity can be priced to preferred customers.

The ability to compare current orders for a product on a timeline with the aggregated volume received from OpenOffer Requests for the same product and requested ship dates is available. This aggregation and comparison enables the supplier to better estimate production estimates and forecasts. This allows for better planned production and the ability to evaluate the cost savings in terms of labor, material, production runs, etc. which, in turn, enables the supplier to estimate the savings and prepare the appropriate price and volume points.

A search engine system is included for searching for deals over different supplier sites including the particular product requested. Other information on the system can include but is not limited to:

Total capacity posted by product, total, timeline, etc.

Total number of orders placed by product, total, timeline, etc.

% of capacity remaining by each product category measured over the timeline

Average price per product by product category, by deal room, by customer, etc.

Historical timeline of product ordered, average price, breakdown by deal room, etc.

Historical review of total capacity listed by product that went unpurchased

Historical review of total orders over days, weeks, months, quarters, etc.

Chart of top customers for each product line

Projected sales taking historic information by product and extrapolating over time by weeks, months, etc.

Trend analysis of product mix over periods of time.

Ability to evaluate the volume of products not yet purchased over the upcoming months and when such capacity will be taken off market (e.g., termination of specials from completed OpenOffer Sheets with close dates).

In accordance with another aspect of the subject invention, a Private Buyer Deal room Management System may be employed to afford the buyer the opportunity to review product summaries and order information in any number of ways on the system based on private buyer deal room transactions. The following lists a number of examples:

Total orders placed by product, group, average, etc.

Total share by product type for each supplier—measured over days, weeks, months, etc.

Summary of supplier ranking by product category

Summary of current pricing information by product category

Historical review of total orders over days, weeks, months, quarters, etc.

Projected orders for each product taking historic information and extrapolating over time by weeks, months, etc.

Trend analysis of product mix over periods of time—this trend analysis is available on the site for suppliers to review in order to complete OpenOffer Sheets with relevant volumes Ability to compare percentage of products delivered on-time by product category over days, weeks, months, etc, Ability to compare percentage of products that meet quality criteria Ability to compare percentage of product suppliers with good customer service Ability to trend the price for a product over time: days, months, quarters, years Ability to profile a supplier over any period of time in price, quality, customer service, and deliver with a line chart showing trends to those suppliers via e-mail Ability to profile suppliers of a similar product in such a way to compare performance over time Ability to provide access for suppliers to see relative performance of their company versus other companies in the same category The function of setting minimum performance rankings for suppliers and when suppliers fail to meet these standards, the buyer is notified of—the buyer has the option of having an icon to click which will list those suppliers who are in jeopardy along with a brief order summary and ranking totals.

Ability to send to new suppliers via e-mail

Ability to review the number of orders placed online and the fees associated therewith A Trend Analysis System represents another aspect of the subject invention. The Trend Analysis System captures and collates either all current or historical orders from all OpenOffer and OpenOffer Request sheets.

The trend analysis system aggregates patterns of buyers in purchases and demands. The trend analysis system also aggregates patterns of suppliers in offers and performance criteria to form a variety of trend analysis reports. The system also enables analysis of buyers to facilitate buying blocks for buyers and to assist suppliers in adjustment of their deal room offers. The trend analysis system also provides reports on anonymous buyers and sellers via a psuedoname. The system can communicate between websites to rank suppliers based on different criteria. The system can also establish transactional profiles based on industries, geographical location and time periods. The various trend analysis can be provided in different formats (e.g., pie charts, time lines, etc.). The trend analysis system can be utilized to identify various problems with buyer OpenOfferRequest trends and supplier OpenOffer trends and communicated back to the buyers and/or suppliers.

According to yet another aspect of the subject invention, the Market Share System Reports is capable of providing a file for suppliers to see the relative market share they have for a single product versus their competition. Substantially every item price is able to be reviewed by the supplier online with the same functionality as the Private Buyer Deal room Management System discussed above.

Figure 25:
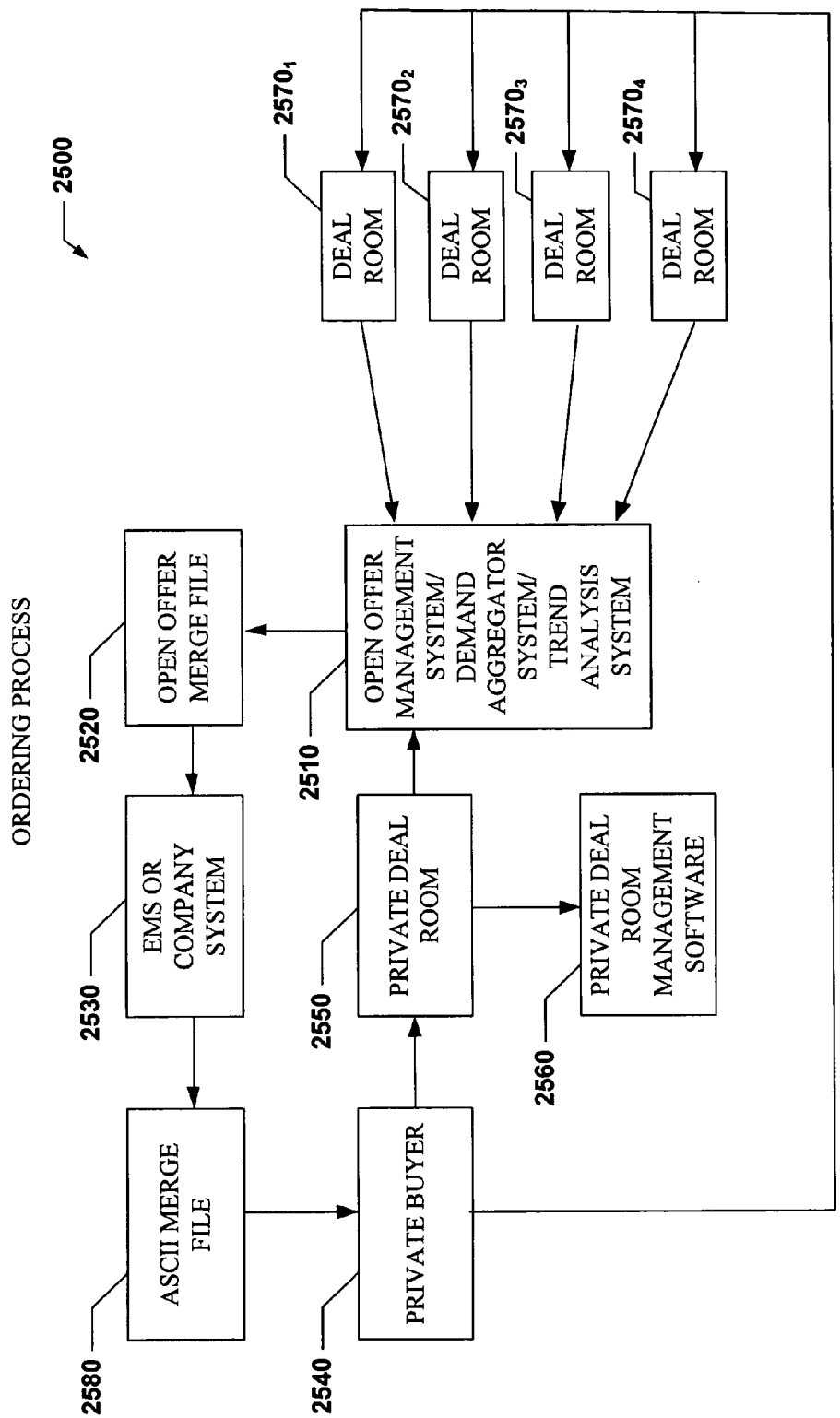
FIG. 25 is a schematic illustration of an ordering process in connection with the above-identified invention.

Turning now to FIG. 25, which shows a schematic illustration of an ordering process. The system 2500 includes an open offer management system/demand aggregator/trend analysis system 2510, an open offer merge file, an EMS or company system 2530, a private buyer 2540, a private deal room 2550, deal room management software 2560, a plurality of deal rooms $2570_1$-$2570_4$, and an ASCII Merge file 2580. The Open Offer Merge File 2520 allows the buyer the ability to place an order on any sponsored site and after placing the order, have the option to present the order in an ASCII merge file 2580 (an ASCII, comma delimited file) that will be sent to a specified e-mail account automatically. The ASCII merge file 2520 will be available for the supplier (e.g., EMS or company system 2530) to incorporate at the beginning of the purchasing process and will cover all purchases made on that site. The ASCII information will be posted to the e-mail address indicated by the buyer. This feature may be engaged whenever a buyer has set up this default and will travel with the buyer from the site to the sponsor site.

According to another aspect of the invention a dynamic pricing model can be employed. This allows the previous activity of the buyer on a site to be recorded on such criteria as amount of cancelled orders (as expressed by a percentage), the track record of on-time payment, etc. until a ranking is assigned to the buyer either manually or by default criteria set by the manufacturer. For instance, a buyer with a 100% rate of taking receipt of all orders online and 100% of paying within 30 days would be assigned a high value such as AA. When this buyer returned to the site and entered a password, the AA rating would be denoted and a series of value-added services would be made available to that buyer such as a 5% discount for placing an aggregated order, special offers such as a rebate of x amount when the buyer is the first to place an order in the aggregated OpenOffer, etc.

In addition, a dynamic price can be assigned to the ranking of a buyer. For instance, buyers can be ranked in various groups such as AA, BB, or CC based on their past history. The AA can be tied to an automatic 5% discount whereby all aggregated prices change automatically when the password of that company is entered. A company with a CC ranking could actually see a 5% premium when they visited the same site, simply based on the password and their past performance. The buyer that has a history of canceling may carry a higher cost to the supplier . . . this cost, in turn, can be programmed into that particular buyer's experience on their site. In this way, additional deal rooms may not be required as the same deal room will take on the characteristics of that buyer.

The rating of a buyer on one particular deal room can be aggregated and averaged along with the deal rooms of other suppliers to develop an accurate "buyer profile". This profile can be accessed by supplier to determine what customers visit their deal room and what prices they eventually see.

Another aspect of the invention, a Not To Exceed Pricing Option, allows a supplier to list as an option for certain customers a NOT TO EXCEED option (NTE). In this case, a buyer has already negotiated a NTE price through a blanket contract for a set period of time (e.g., one year). The NTE tag along with the set price is programmed into the site through a series of fields. The buyer places orders on the aggregated schedule at any time. If the eventual price is below the NTE price, the order is executed at the lower price. If the eventual price is above the NTE price, the buyer is guaranteed that the highest price paid will be the NTE price. The benefits provide can include the following: the buyer is capable of only bettering the price negotiated at the beginning of the year, the buyer gains the advantage of playing regional prices to their advantage, and the supplier can secure a year-long contract to baseload the business while adding value for this prime customer.

The baseload option status can be conferred upon a buyer. In this case, the supplier negotiates a better price at the onset of the year in exchange for guaranteed acceptance of product orders throughout the year by the buyer. Once the buyer accepts shipment over the course of the year on pre-determined dates, the supplier can then post planned inventory in advance based on this baseloaded business. For instance, if the buyer agrees to accept shipment of 100 racks of glass the first week of every month for the next six months, the supplier then posts the availability of an additional 50 racks of the same glass for the same week. The existing of the original buyer provides a base that absorbs much of the fixed costs associated with the schedule while the incremental 50 racks represents proper capacity utilization at much higher profit margins. The schedule can be posted in advance at prices that create an incentive for additional orders from other buyers on the site. A NTE price option can also be given to this supplier.

This can be conferred on a buyer as an incentive for the buyer to place orders early in the cycle of a product. A point system can be applied for the buyer. For every time a buyer is the first company to place an order in an OpenOffer Sheet, points can be accrued that result in a year-end rebate or some other incentive. For instance, 5 points assigned to every time the company is the first to order in an OpenOffer sheet applies towards the points needed by the end of the year to secure a discount. Such an incentive creates customer loyalty and rewards a buyer beyond the current system of discounts. Likewise, a rating system applied to non-cancellation or proper payment could further reinforce this behavior.

Additionally, a Real-time Price Update Screen can be available. In that case a screen setting is available that allows a buyer to post a series of product categories in a deal room with the current price setting and the close date. The buyer is able to check on a real-time basis the current price of clear glass by either a supplier or group of suppliers, and the respective volume still available with the close date. A product exchange is literally available to the buyer on an as-needed and customized basis. Likewise, the supplier can have a screen that shows the current prices of all OpenOffers across deal rooms and additional information.

According to another aspect of the invention, a Scheduled Production by Product Category can be employed wherein the supplier is capable of engaging a feature in the system to aggregate, by product category, the total amount of product that has been ordered, when it is due to ship and the remaining amount of product that is still available. By inputting the amount of available inventory of the product on site, the supplier is able to see the production schedule for the product over the next duration of a week, month, quarter or year. This schedule can be viewed in a graph form with total capacity acting as the backdrop to total production currently booked. The system is capable of incorporating information from the supplier's MRP system in order to determine the total capacity available. Also, a field of total capacity per time period can be inserted. Now, the system can return an OpenOffer sheet automatically with the amount of volume available. The supplier can "split" the product offering among a couple of different OpenOffer Sheets and Deal rooms. The system can also alert the supplier of the Deal room with the highest price, historically, and where the excess volume should be placed.

In another aspect, Demand Forecast System, the buyer and supplier both have access to a historical purchase by a product category. The buyer can review historic product demand schedules and request that the DFS take over. The Demand Forecast System takes the preceding history and conducts an average, extrapolating into the future the anticipated demand. This demand is automatically placed into OpenOffer sheets. The OpenOffer sheets can be sent to the suppliers for that product category. The supplier simply assigns a price schedule based on the volume and submits the form to the Deal room. The process saves the supplier and buyer from calculating or requesting forecasted demand manually.

Still another aspect of the subject invention includes a Reactive Pricing Model. One embodiment of this model is based on orders for the product. In this case, the supplier has the option of lowering a price automatically based on market activity. A supplier of clear glass has set a price and volume schedule. If the activity of the site is such that multiple glass orders have been placed, and the data show such orders have taken place with other suppliers of the same product, registered discounts may be triggered by such activity automatically if pre-determined by the supplier, however, no pricing information is shared with other buyers. Rather it is simply based on the volume of product. The supplier may come in with pricing starting at $0.29 per square foot of glass. If the trigger point is reached with enough orders being placed with other suppliers, the price is dropped to a pre-determined schedule already determined by the supplier. Conversely, the price can be set to increase if activity is skewed too heavily to the supplier in question. In this case, if orders are coming in sooner than anticipated the supplier has the option to pull the pricing schedule automatically (either dropping all current orders to their lowest point or not) and resubmit the pricing at a different schedule predetermined by the supplier.

Also, the supplier can program the price feature to engage over several Deal rooms. For instance, assuming the glass price in one Deal room is priced higher and is being accepted by the customer, the system will automatically alert the supplier of this happening and suggest additional volume be placed in that room. The program could also allow for the supplier to automatically post more product, say a specified amount, to the Deal room with the highest price.

Additional criteria can be added to this analysis. Assuming a deal room profile of customers that accept the order on-time, pay in a timely manner, and pay a higher price than other deal rooms would automatically be listed as the first company to receive the next available product volume.

Another embodiment of the Reactive Pricing Model is based on the time left for the offer. A timed offer can also be preset with the supplier having the ability to preset dynamic pricing as the time elapses on a open offer sheet. Assuming no one has placed an order or if available quantities are still available, the price can be programmed to drop by a percentage throughout the remainder of the bid until a hidden price point is reached. The buyers are encouraged to place their orders accordingly until the market price has been established.

In another aspect of the invention a customer relationship management (CRM) package can be included, wherein information on buyer and prospective buyers are loaded into a database that includes, for example: Individual name, Company name and address, Email address, Phone number, Cell number, Products purchased, Volumes, Time of purchase, etc.

Other aspects of purchasing can also be included, such as, times purchased, number of visits before order, price point at first visit, second visit, products ordered, etc. The record can also included information from the supplier, such as:

(1) Whether a prospective buyer pays on time (yes or no, or ranking applied, rating, etc.).

(2) Whether a prospective buyer gives supplier only 40% of business (potential to get more business? If yes, then buyer joins another group segmented by the supplier).

(3) Special offers to buyers, such as, discounts and/or coupons, which may be in the form of a percentage off the curve or a new curve if buyer agrees to place an order during this visit.

The cost to service customers can vary according to a variety of factors. One of which is "when" the order is placed. For example, the sooner an order is placed, the more beneficial it is to the supplier with the ability to plan production to reduce costs of subsequent orders. The earlier an order is placed and the larger the amount, the more value may be created.

Figure 26:
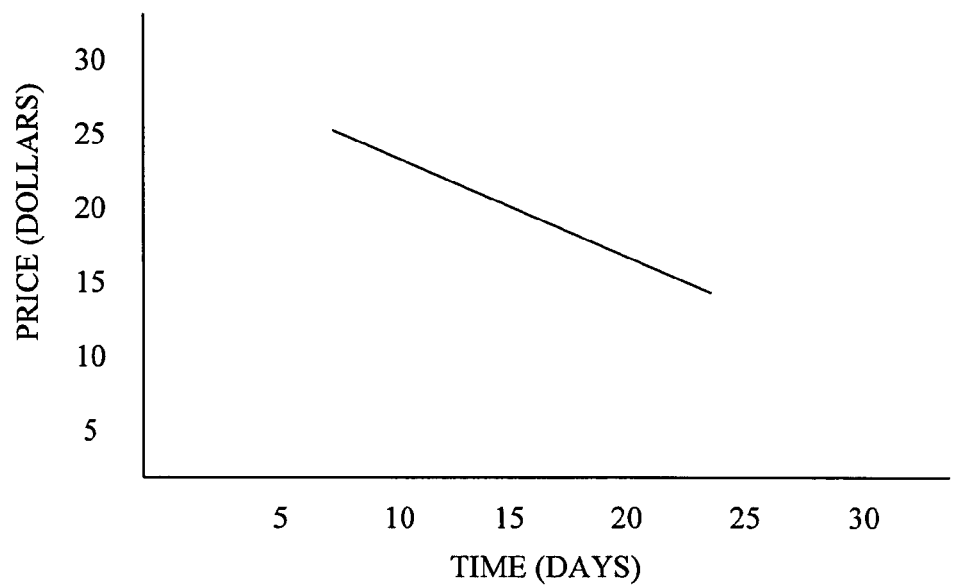
FIG. 26 is an example of a price curve in accordance with one aspect of the subject invention.

One example of motivating buyers to place orders sooner involves an initial offering of lower curves to a group of buyers. The curve (or curves) can "change" according to a pre-determined set of criteria. For instance, buyer A sees a curve as shown in FIG. 26. As orders are placed, the curve can be constant for that group of buyers, or a lower tier can change. This can be specified in advance to the buyers by the supplier.

Figure 27:
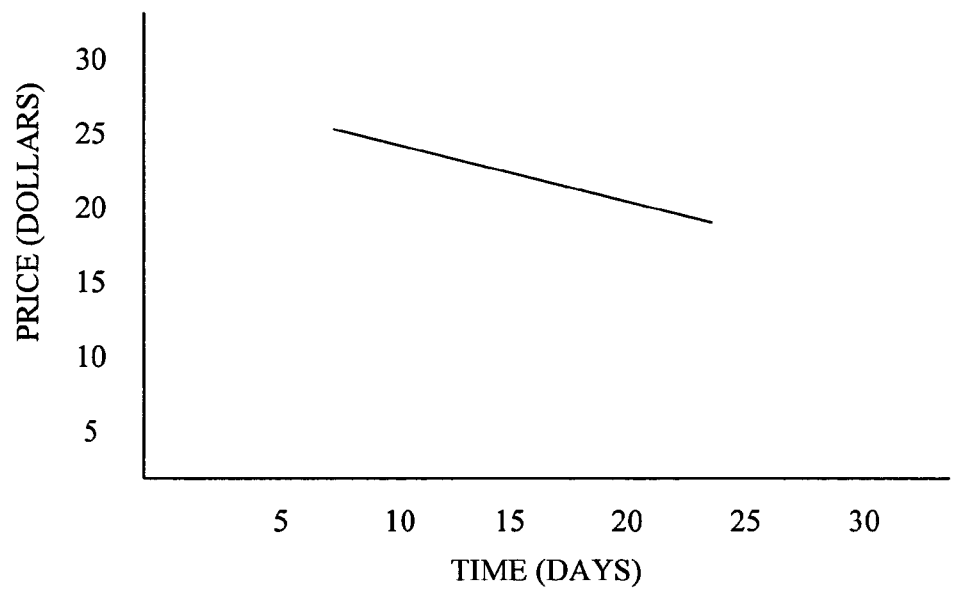
FIG. 27 is an example of another price curve in accordance with one aspect of the subject invention.

However, as shown in FIG. 27, subsequent buyers may see a different curve for the same product with any number of variations (e.g., first price is different, price breaks vary, and the lower price is changed). This system rewards the buyers willing to place an order earlier and lets the supplier plan the production run in advance.

The CRM package records all of this information for each buyer so that custom curves can be set-up by the supplier. For instance, a buyer has ordered product A three times over the past six months. The first order was placed when the product price was $22, the second when it was $20 and the third when it was $20 again. The final price received was $17, $16 and $15 respectively. The next curve the buyer may see will be set automatically based on the supplier's specification. Examples of such specifications include:

Past price average over x period of time (number of orders, period of time, etc.) will be the first, middle or last price seen as determined by the supplier First price point will be a certain percentage above the last order price placed Last price received (curve bottom is set a certain percentage below that price, initial price is set at a certain percentage above the curve top).

Past price first view

Past price first order

The CRM package can evaluate buyer patterns and tendencies and determine the optimal price curve for each buyer, group of buyers, sub-segment of buyers, etc. Such curves will be created in rapid succession whenever this tool is constructed and filled out by the supplier for each buyer. Curves will be created around a particular buyer's "experiences" online, whatever they may.

A supplier may also designate an instant Not To Exceed price based on certain buyers going online. For instance, in the previous example buyer A may go online and be offered a price somewhere in the middle of the curve as a Not To Exceed $18 dollars. In which case, the buyer will be guaranteed that price at a maximum with the potential to get a better price as the volume increases. These alerts can be customized based on the data collected from that buyer and set into the software to appear on selected products and offers. These can also be sent to directly to the buyers via software generated HTML updates and notices of the offer, sent to voice mail, PDA's etc.

A buyer may also be given the special offer of "buy now that the offer has closed and receive an additional 2% of the total price" to help facilitate more sales. Other specials can include: order now and receive free shipping, a 5% off the next order or this order, free storage for x number of days, etc.

The CRM software can record every offer ever made to a buyer and document which offer(s) was successful. This information can be analyzed for buyer patterns and provide input on future curves/new buyer segments, etc. For instance, buyers that ordered at a price point of $20 were 80% more likely to add to the order when free shipping was included.

Likewise, data from online questionnaires can be tabulated and presented as part of the buyer profile and used in future offers. A buyer who states they like the free shipping feature can be segmented into a group in which that offer is made available; the new price curve may reflect a surcharge for such feature.

Conversely, buyers who like the no-cost storage for 30 days could see a different curve automatically with that a part of the offer. In this way, the buyer's behavior and input will be used to automatically present curves that reflect their wants and/or needs.

Buyers may also buy "futures" of a product. For instance, a group offer may be presented. The buyer can place the order for X quantity. The supplier has the right to "buy back" the product from the buyer if desired. The buyer may be given a lower price for this option. Thus, the buyer can take the product for predetermined period of time, and the supplier may buy back the product at a same (or different) price if desired.

A supplier can post three curves for the same product and a buyer can select which price curve will be applied to a particular product by accepting different terms and conditions associated with each curve. Although any price curve attribute can be selected by the buyer, an example of this is provided for volume on FIG. 4.

Additionally, buyers can receive personalized offers, such as, place order now, place order on your next visit, place order within x period of time, add to your initial order and receive X % more off this purchase or receive a deeper discount curve, Furthermore, a buyer can have the ability add to a previous order without going back to site. An HTML (voice mail, pda, cell phone, etc.) can be generated and sent to the buyer showing the price curve and the total volume ordered. Based on this knowledge, the buyer is able to click on the HTML and be directly be sent to the curve's order form (or have fields already presented there) and add to the initial order. The system would update the order automatically, post the new volume on the purchase order and update the curve at the same time.

Likewise, special offers can be delivered via this same medium. For instance, a special offer for a buyer to order now and immediately receive 3% off the price of the product regardless of any more orders being placed would allow a buyer to add to the order.

According to another aspect of the invention the participants in an offer can utilize the One click Extend the Offer feature. For instance, a supplier is able to click an icon which opens the curve's close date.

An automatic message can be generated within a specified period of time (x days before close, a few hours before close, etc.) that asks the supplier if the offer should be extended for x hours, days, etc. The supplier can simply click on an icon and a field appears in which the supplier selects an acceptable time period. An email may then generate an automatic alert letting buyers know of this opportunity.

This feature can also be sent to those buyers listed in the CRM program that have or have NOT visited the offer. The curve can be sent to the group of buyers with the extension and price. A special offer can be included as well that offers these buyers an extra incentive to place an order. Since the buyers are registered, they can agree to place an order from the HTML notice if they have engaged this feature on their end.

Changes in minimum order quantities can also be done via a notification system. The supplier may specify a certain minimum for an offer. Once it is reached, a notice can go out which changes the minimum for future purchases. Also, once a minimum quantity is reached, the supplier can set the program to change the price curve. Future buyers may see different starting, middle and ending price figures.

Figure 28:
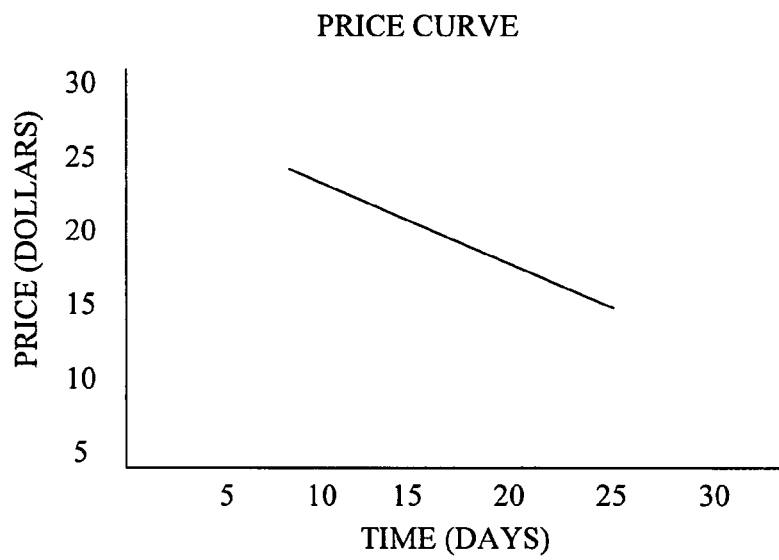
FIG. 28 is an example of a spot curve in accordance with one aspect of the subject invention.

A supplier can create spot curves, as shown in FIG. 28. This feature can be used when inventory is high and certain products must be moved. In this case, an offer can be extended for a period of time. A buyer may come in and place an order for the product and then take the product immediately or along the period assigned. The final price will be determined at the end of the order period which may come after the product is already at the buyer's location. Spot curves can be sent to buyers via the CRM package and offer buyers another incentive to place an order immediately.

The buyer also has the ability to change the accept date. The system will calculate the new price based on the underlying carrying cost. An alert will go out to the buyer (he can request to be notified within a period of time).

For instance, a buyer has agreed to purchase 20 tons of steel. He specifies 10 tons to be delivered on the $10^{th}$ and the other 10 tons to be delivered on the $30^{th}$. The total order is then calculated based on what surcharge has been placed on the offer by the supplier (the surcharge may also be $0). As more buyers order, the price drops according to the curve. A ship location may also be identified to specify if the first 10 tons need to be delivered to a certain location and the second 10 tons to a different location. A ship icon can be used to present the transportation costs and a total icon can be used to present the total costs to the buyer.

A supplier can offer products according to a specific date range (e.g., —week) as well, or by a particular date. A buyer could have the option of choosing an icon for a specific date to have delivery made. The supplier can add the costs per day or even per hour, on each ship date. The buyer gets the benefit of a group purchase with receipt at the given time. If the buyer needs to change the ship date, he can do so by clicking on "change ship date." The quantities ordered, the shipping location, the order number, the date of delivery, etc. can be listed and a Modify button can be clicked to change the quantities shipped and the dates. If the change is outside of a predetermined range, a cost may be levied. If the date specified is in such a range that carries a surcharge, then the buyer would be billed the extra cost (a calculation can be set by the measured quantity such as tons and the carrying cost per day associated with that unit). This is an optional feature that can be turned on or off dependent upon the supplier and what "groups" of buyers have this feature engaged.

Also, this feature can be turned off during the offer and an HTML can be sent to buyers letting them know the order can be placed and they will not be charged for storage up until x date. This is a semi-automatic or automatic feature that is embedded in the software.

A shipping icon can flash once an order has been placed asking the buyer if they would like to arrange for shipping at this time. The current price per mile or other form of pricing can be presented.

Additionally, a buyer can click on an icon that directs them to his/her order page in which the buyer can change the options of the product selected. For example, a buyer may place an initial order for 50,000 units without specifying any or all of the options and/or details associated with the product. Later, the buyer can return and specify one or more of the options, ship dates, etc. for the products. There may or may not be a charge for this feature.

Another feature allows a buyer to change a total quantity ordered. The curve may not change for the group of buyers who already ordered. This event, however, could trigger changes in slope, prices, quantities available, etc. for the other curves. A surcharge may be levied or not based on the supplier's decision.

Moreover initial price curves are set automatically. A first price for a product may be $25 and a final price for the product may be $15. The software allows a supplier to define such prices along with a volume and a price curve can automatically calculates any price breaks. The supplier can specify a number of breaks that should be calculated, such as 2 or 3. Specify a shallow initial curve, and the curve automatically is set up, or specify a deeper curve, and the curve is presented.

The uniqueness of this curve is that with every minimum order (if set), the price drops according to the curve. For instance, the supplier sets the top and bottom prices along with the volume. As every order is placed, the curve automatically reflects the current price (e.g., —could be in dollars, cents). Regardless, every order reduces the final price.

The slope can also change to reflect a deeper curve at the beginning, and then shallow out at the end. A supplier specifies the type of curve (an icon with different slopes can be presented and the supplier simply has to click on the slope of choice and the prices will calculate automatically). The curve is superior in many ways because the buyers don't need a larger incremental volume to be reached before receiving a lower price.

This curve can also be introduced into a regular curve. The initial curve starts out with segments. Buyers can be notified via HTML that the offer has been modified so that every order will drop the price. A minimum can also be changed. Regardless, the value to the buyers is the ability to add to their initial order and know that every unit will reduce their price even more. Multiple curves can be linked and de-linked at will by the supplier.

New price breaks can be introduced by a supplier with a single click of the icon. The price breaks are presented and the supplier can make changes by clicking on the break in question, clicking on a percentage and clicking on reduce or increase and pressing submit. All buyers, specified buyers, and/or those buyers who haven't seen price curve yet, etc. can be notified of the new price curve.

A buyer can have access to all such changes made by a particular supplier. For instance, in a buyer's deal room the information on the supplier's changes to curves, segments, prices, different buyers, etc. can be evaluated.

The supplier can make available to the buyer the average price for a product over the last X number of offers, time, etc. The metrics can be listed in their entirety, or in some form as controlled by the supplier (or buyer in the BSDR). Probabilities would be calculated and shown to the buyers: for instance there is a 70% probability the next price tier of x dollars will be reached with the margin of error displayed.

If a probability is not holding true on an order and time is passing quickly, an alert system will let the supplier know of the options available (i.e., drop price curve, shill order, offer special curve to certain buyers (e.g., A profile buyers).

Figure 29:
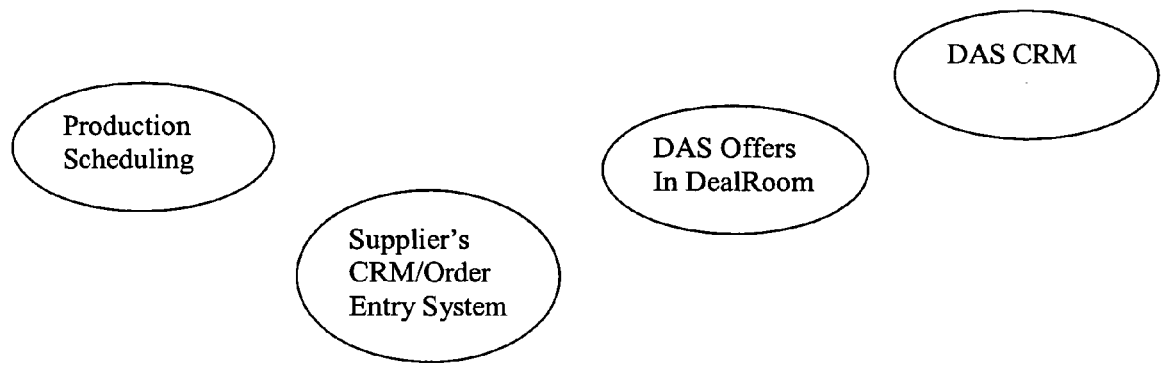
FIG. 29 is an example of a DAS integrated system in accordance with one aspect of the subject invention.

According to yet another aspect of the invention, integration of CRM, enterprise resource planning (ERP) (e.g., production scheduling) and demand aggregation system (DAS) can be employed. The following section describes how production scheduling, the supplier's CRM package, DAS and DAS CRM can interact with one another to create a system, as shown in FIG. 29, that adds value for buyers and suppliers.

For instance, a production run can be scheduled for six weeks from now for product B with options X and Y available. The total quantity to be produced is x, and x+300 is the optimal run. The scheduler can indicate this to the Product Manager/Sales Manager etc. with the notice: Do we post the remaining quantity in the Deal room? Or, the software will be written to automatically post these offers to the Deal room with the same ship date, fob point, etc. populating accordingly to the buyers listed in the Deal room/CRM package. Once the curve is created and confirmed (automatically or semi-automatically by the other party), the curve is posted in the deal room and the emails alerting the appropriate buyers (as listed in the CRM) and internal people (e.g., sales, inside customer service, etc.) are sent. Multiple curves may be sent, linear offers may be prepared (e.g., show curve 1 for 24 hours, if not takers post curve 2, etc.) or any number of other features may be included as listed in this patent application and other applications. Further elaborating on this feature, the software can be configured with a series of if, then instructions:

Post to first buyer price curve A
Post to second set of buyers price curve B
Post to third set of buyers price curve C The system allows for the supplier to change the sequence and the time between offers (first offer may be for A, if no orders or a certain thresholds not ordered then offer B and C concurrently with linked curves).

If an order were to be received online in the deal room, it would automatically populate the production schedule with quantity ordered and other specifics and/or the order entry software. Likewise, if an order came in from the order entry system, the change would be reflected in the deal room (e.g., capacity changed, minimums changed, curves changed, etc.). A "stimulus" event would impact the other parts of the system, and show up as a way to price out the available capacity. Likewise, cancelled orders/changes to production runs would immediately change the offers and order entry data. If the total quantity has been ordered, a notice would be sent to production regarding additional capacity/quantity.

A change in the production schedule would also alert the marketing/sales manager of available capacity and the ability to add to the curve. The cost curve for the product is also available for viewing. The manager can determine what price curve should be set. Also, customer feedback as to when they would like to receive their next order can be tabulated and sent to the production manager. The production manager can put into the schedule and agree to the total volume optimal in the run. The marketing manager is notified, approving of the offer specifics and the buyers to be contacted, and the order entry software is also contacted with the information and is shown on the screen for internal order takers/sales representatives.

The data collected from the order entry system regarding the customers who ordered, their volumes, prices, etc. can be shared and inputted into the CRM package for data analysis. Buyer spending limits set in the order entry system can be set and carried across to the DAS deal room. A credit system/amount available can also be referenced in the software and indicated to the buyer and supplier. If the buyer attempts to exceed his limit, a notice is given that he is doing so and needs to speak with the supplier. In that case, the order may not impact the curve at this time.

A supplier is able to post curves that can be pulled at any time. Buyers are aware of these special offers and thus, may not choose to plan their production on this availability. These are truly spot opportunities and must be seized immediately. A guide can be provided to the buyers on the types of curves that can be presented.

Figure 30:
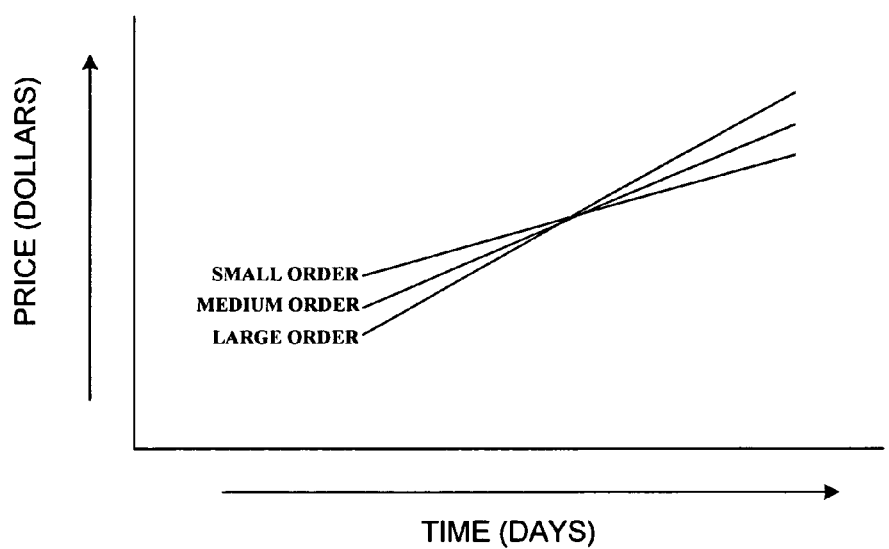
FIG. 30 is an example of a multidimensional price curve in accordance with one aspect of the subject invention.

Furthermore, an example of a multi-dimensional curve is shown in FIG. 30. In this example, the buyer is encouraged to place an order sooner. Here, the buyer can see the earlier the order, the better the curve and final price. This would work for seasonal products where a supplier could truly benefit from early orders. Again, these curves can be dynamic, adjusting as set by the supplier and by the demand ordered. If the product is scarce or pricing is unknown, the supplier may offer these type of curve, or variations of it, to entice buyers to provide a pricing floor. Once done, then the other curves can be modified (higher or lower) and the earlier curve disappears for the rest of the buyers except for those that had already placed their orders.

A not to exceed option can also be placed in this model. The NTE means a buyer would never pay more than the existing price where they placed an order, even if the curve was going up. And, a downward curve connected at the time of purchase may be offered to give the buyer a better opportunity to get a lower price.

Moreover, a buyer can purchase an option to buy the product during the offer. For instance, a fee would be paid by the buyer to hold a slot in the production schedule for X number of product A. The supplier may post certain restrictions such as time of option to be exercised, etc. If the option is exercised, then the price is confirmed. If the option is not exercised, the supplier has this capacity to sell but would collect a fee from the buyer holding the option.

Figure 31:
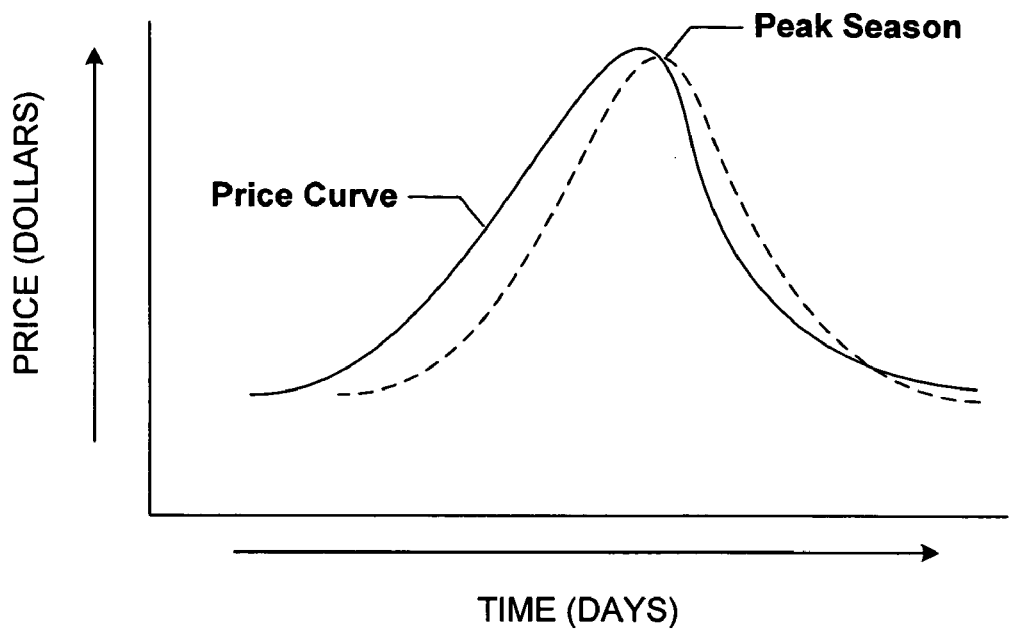
FIG. 31 is an example of a seasonal price curve in accordance with one aspect of the subject invention.

Another example of a curve is shown in FIG. 31 and is one that is set in advance and is time-sensitive. Offshoots tied to volume may or may not be included during the offer.

Additionally, an option to have production schedule underwritten by a third party can be included. To set up a line and produce a product is a costly venture, especially if volume is not known or the run length is incomplete. Using DAS, a supplier will have the option for a third party to underwrite the cost of the production run if certain volumes are not ordered.

Based on archival data, a third party can set the proper risk assessment and tie a financial figure to it. The software would record the figure and the volume required.

For example, a run would be set-up and a final volume reached. If the volume did not reach a certain threshold, then the third party would pay the supplier. If the volume did reach the threshold, then the third party would keep the payment. Partial volumes could also dictate what level of the payment would be released by the third party. In this way, a form of insurance could be purchased by the manufacturer producing the good. These contracts would be available for common trading among third parties.

Other factors which may be used in this example are: post production run, ship date, FOB point, product, quantity, history, the right to purchase X of product A within a specified period ... option price of X. Buyers can also participate, being able to buy options to purchase X amount of product.

Figure 32:
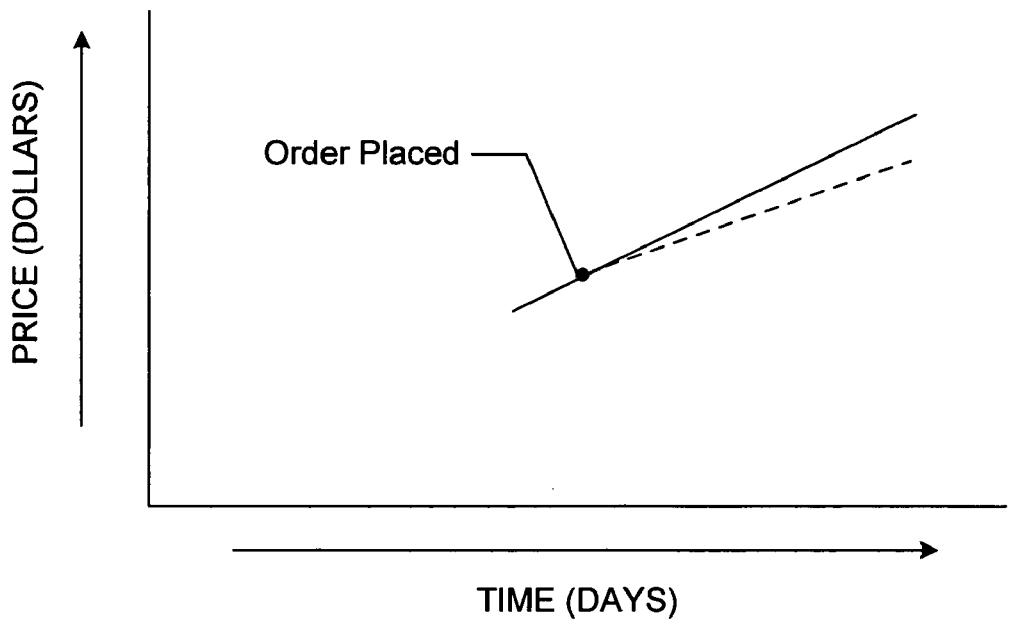
FIG. 32 is an exemplary price curve in accordance with one aspect of the subject invention.

Another variation on the price curve is shown with respect to FIG. 32. Here, if an order is placed at a certain point, every other order placed by buyer will drop the price by a certain percentage.

Many of the features above can be preferably implemented as software. Sales representatives/ISR's when viewing both pricing curves, forgers and service centers, would like to know which curve they are looking at, maybe a name and color to denote them.

For example, currently sales reps are able to see the two different curves (Forgers and Service Centers). One way to fix this is give them options. When they log on, a drop down box on the first page (home page) would let them choose whether to see Steel Centers, Forgers, or any contract price people. In essence, they would be logged in as this person and be able to see exactly what the buyer was seeing. Also, the option of view all could be added. This option would allow them to see all the different curves. To distinguish, rather than color, an extra field could be added in the aggregated offers page. This field would provide the company name, or name of the group of buyers that were able to see this specific curve.

As an example of an Auto-Post and Re-post Feature, a supplier can post an aggregated offer for ship date Y. The order enters the system from a buyer with a different ship date X specified (could be the internal ERP system, other order entry system). The order is taken and the system determines there is a new ship date with an X ship date. The system references the new ship date with the old. The system can be programmed to defer to the new ship date by a number of criteria (such as by the customer who ordered the product, the amount ordered, etc.). If so, the program can be set to automatically do the following:

(1) If there are no orders for ship date Y, the system changes the ship date to X and can notify the buyers accordingly.

(2) If there are orders for ship date Y, the system alerts those buyers via phone, fax, pda, email, etc. of the change in ship date. If the buyer confirms the new ship date is acceptable, the order is added to offer X. An incentive (3% off your final price if you accept, etc.) may be offered by the system (as programmed by the supplier). Another option would be the buyer refuses to accept the discount for the ship date. The buyer can then cancel the order via the system, or the supplier can honor the ship date of X as well as Y. The supplier can also automatically post the new ship date (X) in the Deal Room.

Product offers are set up with a minimum order quantity to simulate normal business practices. DAS also allows an Offer to be configured with a multiple minimum order quantities. Once the volume on a particular offer reaches a predetermined level, the minimum order quantity can be lowered (or presumably, raised).

For example, an offer for 12L14 bar could be set up with an initial minimum order quantity of 10 tons. Once orders have been placed totaling 100 tons, the minimum order quantity could be lowered to 5 tons automatically.

Product offers are generally determined by the supplier. However, DAS has the capability to survey buyers of a product. The buyer can indicate a desired purchasing schedule, indicating the types of products, product options, quantities and delivery dates. Using this information, a supplier can determine a production schedule that meets their internal goals, while accommodating customer demand.

As new offers are created, DAS can aid with the marketing and promotion of those offers. During the Offer creation process, DAS will notify the Action Manager of two potential pools of customers. First, DAS generates a list of customers who have purchased that particular product before. Second, DAS will generate a list of potential customers, based on the survey data of registered buyers.

Using these two lists of buyers, the Action Manager (or Supplier) can then create a targeted marketing program. DAS will allow new Offer notification both by email and by fax. A buyer with a particular product tagged will automatically or semi-automatically receive html alerts whenever the product has been ordered.

As orders on offers are placed, prices fall based on the pre-determined price curve. As prices fall, DAS can generates different lists of customers, such as: those who have already placed orders; those who have purchased that particular product before; and potential customers, based on the survey data of registered buyers. The Action Manager is notified of the price reduction and presented with the list. They can then elect to notify any or all of the groups to the new price (and savings) via email or fax.

In another aspect, suppose two curves are presented to two different groups. Both have the same ship date and FOB point. Two different price curves.

The supplier has the ability to alter the curve in one of the deal rooms to those buyers who have not yet seen the curve. For instance, 40 buyers have access to a deal room. 5 buyers have visited with 2 placing orders. The curve will stay the same for this group of 5 (or two if the supplier wishes to engage this option). The new curve will change according to input from the supplier (let's assume it is higher, but it also could be lower). Now, when the remaining buyers (35) visit the deal room, they will see only this new curve (with the volume of the two included to reflect an aggregated purchase in process). Likewise, the HTML notices generated from this deal room will automatically have this group separated and tagged.

Those buyers who either saw the first curve would still see the curve they saw earlier. The new buyers would see a different curve. Volume ordered by each would be reflected in the other curve.

The benefits would be to the supplier who could change a curve in mid-offer without antagonizing any customers. The profits would be higher with this Real-time flex-curve. New buyers would still benefit from aggregation (initial starting points, volume discounts, total volume, etc. could all be changed by the supplier in real-time).

A buyer can receive a real-time HTML alert notifying the buyer of the current price. An icon may then appear that allows the buyer to click on this to order immediately. The system allows the approved buyer to bypass the front page (name and password sections) and the other pages in between, and be at the order page. The buyer simply enters the order (or adds to the already placed order) within a single key-stroke.

As an example of a Tethered Price Curve consisted with the invention, every buyer is given a percentage off the price of a product along with a scheduled discount curve based on total volume ordered The buyer's discount follows the buyer throughout the deal room and by product. As more volume is ordered for a particular product, (e.g., 100 tons), the buyer would experience the discount from their own price volume curve. In this way, 100 buyers could have 100 price curves while still aggregating their demand on the same curve. All buyers are tethered off a production volume tied to a certain ship date or period.

The percent off could also change according to time or any other criteria selected by the supplier (product, fob point, volume, etc.) If the buyer has not ordered yet, his personal discount may be reduced as more orders come in. Conversely, if few orders are placed, the buyer may see an increase in the discount curve until he orders. Once he does, his particular price curve is "locked in" for the remaining offer time.

Still another feature, a sales manager dashboard, can be incorporated into the system. The dashboard is designed to allow a user to quickly set up Deal rooms, Offers, Products, Customers, and Customer Groups. Each of these functions can be accessed from a standard web browser or wireless PDA. Thus, the software allows quick set up and configuration of each set of data. The dashboard also contains a plurality of wizards that can quickly configure a set of information.

For example, a Deal room wizard allows a user to quickly create new groups of customers based on geography, company size, sales volume, or any other category grouping. A point and drag feature can be included to direct a potential buyer, a product offer, etc. to a Deal room. Similarly, an offer wizard allows a user to quickly create new offers, based on previous offers or entirely new offers, whereas a product wizard allows a user to add products to be offered. A customer wizard allows a user to register new users by manually entering information or importing information from existing data sources (e.g., a spreadsheet). Users can be set up from a workstation or the information can be entered remotely from a wireless PDA. A customer group wizard allows a user to create new customer groups, reassign customers within groups, remove customers from groups, or remove entire groups.

Each wizard, upon substantially completing its function, has the ability to determine if another wizard should be invoked. For example, once the Deal room wizard has completed setting up a new Deal room and the customers that will have access to that deal room, the next logical step is to call the product wizard to create products that will be offered in the new deal room. The offer wizard would then be called next to configure the offers for those products. Likewise, the customer wizard can call the customer group wizard in order to assign a new customer to an appropriate group or groups of buyers.

The sales manager dashboard may be accessed via a phone line. For example: a user calls a 1-800 number to access his deal room. The user is then asked to enter a code, which may be entered on the number pad or spoken into the phone receiver. Once accepted by the system, the user hears a series of prompts. The prompts may include the following voice instructions:

(1) To post a new offer, press or say 1. Here a series of prompts then walks the user through a series of fields to be completed (e.g., the product, starting price, price breaks, ending price, quantities). The user can at anytime review the information for accuracy. The company name and buyer(s) or groups of buyers that have access to the product are then entered. Finally a confirmation is sent to the user to confirm the order. The confirmation may be sent via email, instant message, etc. After the initial offer, the software can automatically enter new offers for the user over the phone based on the user's input.

(2) To add a new customer, press or say 2. Here a buyer can be added online with a notification (via email, instant message, etc.) sent to the buyer with user name and password information.

(3) To change a customer's options, press or say 3. Here a customer can be added or removed from a specified Deal room.

(4) To find current orders, press or say 4. Here a user can find his current, outstanding orders, or a seller can find any outstanding orders by customer and/or product.

(5) To find Deal room information, press or say 5. Here a user can determine when a Deal room will close, what the current product price in the Deal room is, etc.

A user can navigate through and even customize the options in order to have access to any and all information available in a Deal room. Restrictions upon these options may be set by a system administrator.

Additionally, an action manager can be included. The action manager can have access to part of or the entire operation of all Deal rooms from multiple suppliers, multiple buyer and supplier price curves, etc. from a single screen. For example, drop down menus allow an action manager to see a list of all Deal rooms by supplier. Selecting a folder allows the action manager to then see the various Deal rooms within each supplier Deal room. Selecting the folder again allows the action manager to view the products offered in that particular Deal room. In one section of the screen, the action manager can search via filters/free text searches to pull up the name of a Deal room, buyer, etc. Headings displayed in the search box can include new customers, existing customers, etc. A point and drag system lets the action manager put a new buyer into a proper Deal room (listed in folders on a side of the screen). This tool enables the action manager to quickly post new customers to Deal rooms, change access rights, or delete from the Deal room. If the action manager selects a buyer name, another portion of the screen displays the individual buyer information as well as access to notes, contact information, name and password information, etc.

Another portion of the screen is a delimiting function that allows the action manager to limit searches by state, company name, Deal room folder, product folder, etc. Likewise, individual buyer information is available by selecting that particular folder. A product profile is also listed for each buyer which can be completed by a buyer via email, upon registration, or by the action manager during a phone call. Products are tagged and as orders are placed for those products, the buyer is alerted via email automatically sent from this dashboard. The orders can also be tabulated and viewed through the dashboard.

The products the buyer purchases are color coded to show the profile. Some examples include: "Orders a product frequently" which charts the orders over time; "Has ordered in the past" shows when that product was last purchased, click again to see all of their purchases for this product, at what price they entered their order, at what price they received when all the volume was added; "Average price of when first order is placed"; "% savings from that price to the final price"; "percentage savings from the first list price versus the price where order was placed"; "Is order volume increasing over time, decreasing over time?" (show graph); "Show Superimpose trend of average price and total volume ordered" to calculate the price sensitivity of this buyer: High, Medium, Low; "Show range of the buys", e.g., min, max., average, median price points in a single graph; "What is the price elasticity for this customer" e.g., as price drops, how much more is ordered; "Average savings on product"; "Extrapolate how much customer will order over the year" (based on data collected); "Show this on a graph compared to the average of all buyers for this product" (tally from online orders for this item); "Develop a buyer profile" showing the supplier (and possibly buyer) how often the buyer orders, etc for quick reference whenever the buyer profile; "Show curves for all of these features by different deal room segments"; "List feature" e.g., high price elasticity to low price elasticity; "Customer adds to order Frequency" e.g., very frequently, infrequently, etc.

Supplier can group into segments: Green are tier 1 buyers, Blue tier two buyers and decide to regroup the buyers into new deal rooms.

As each of the wizards are called, a user can configure a series of notifications. These notifications can be done via email, fax, or paging, to a workstation, wireless PDA, or phone/pager. As part of the customer wizard, the user can choose to be notified the first time a new user logs onto the system, or the first time a user places an order. As part of the offer wizard, the user can choose to be notified when the first order is placed, when the volume of product ordered reaches a predetermined point, or when the offer is about to close.

An example of the use of the sales manager's dashboard can be a quick configuration of offers for products after a sales meeting. When a supplier determines sales goals, focus on sales in a particular product line, or any other sales based initiatives, the system can be immediately configured to support these initiatives. For instance, new offers can be created for products determined to be hot sellers; new customer groups can be created to support initiatives to enter a new sales territory; and/or new Deal rooms can be set up to accommodate a restructuring of sales accounts.

When an order is cancelled, the volume may not be removed from the price curve due to the desire to show price transparency. However, this is likely to cause the supplier a significant loss since the buying group will be given the discounted price without the ordering the volume of product that warrants such a discount. Cancellation fees may be imposed, however, if the cancellation takes place at the top of the curve, the margin of loss is still high. In order to protect a supplier from future losses, it is desired to keep the "canceling buyer" segregated from the other buyers. This can be done by showing the "canceling buyer" the curve that the other buyers see. If the "canceling buyer" places and order on his/her curve, this volume will be placed in his/her curve only. Thus, the other buyers will not be affected. When the offer closes, and if the "canceling buyer" has not cancelled the order, the volume will be added into the curve for the other buyers and the price will be discounted accordingly. This system could be accomplished by allowing a buyer to select an option to "hold volume until close".

The system can also allow a customer to have a predefined purchasing profile. For example, if a customer typically purchases a particular product with particular options, the customer's personalized information will be automatically retrieved and entered when a new order for the customer is initiated. Likewise, if a customer has a contract pricing relationship with a supplier, the customer's contract price, along with the customer's standard options and purchase information will be automatically retrieved and entered when a new order for the customer is initiated.

Reminders, via email or instant message, could also be sent to the customer based on his/her personal purchasing profile. For example, if a customer desires to place orders 45 days in advance for particular products, the system could send reminders to the purchasing agent if the customer has not ordered within the 45 days. It is to be appreciated that any predetermined amount of time may be configured for the reminders.

The system can also automatically update fields, such as the additional information field and the shipping instructions field, based on the customer's location. For example, if a customer typically has product A sent to his/her plant at location X and product B sent to his/her plant at location Y, the instructions specific to each product can be identified and attached to the appropriate orders.

Another variation is a buyer with multiple products that are ordered from a particular supplier. A listing of these products is placed in the buyer's customer profile. When a new curve is introduced for one of these products, the buyer receives an alert or feeder, as will be discussed in greater detail below. If the alert is received via email, the email can contain a link and/or order icon, which will allow the buyer to place a new order automatically. The customer profile can be further tailored to match ship dates between the profile and the supplier's product offering prior to sending an alert to the buyer.

The buyer may choose to have a feeder running across a portion of the buyer's home page, which displays the current offers and prices for products in the customer profile. The price and ship dates can be listed along with the price curves. An icon may be selected to see the current price curve. Thus, the buyer can view, firsthand, the ability to group a purchase. With one click, the buyer can access a particular Deal room which displays the product curve and order page that the buyer is interested in. Or, from the feeder, the buyer can click on a product and an order screen for the product appears. The feeder can be updated in real-time to reflect new product prices and volumes available.

If the buyer has already placed an order for the product with a different ship date, the system displays the old ship date and the new ship date to the buyer. The buyer is then given the opportunity to transfer the order to the new ship date by selecting an "accept new ship date" icon. A confirmation notice via email, for example, is sent to the buyer to inform him/her of the specific terms (e.g., cancellation terms) of the offer. The information immediately allows the order to be put onto a group purchase option and the price curve reflects the new change.

Additionally, the system can automatically, or semi-automatically, post additional price breaks within an existing offer. For instance, if an offer has a first price break of five dollars at 100 units and a second price break of ten dollars at 300 units, the system can automatically post price breaks according to a predefined schedule or prompt the supplier to post price breaks at various points between the 100 and 300 quantities. The ten dollars could be broken up equally (i.e., one dollar price break for every 40 units), or a variety of other pricing structures could be established, such as, more breaks at the beginning of the curve, more breaks at the end of the curve, and variations on the increments whether equally distributed or lower dollar amounts initially then higher, etc. The option, once selected by the supplier, could alter the price curves accordingly. Likewise, this feature could be integrated into the system with the ability to alert buyers via email, fax, phone, instant message, etc. of the new price breaks that have been established.

Moreover, a price curve creation tool that allows a supplier to import existing customers and prices (contract and/or current price) and previous volumes ordered into a price curve can be implemented as well. The price in the Deal room curve can be established by having the supplier select a starting price curve and an option to put the same price on a first tier for a buyer with a predetermined percentage discount (e.g., 1% off current price when order is placed online), or an option to match an offline price to the first tier of an online curve. The rest of the curve can be created by using a wizard. The wizard can walk the supplier through each buyer's curve from a single screen view and then display a curve that reflects the price and volume breaks for that particular buyer. If the supplier changes quantities, the curve's slope will immediately change to reflect the new price breaks. These price curves can likewise be changed quickly by using the feature to modify an existing curve between Deal rooms.

Many other visual tools are provided for as well, including, for example: Displays for aggregated purchasing; Displays, where a supplier can post for buyers the changes in prices relative to ship dates and time of order, can include:

(1) Show offers by the day over a period of time (e.g., calendar with 30 days).

(2) Calendar for the product, which can coincide with the ship date.

(3) A customer gains access to a Deal room and sees a listing.

(4) Current quantity available in stock and price of the current stock.

(5) The current price can read the customer's contract price or default price set by the Deal room where the buyer has been given access.

(6) A calendar shows the dates for any period of time (e.g., day by day, week, month, quarter).

(7) A price per unit measure (e.g., pound, carton).

To better illustrate this feature, for instance, a buyer would register to the Deal room and instead of seeing a price curve upfront, the buyer would select a product category and then see a calendar appear with different prices for each date (tied to a ship date or receive date). As an example, on the first day of the month, a product has a price of $129/thousand and on the fifth day, the product has a price of $127/thousand. The buyer can select a day with a price by clicking on an icon. A price curve appears that shows where the price is in the curve, the next price break, quantity available, time for an order to be placed, etc.

Other options also exist, which include but are not limited to: (1) a table with prices and quantities, a 3-dimensional chart that lays out the month along with the relative price points and quantities available, a curve that shows prices (lowest to highest, for example) for the product, and price and time remaining for each offer; (2) An "L" for the lowest price in view, "2L" for the next lowest price, etc. can also be listed on the calendar for a quick view.

The buyer can place an order and add to the group's acceptance date. As the offer closes, the price is confirmed and the order executed. A quick search can be done to find the lowest current price, the lowest potential price, etc. Or, a quick search can be done at the first page by selecting a product and having the chart appear accordingly, or the prices and dates offered appear.

Some dates on the calendar may not have any numbers which would reflect that the product is not available at that time (unless pulled from inventory in which a price can be put in that correlates to the contract price/pull from inventory price).

A carrying cost calendar can be used on the screen as well for the buyer to plug in numbers such a quantity needed, time before product is completely used, date initially needed, average consumption per day, total carrying cost percentages, etc. and the system will return the appropriate volume to order and date.

The system can display information such as: how many buyers have access to a particular offer, how many buyers have visited an offer to date, how much has been ordered by a group over the history of the product.

The system can also include a price protect feature for a supplier. For example, once a buyer has ordered, the screen, or calendar, is copied and is accessible for future use. The data can be forwarded to a database that will track the price and delivery variances and arrive at a price sensitivity profiles for the buyer and the particular product.

The supplier can also use this information to generate future calendars for this buyer or other buyers. A ranking system will also be available to show the price sensitivity of this buyer as the different dates and prices are pulled into a database and a color-coded or ranking system is leveled that compares the buyers and puts them into categories, such as: high price sensitivity (1:3)—for every 1% decrease in price, the customer purchases 3% more; medium price sensitivity (1:1.125)—for every 1% decrease in price, the customer purchases 1.25% more, low price sensitivity, and no price sensitivity.

The calendar can also change in real-time based on the information fed into the system by a semi-automatic function (the user inputs changing volumes and prices) or a direct feeding of information from the supplier's ERP system. Current inventory levels would not only change, but also the available volumes.

The supplier or buyer can also have a save feature incorporated that allows the buyer to save the prices presented in the calendar for a period of time determined by the supplier. In this way, the buyer has access to a product's old prices for a period of time while still having access to the lower prices that may appear from changes to the calendar in the interim. It is a way to reward a buyer for participating in the program and can be done automatically by the software and given a name (e.g., calendar May 1, 2002) for quick access.

What has been described above includes examples of the subject invention. It is, of course, not possible to describe every conceivable combination of components or methodologies for purposes of describing the subject invention, but one of ordinary skill in the art may recognize that many further combinations and permutations of the subject invention are possible. Accordingly, the subject invention is intended to embrace all such alterations, modifications and variations that fall within the spirit and scope of the appended claims. Furthermore, to the extent that the term "includes or having" is used in either the detailed description or the claims, such term is intended to be inclusive in a manner similar to the term "comprising" as "comprising" is interpreted when employed as a transitional word in a claim.

What is claimed is:

1. An electronic commerce system to facilitate discount sale of goods and/or services, comprising:
   a server that employs a processor to construct a plurality of deal rooms sponsored by a supplier of an item that is offered for sale in each of the plurality of deal rooms, wherein access to a deal room of the plurality of deal rooms is determined by the supplier that sponsors the deal room and differs from access requirements of other deal rooms of the plurality of deal rooms;
   an aggregation component that determines an aggregate quantity of the item ordered in each of the plurality of deal rooms;

a price curve component that dynamically updates a price curve for the item based on the aggregate quantity, a price curve attribute, and an indication of the deal room in which an offer for the item is presented; and a communication component that receives the price curve and that presents to a buyer who accesses the deal room the price curve for the item.

2. The system of claim 1, wherein the price curve attribute is one of order volume, orders to date from a particular supplier, aggregate volume ordered by the buyer, time of shipment, or a time in which the buyer placed an order.

3. The system of claim 1, wherein the deal room is a private deal room, access to which is limited based on at least one of invitation, right of entry, accepting terms and conditions of the supplier, or prior transactions between the supplier and the buyer.

4. The system of claim 1, wherein a second deal room of the plurality of deal rooms is public and buyers in the second deal room receive a different price curve with respect to the price curve received by buyers in the private deal room.

5. The system of claim 4, wherein the offer is a private offer with a limited period in which the buyer can accept the private offer.

6. The system of claim 5, wherein the price curve component selects a next buyer sequentially and the communication component presents the private offer to the next buyer when the buyer rejects the private offer or does not respond within the limited period.

7. The system of claim 1, wherein the price curve component updates the price curve based on acceptance of a counteroffer from the buyer or the supplier.

8. The system of claim 1, wherein the price curve component updates the price curve based upon other transactions between the buyer and the supplier.

9. The system of claim 1, wherein the price curve attribute is based on a plurality of orders from the buyer in connection with a single offered item from the supplier.

10. The system of claim 1, wherein the price curve is at least one of a chart, a graph, a product listing, or a calendar.

11. The system of claim 1, wherein the price curve component calculates an optimal price curve based on at least one of an optimal time to place an order, an optimal ship date for a placed order, or ship dates with dynamic prices.

12. A method for pricing a good and/or service, comprising:

employing a processor for aggregating a plurality of orders for an offer for sale of an item offered by a supplier across multiple deal rooms;

determining a qualified buyer who satisfies supplier criteria for entry to a deal room of the multiple deal rooms, wherein the access criteria differs for each deal room;

receiving a price curve attribute from the qualified buyer and the supplier;

updating a price curve based upon an aggregate volume ordered, an indication of the deal room, and the price curve attribute;

presenting the price curve attribute for each offer, respectively, presented in each of the multiple deal rooms; and presenting the price curve to the qualified buyer.

13. The method of claim 12, wherein determining the qualified buyer is based on at least one of invitation, right of entry, accepting the terms and conditions, or prior transactions.

14. The method of claim 12, wherein the price curve attribute is at least one of volume of order, orders to date from the supplier, aggregate volume ordered by the buyer, terms, conditions, terms and conditions, terms and conditions of a second order, time of shipment, or time of order placement.

15. The method of claim 12, wherein the price curve is at least one of a chart, a graph, a product listing, or a calendar.

16. The method of claim 12, further comprising calculating an optimal price curve based on at least one of an optimal time to place an order, an optimal ship date for a placed order, or ship dates with dynamic prices.

* * * * *